United States Patent
Umeda et al.

[11] Patent Number: 5,920,342
[45] Date of Patent: *Jul. 6, 1999

[54] IMAGE INPUT APPARATUS FOR CAPTURING IMAGES OF MULTIPLE RESOLUTIONS

[75] Inventors: Masafumi Umeda, Yokohama; Mitsuo Sasuga, Saitama-ken; Takahiro Murata, Sagamihara; Takahiro Kokubo, Fujisawa; Tomokazu Domon, Yokosuka; Riyousuke Kumagai, Kawasaki; Takashi Ishikura; Yoshitomo Tagami, both of Yokohama, all of Japan; Yuji Ide, San Jose; Toshihiro Morohoshi, Sunnyvale, both of Calif.; Tatsuyuki Mikami, Tokyo, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/529,062

[22] Filed: Sep. 15, 1995

[30] Foreign Application Priority Data

Sep. 16, 1994 [JP] Japan .................................... 6-221325

[51] Int. Cl.⁶ .......................... H04N 5/225; H04N 5/232
[52] U.S. Cl. ...................... 348/211; 348/219; 348/231; 348/340; 348/351; 348/357; 348/375; 358/909.1
[58] Field of Search .................................. 348/207, 222, 348/223, 224, 227, 228, 231, 232, 233, 335, 340, 343, 344, 345, 349, 354, 355, 360, 361, 362, 363, 364, 373, 374, 375, 376, 552, 211, 219, 213, 351, 357; 358/906, 909.1, 479; H04N 5/225, 5/232

[56] References Cited

U.S. PATENT DOCUMENTS

| | | |
|---|---|---|
| 3,110,762 | 11/1963 | Frank . |
| 3,495,091 | 2/1970 | Scmidt et al. . |
| 4,141,624 | 2/1979 | Siegmund . |
| 4,383,170 | 5/1983 | Takagi et al. . |
| 4,633,317 | 12/1986 | Uwira et al. . |
| 4,638,371 | 1/1987 | Milch . |
| 4,641,038 | 2/1987 | Baker . |
| 4,896,215 | 1/1990 | Morcom .................................. 358/210 |
| 4,910,413 | 3/1990 | Tamune . |
| 4,920,418 | 4/1990 | Robinson . |
| 4,928,300 | 5/1990 | Ogawa et al. ............................ 379/53 |

(List continued on next page.)

FOREIGN PATENT DOCUMENTS

| | | | |
|---|---|---|---|
| 50-80027 | 6/1975 | Japan | ................. H04N 5/30 |
| 50-112054 | 9/1975 | Japan | ................. G02B 7/00 |
| 51-25914 | 3/1976 | Japan | ................. H04N 1/04 |
| 53-56916 | 5/1978 | Japan | ................. H04N 1/12 |
| 53-109658 | 9/1978 | Japan | ................. G01B 11/00 |
| 56-20393 | 2/1981 | Japan | ................. H04N 7/18 |
| 56-72575 | 6/1981 | Japan | ................. H04N 1/04 |
| 56-162590 | 12/1981 | Japan | ................. H04N 9/04 |
| 58-197970 | 11/1983 | Japan | ................. H04N 5/781 |
| 59-15378 | 1/1984 | Japan | ................. H04N 5/26 |
| 60-54576 | 3/1985 | Japan | ................. H04N 5/335 |
| 60-91774 | 5/1985 | Japan | ................. H04N 5/225 |
| 60-223388 | 11/1985 | Japan | ................. H04N 5/335 |
| 63-284978 | 11/1988 | Japan | ................. H04N 5/335 |
| 63-284980 | 11/1988 | Japan | ................. H04N 5/335 |

*Primary Examiner*—Wendy Garber
*Assistant Examiner*—Ngoc-Yen Vu
*Attorney, Agent, or Firm*—Oblon, Spivak, McClelland, Maier & Neustadt, P.C.

[57] ABSTRACT

To transfer an image signal from a electronic camera head to a personal computer, a PC card provides the interface between the camera head and the personal computer. The PC card is removably attached to the personal computer. As instructed by the personal computer, the PC card operates the camera head, sets its states, writes image data into a memory, reads the image data from the memory for transmission to the personal computer, generates control signals for a light refracting member, and informs the personal computer of the state of the camera head.

30 Claims, 41 Drawing Sheets

U.S. PATENT DOCUMENTS

| | | | |
|---|---|---|---|
| 4,967,264 | 10/1990 | Parulski et al. | |
| 5,060,069 | 10/1991 | Aoki | 358/209 |
| 5,231,501 | 7/1993 | Sakai | 358/209 |
| 5,341,489 | 8/1994 | Heiberger et al. | 395/425 |
| 5,402,171 | 3/1995 | Tagami et al. | 348/219 |
| 5,418,565 | 5/1995 | Smith | 348/273 |
| 5,438,359 | 8/1995 | Aoki | 348/207 |
| 5,475,441 | 12/1995 | Parulski et al. | 348/552 |
| 5,477,264 | 12/1995 | Sarbadhikari et al. | 348/231 |
| 5,493,332 | 2/1996 | Dalton et al. | 348/207 |
| 5,570,177 | 10/1996 | Parker et al. | 356/139.06 |
| 5,754,226 | 5/1998 | Yamada et al. | 348/219 |

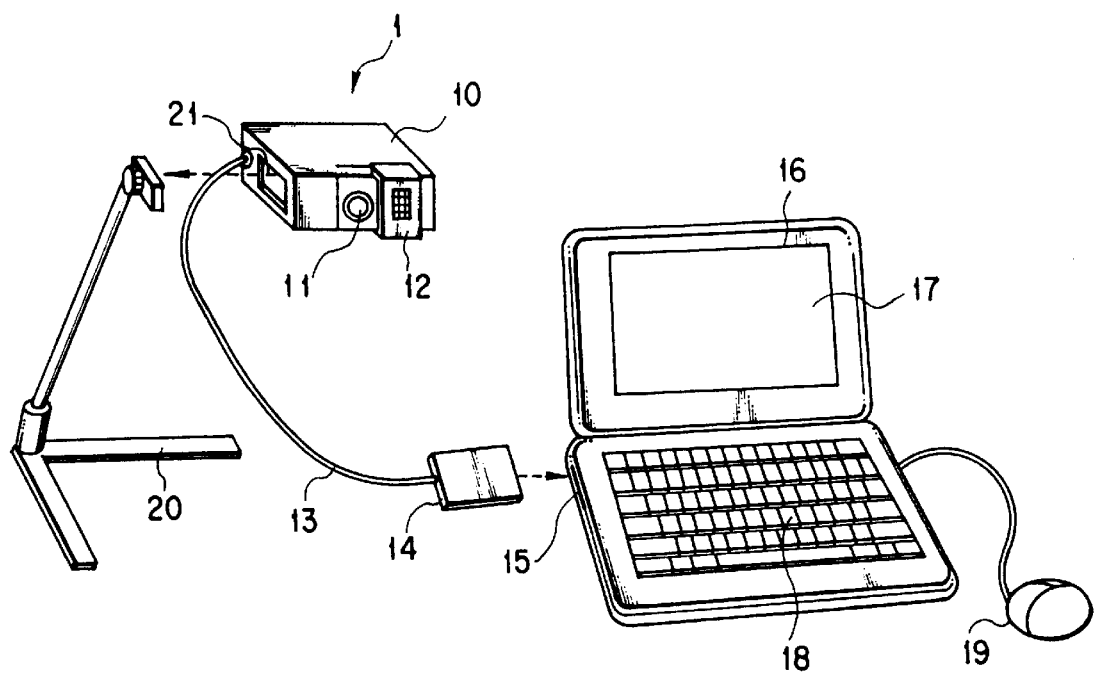
F I G. 1
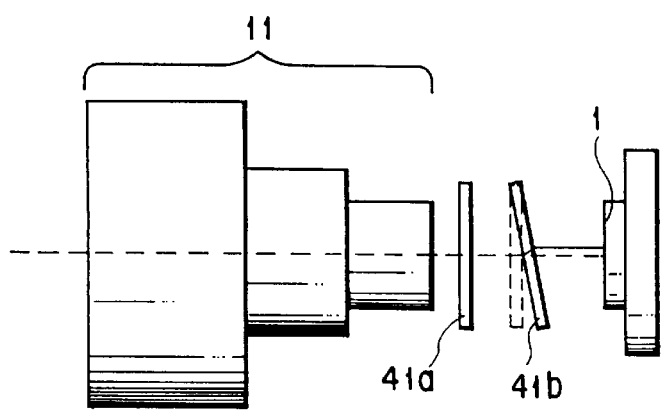
F I G. 6

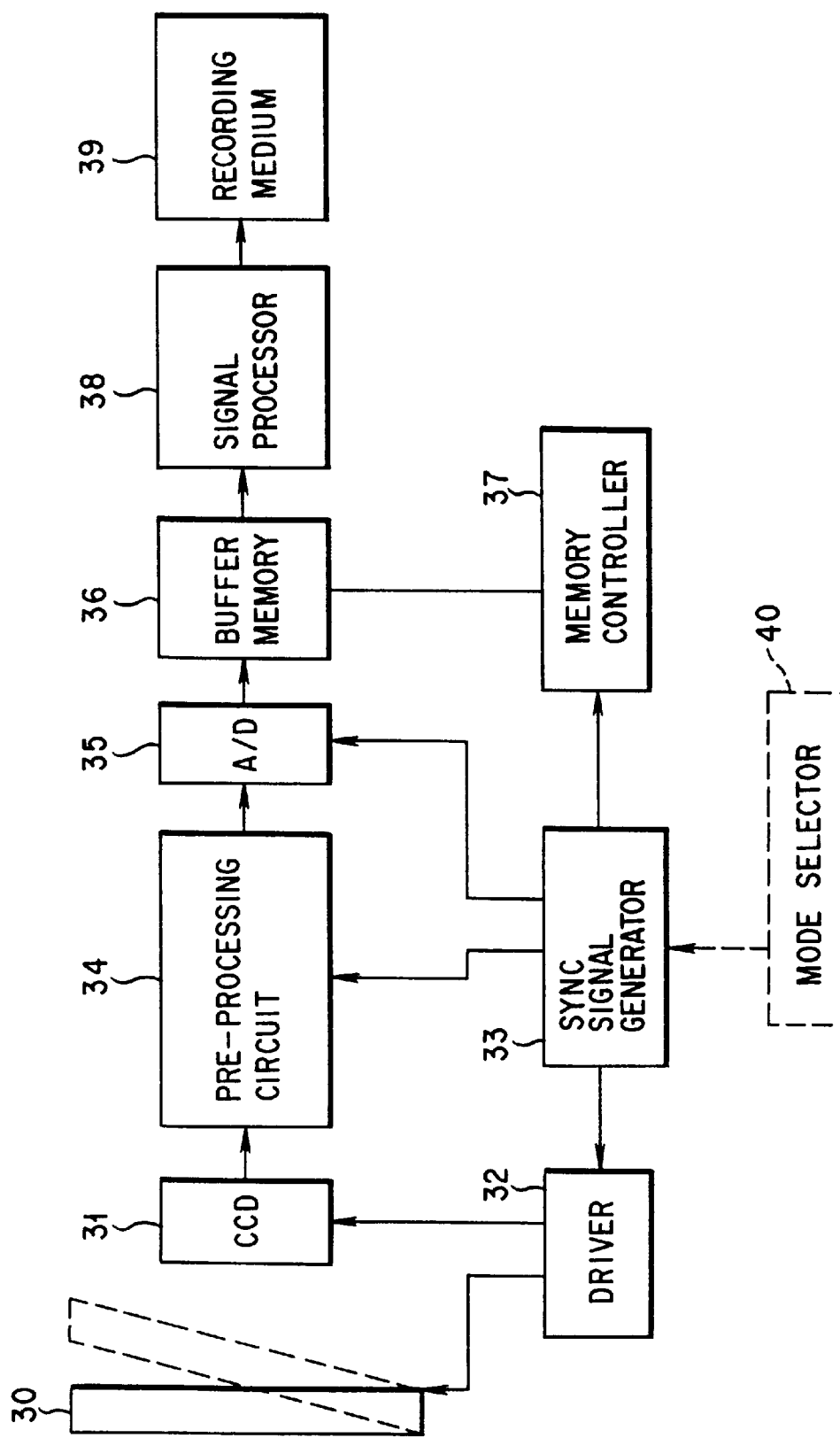
F I G. 2

ARRAY B

G EQUIVALENT ARRAY

R/B EQUIVALENT ARRAY

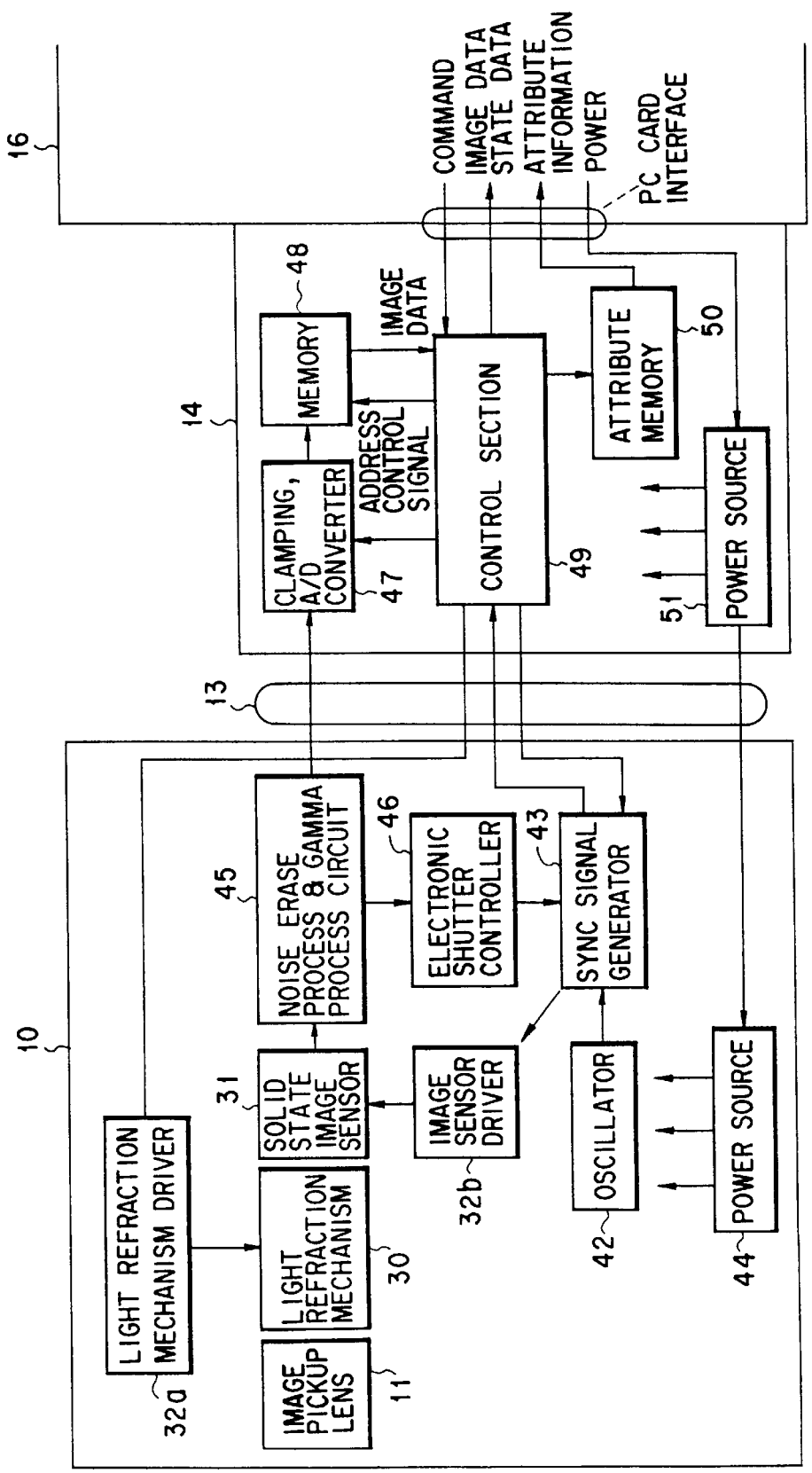
F I G. 7A

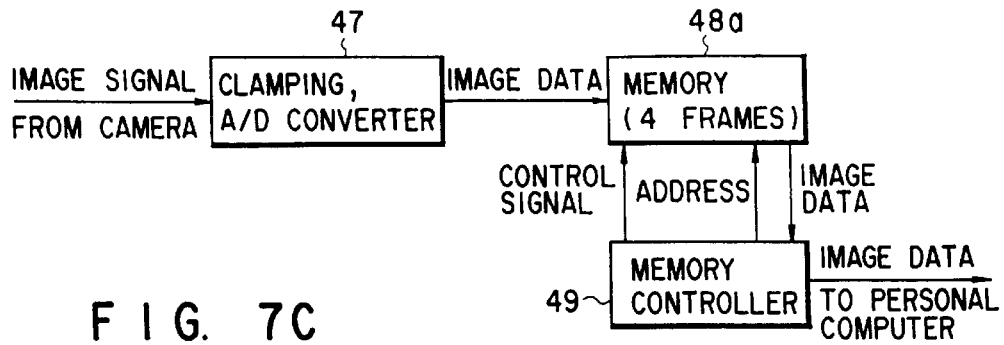
F I G. 7C
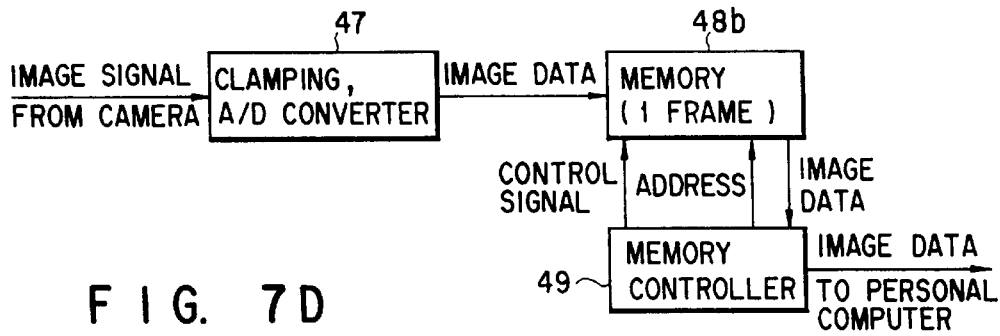
F I G. 7D
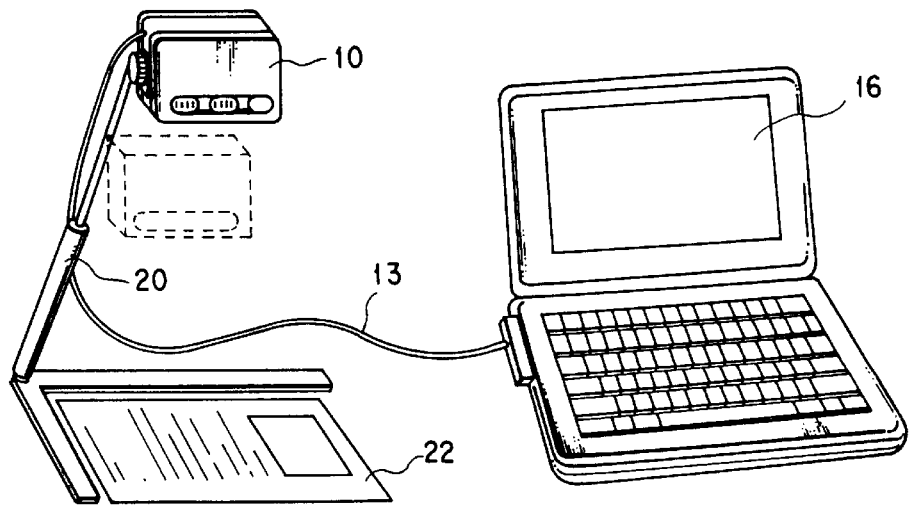
F I G. 8

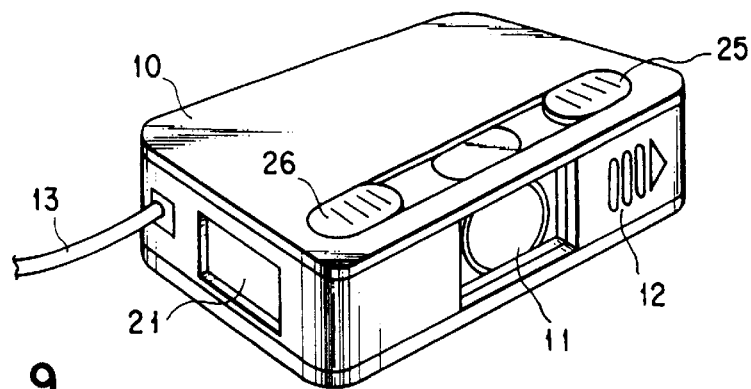
FIG. 9
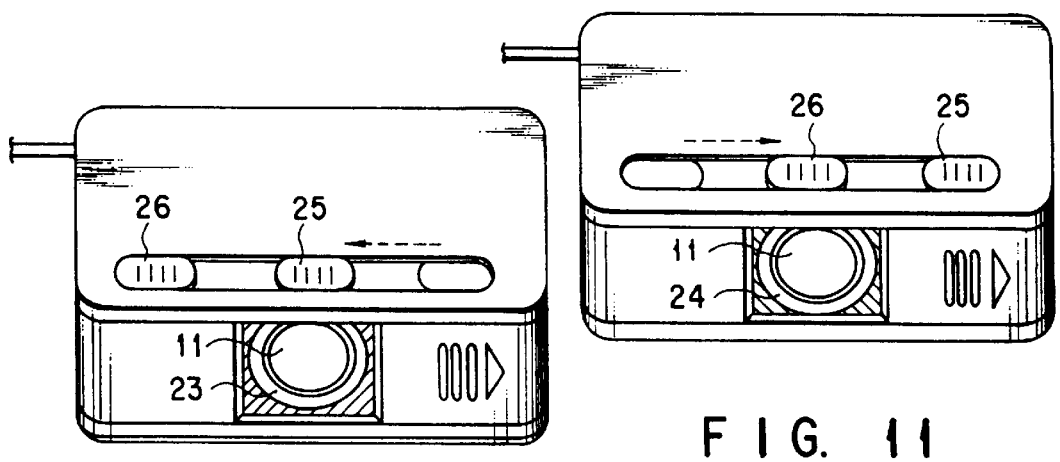
FIG. 10
FIG. 11
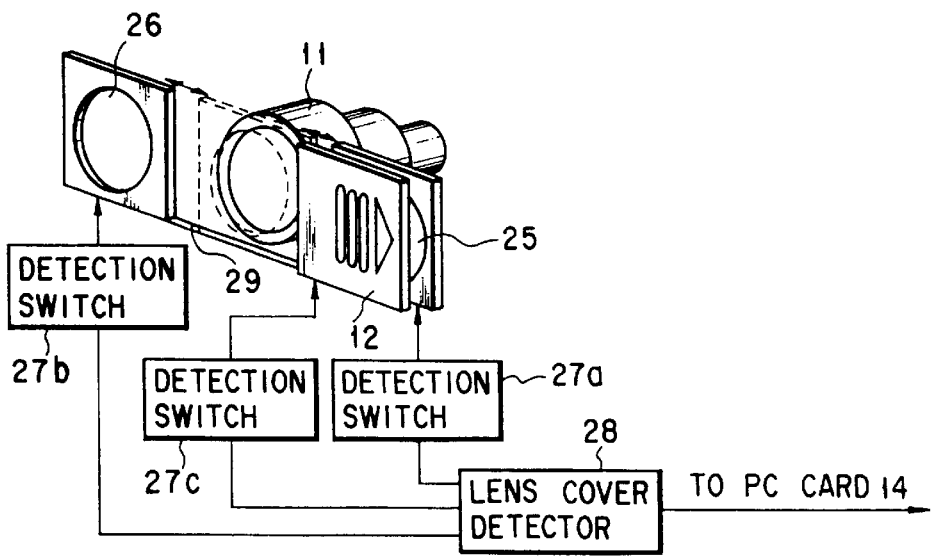
FIG. 12

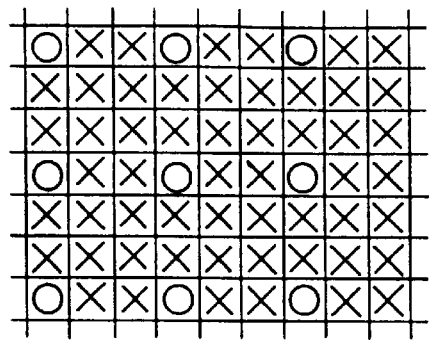
○ : DATA SAMPLED FOR WHITE BALANCE AND STORED FOR VARIOUS CORRECTIONS
✕ : DATA SAMPLED FOR WHITE BALANCE
F I G. 15
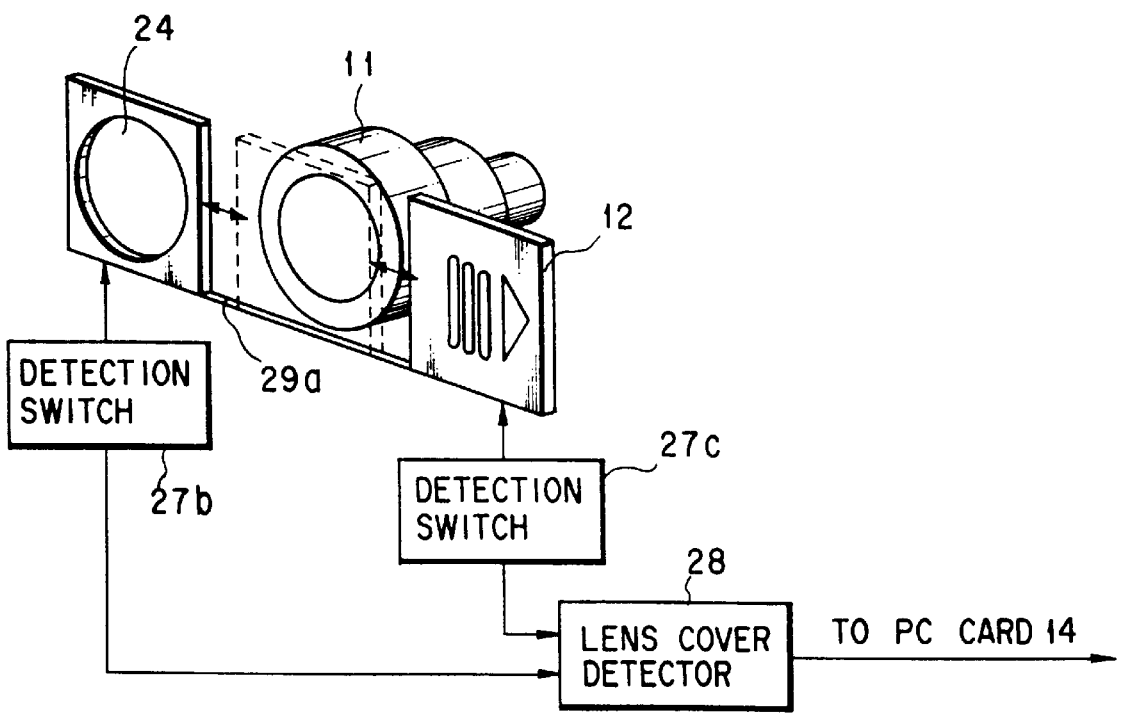
F I G. 16

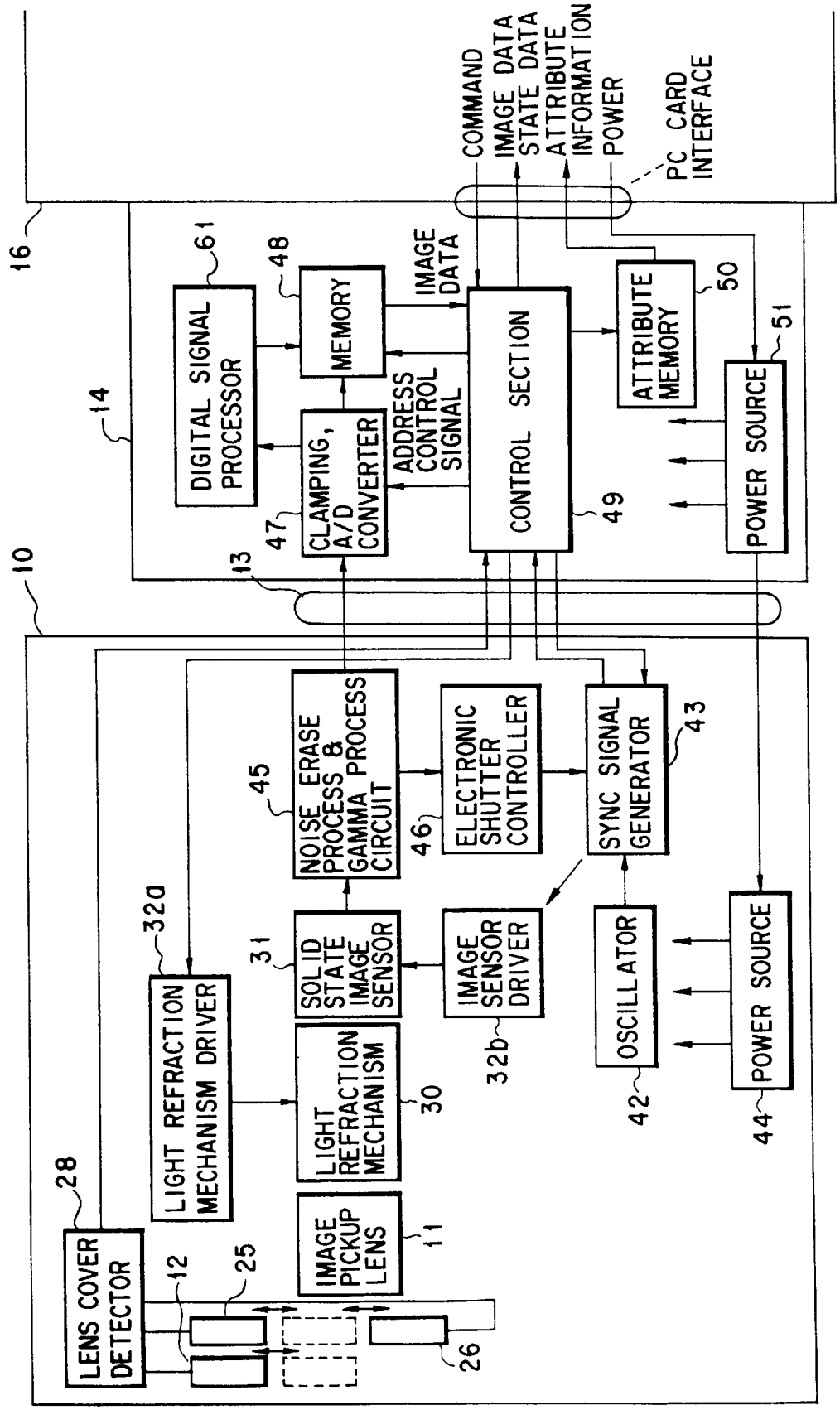
F I G. 19

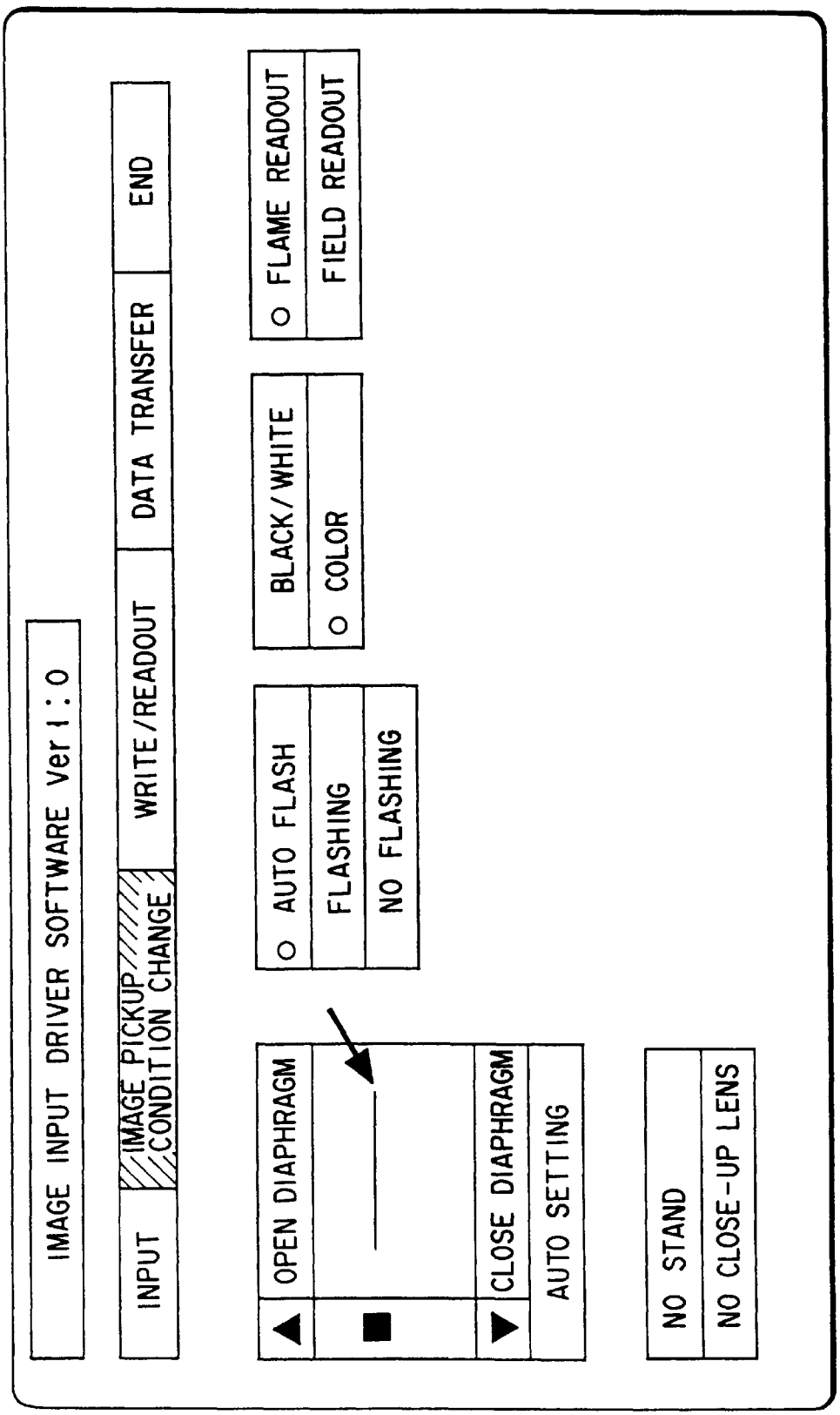
F I G. 21

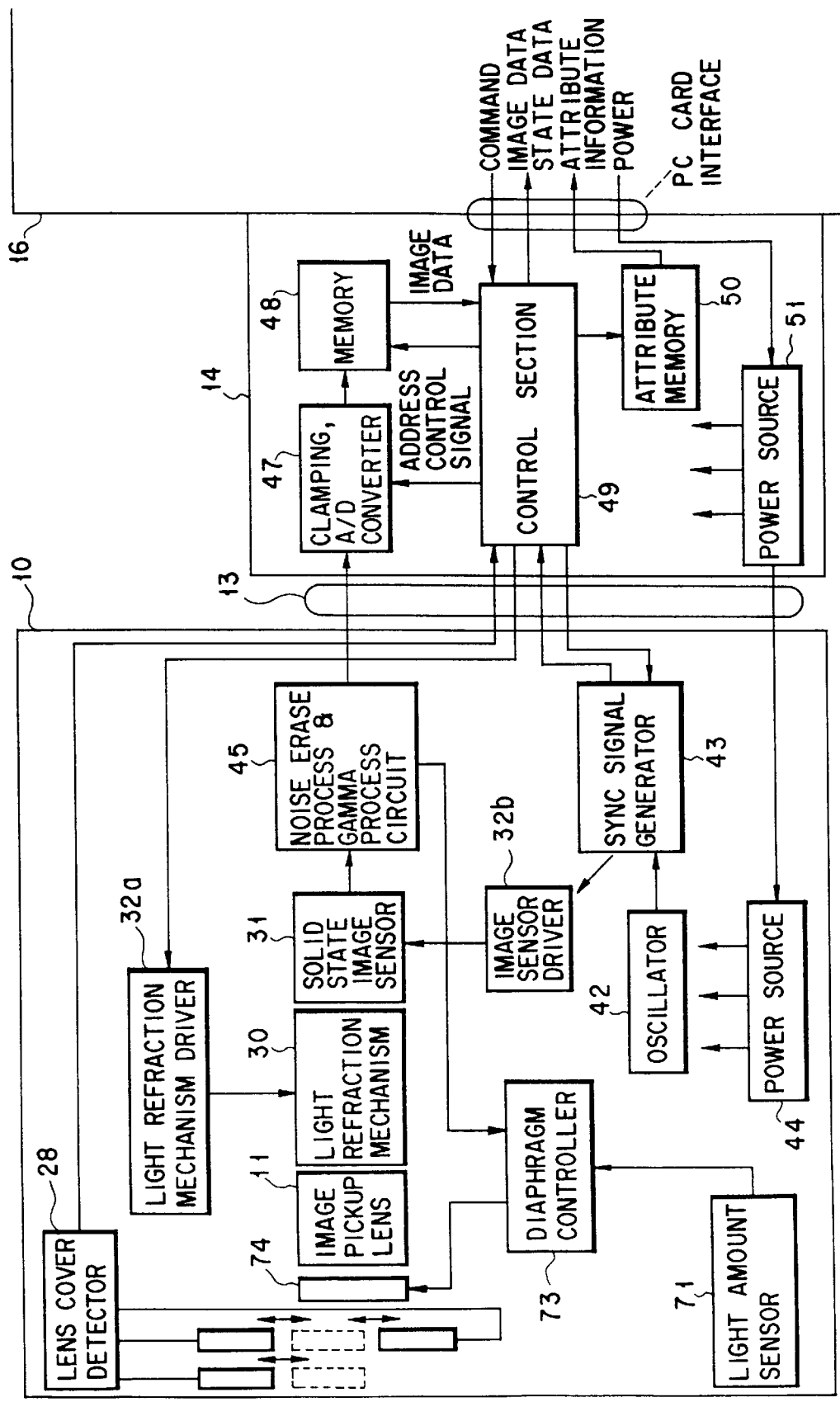
F I G. 23

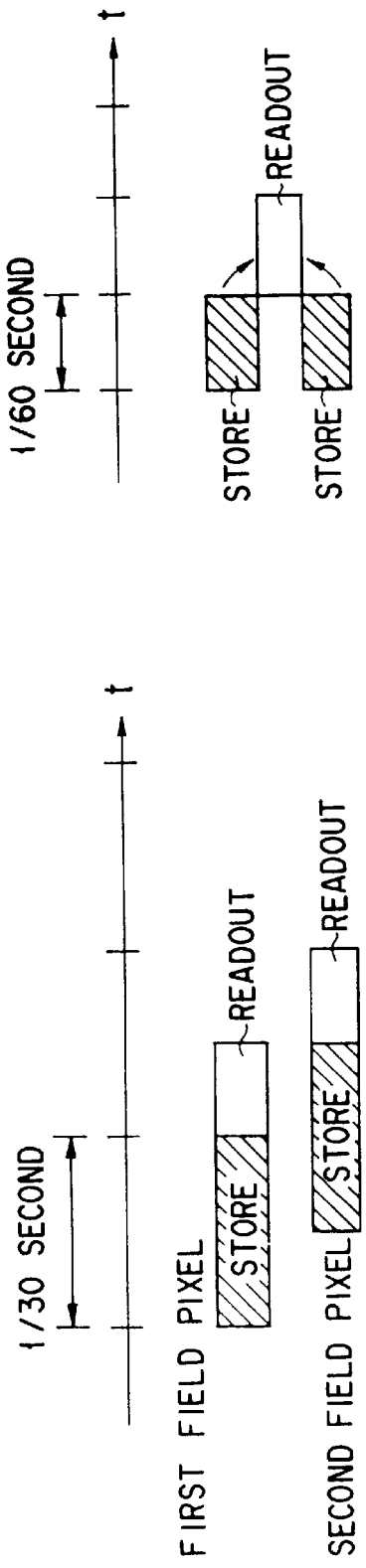
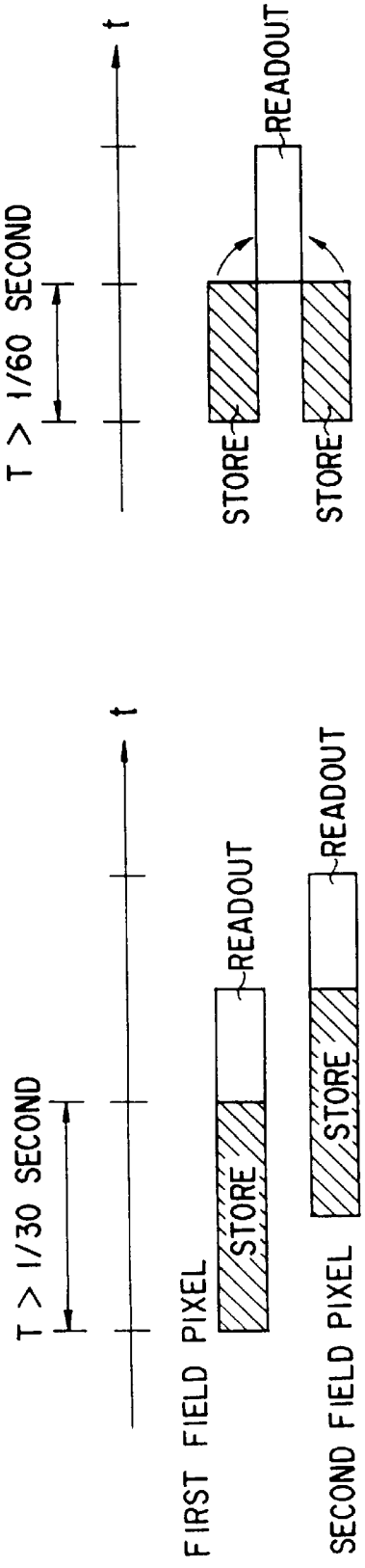

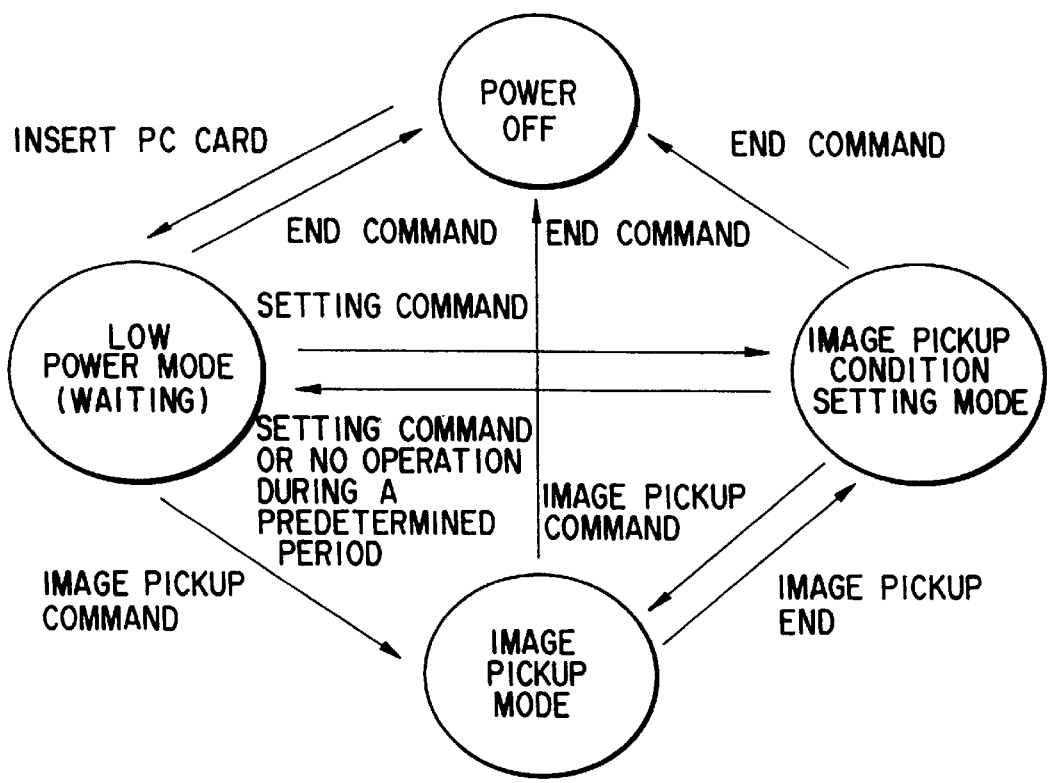
F I G. 26

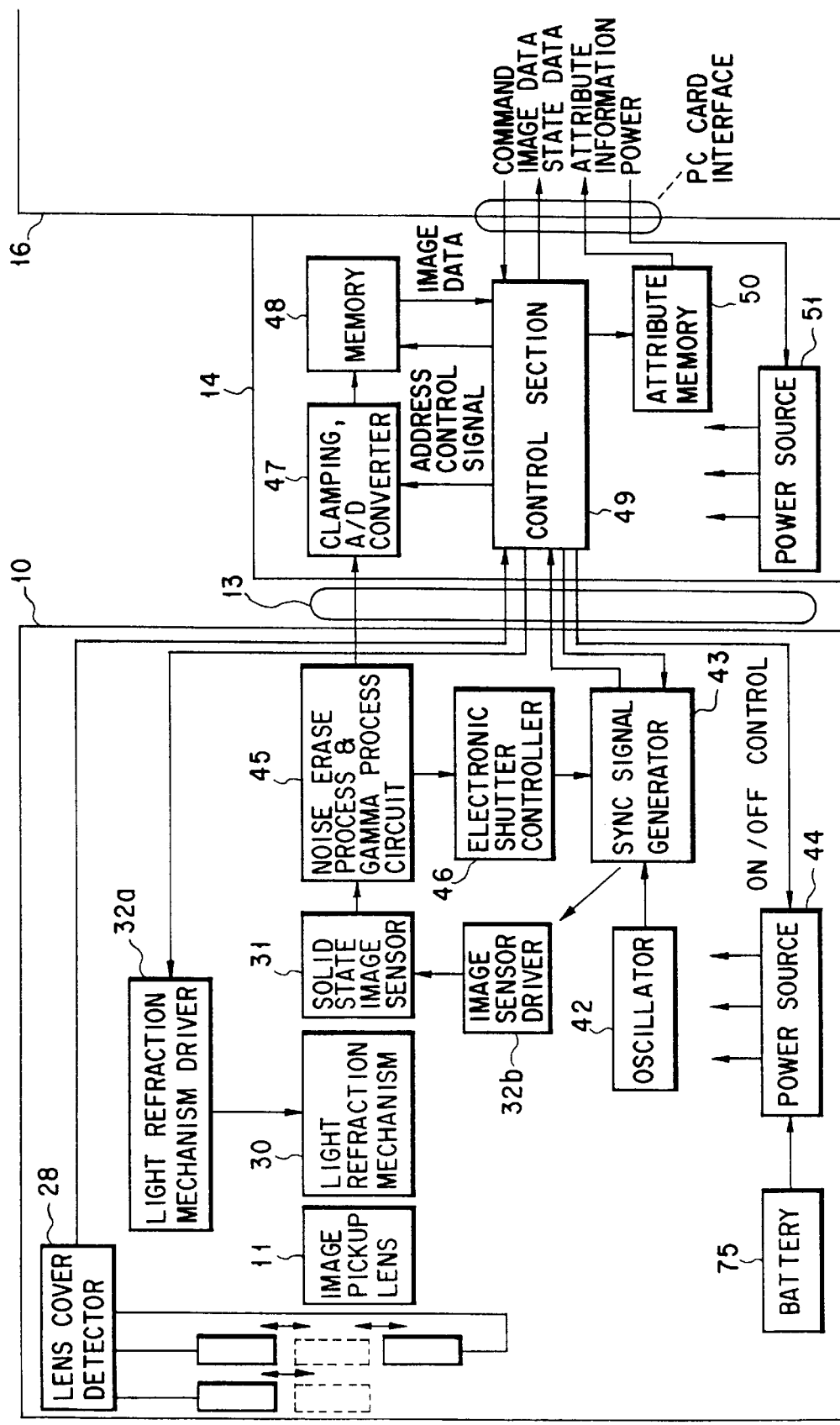
F I G. 27

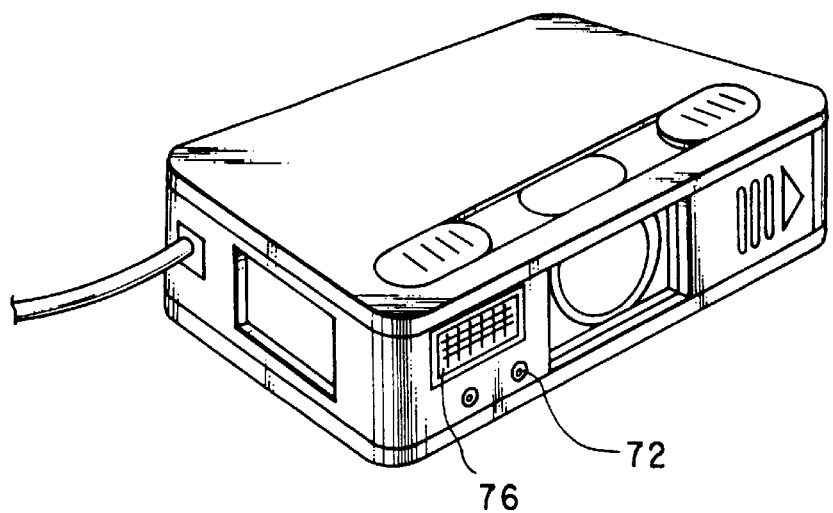
F I G. 28
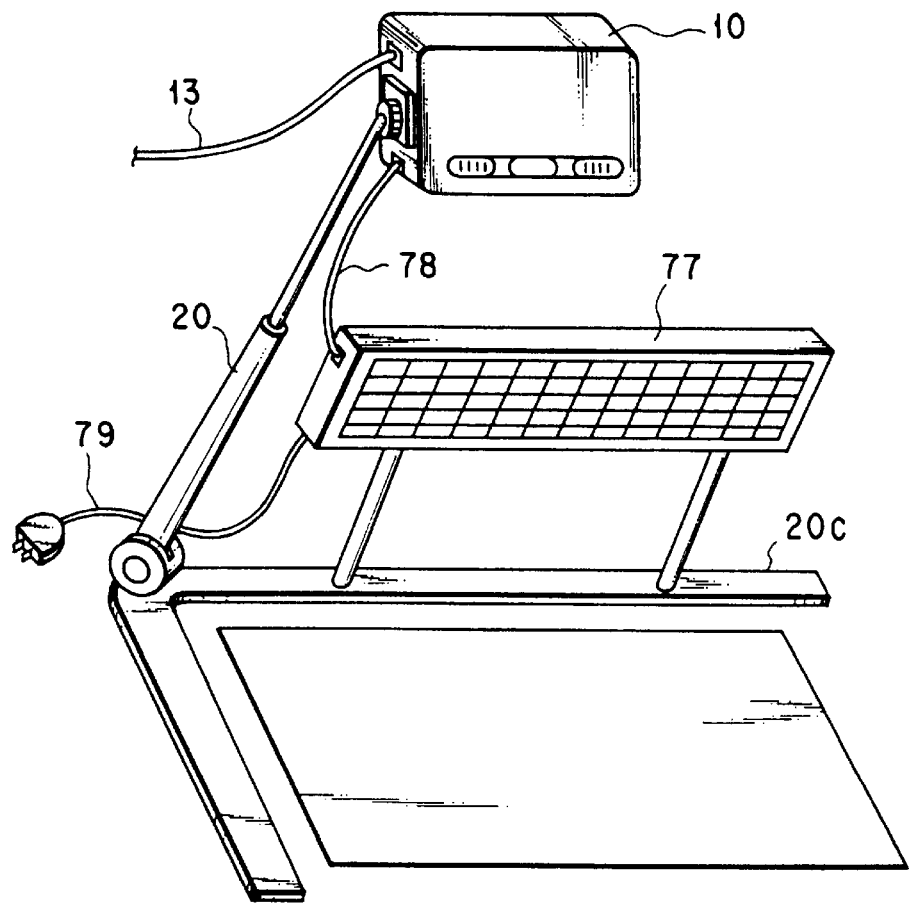
F I G. 29

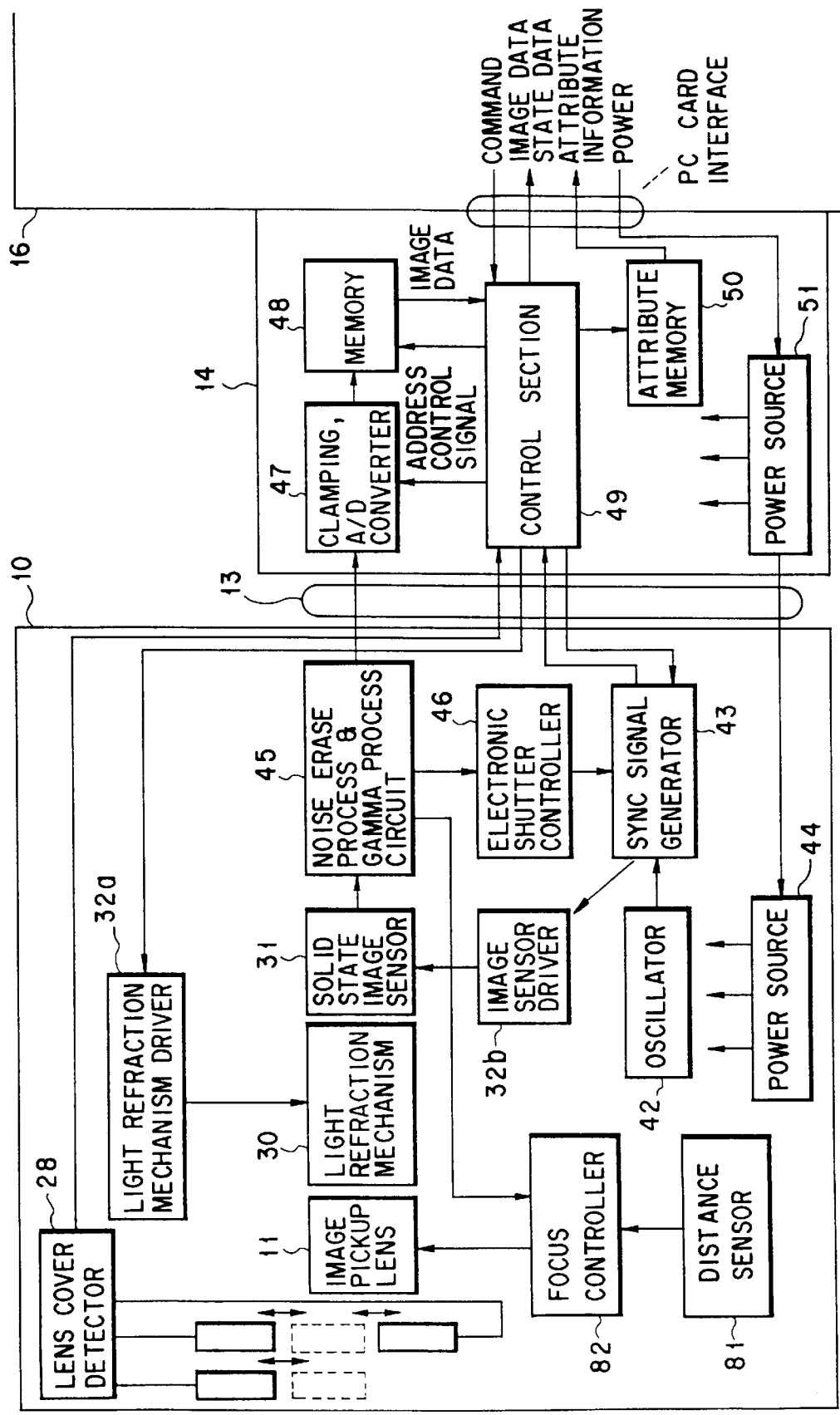
F I G. 30

FIG. 31A
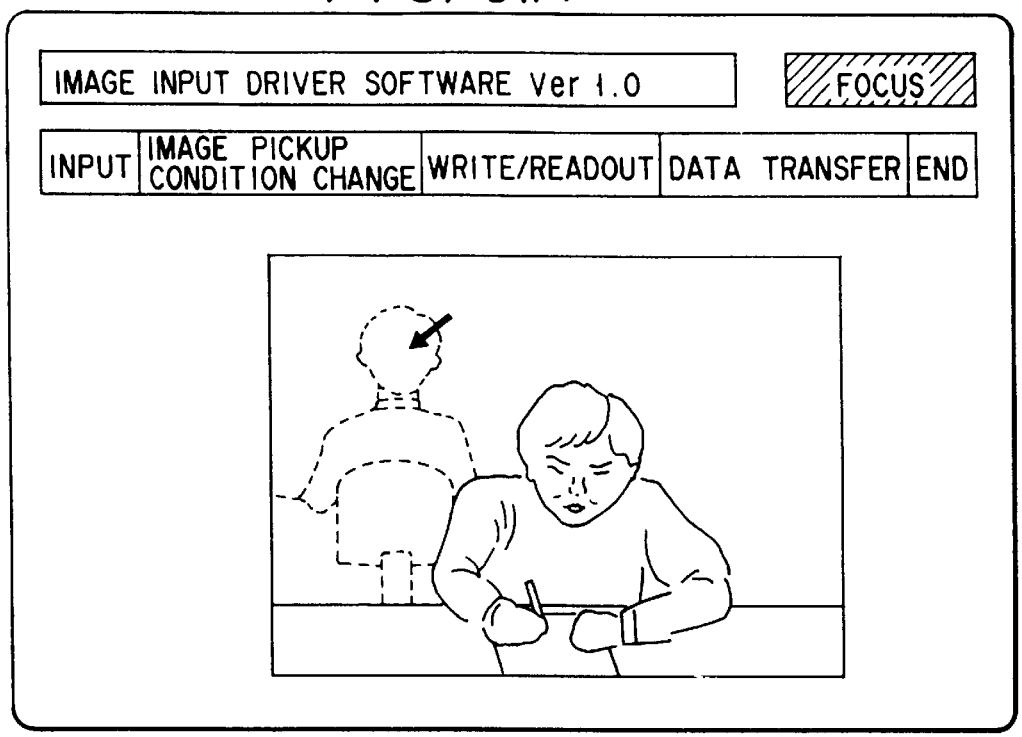
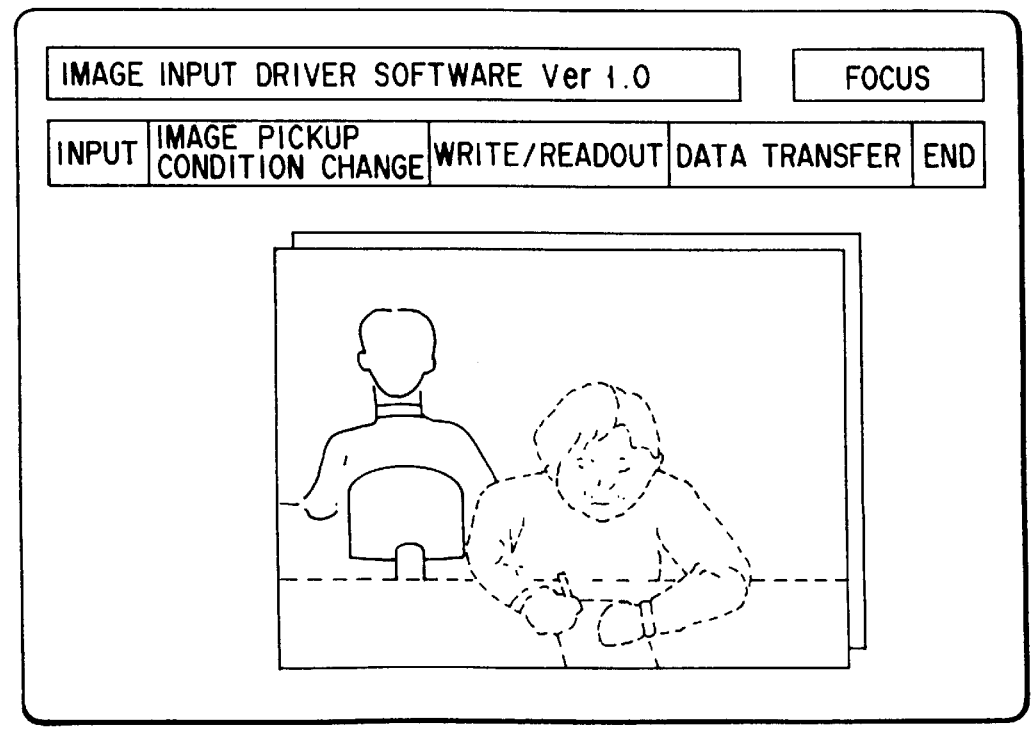
FIG. 31B

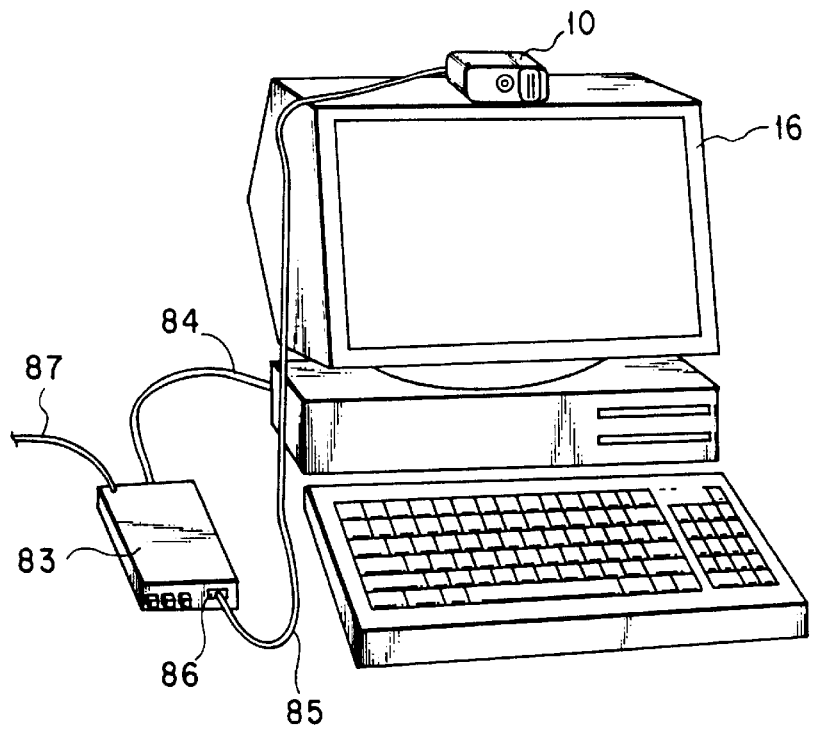
F I G. 32
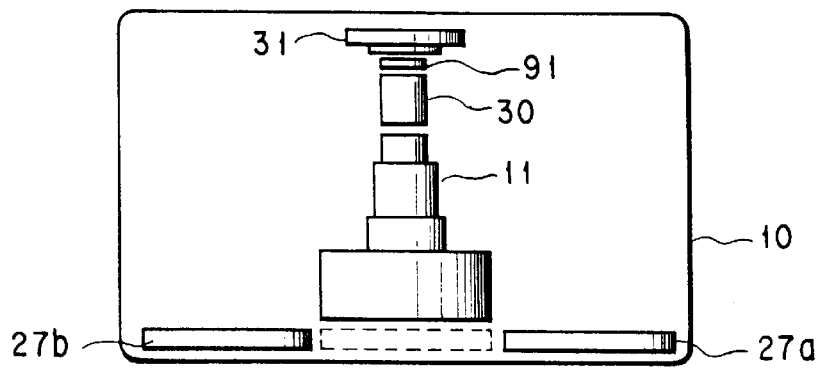
F I G. 34A
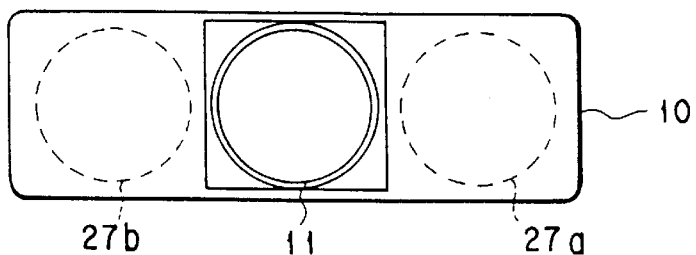
F I G. 34B

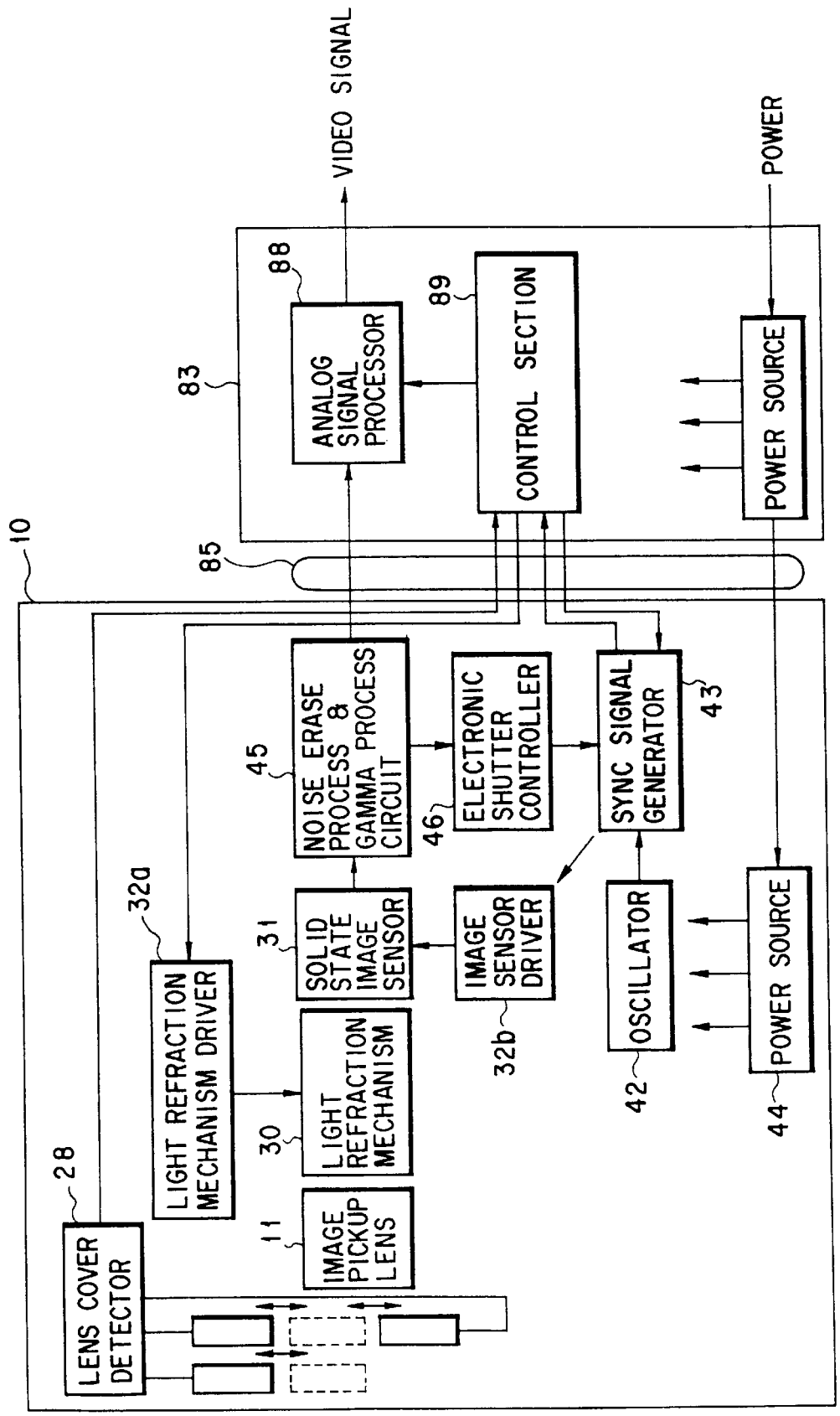
F I G. 33

--→ MAGNETIC FORCE APPLIED ON COIL
—→ FORCE GENERATED BY COIL

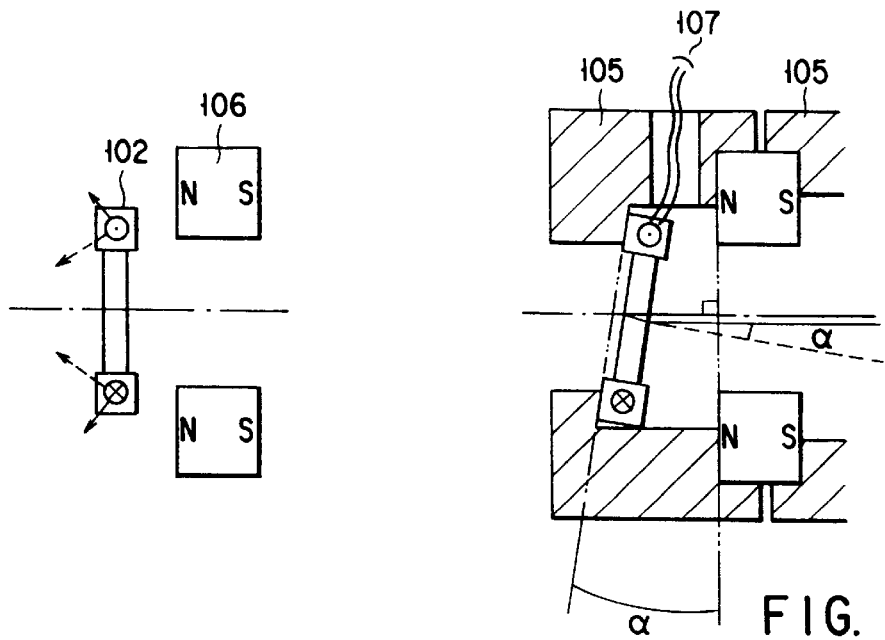
FIG. 40A
FIG. 40B
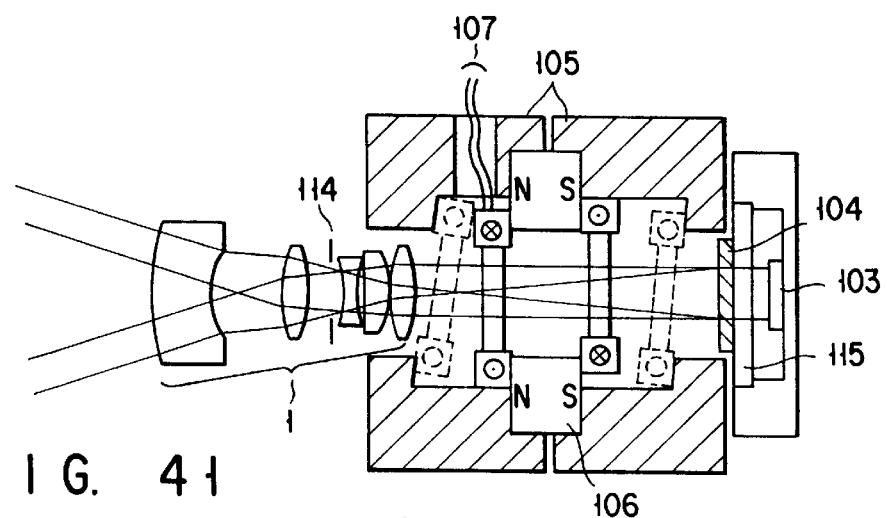
FIG. 41
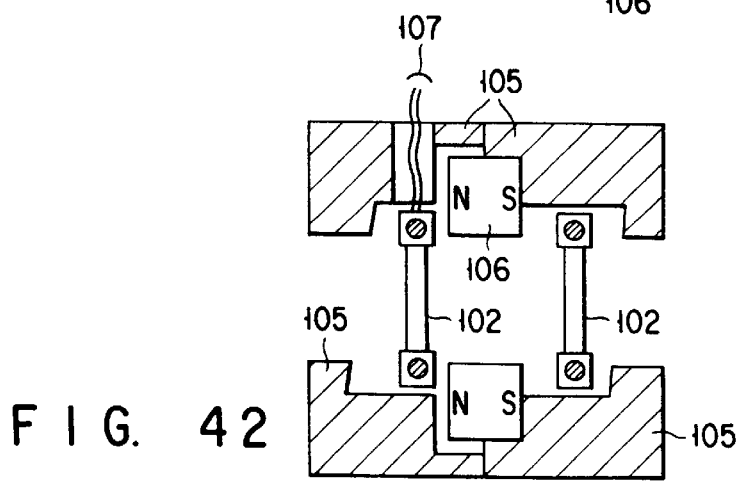
FIG. 42

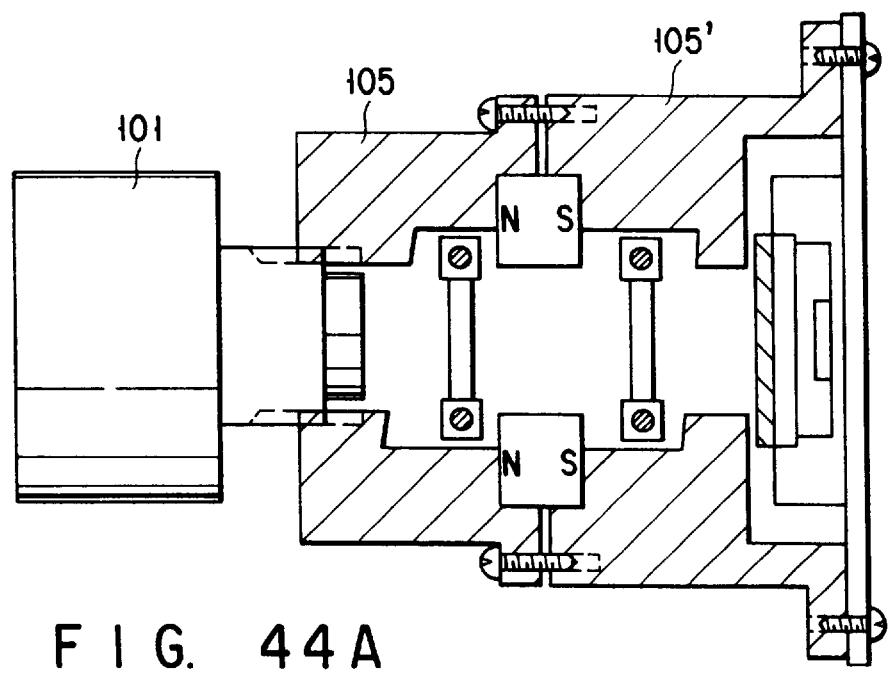
F I G. 44A
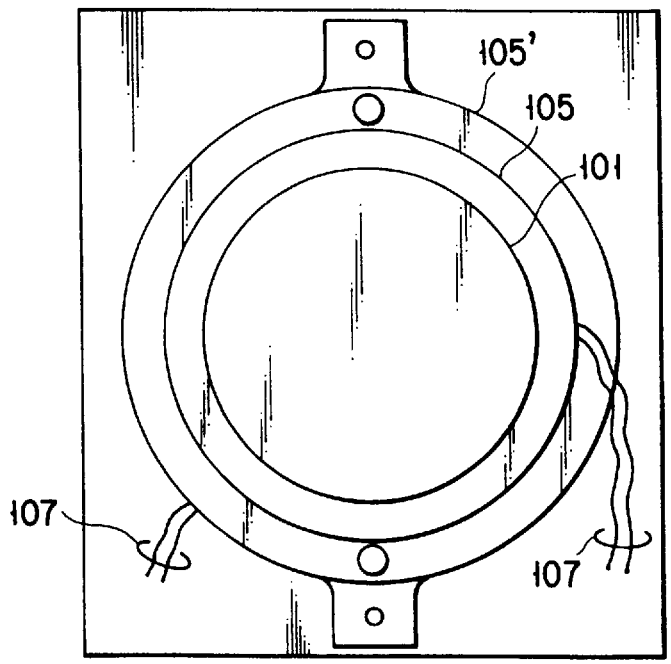
F I G. 44B

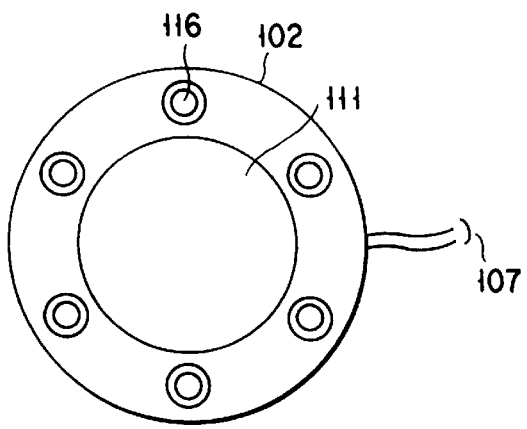
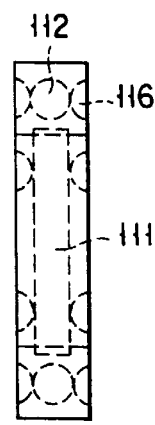
FIG. 45A    FIG. 45B
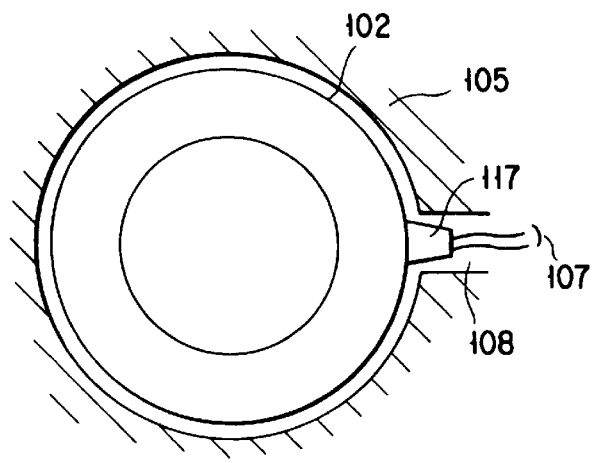
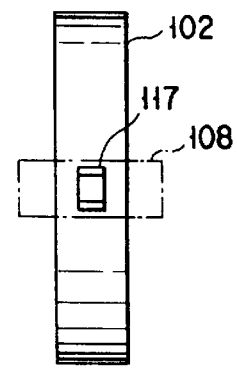
FIG. 46A    FIG. 46B
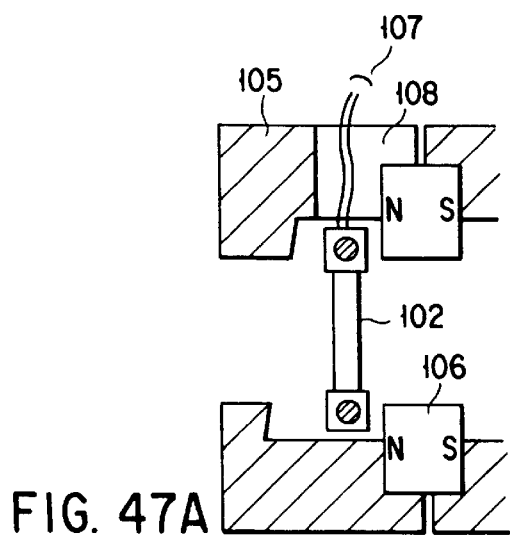
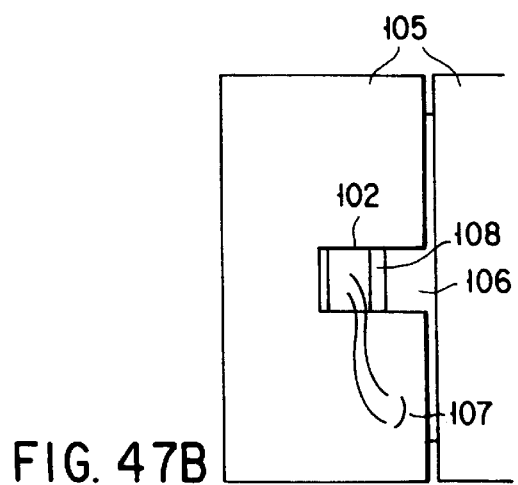
FIG. 47A    FIG. 47B

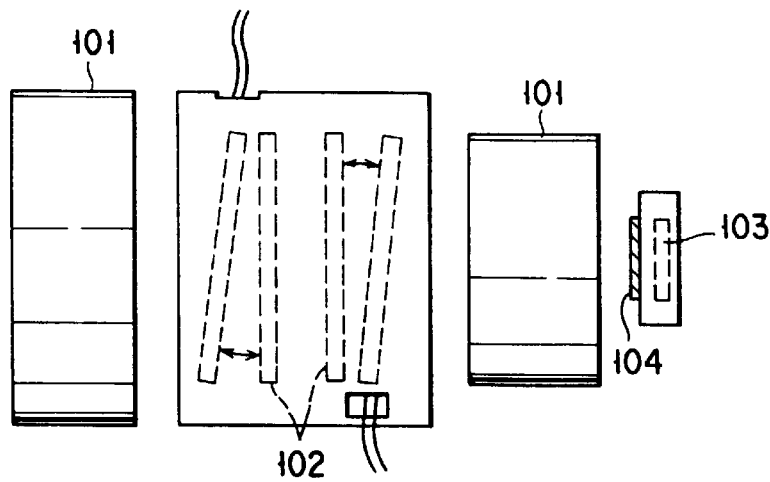
F I G. 76
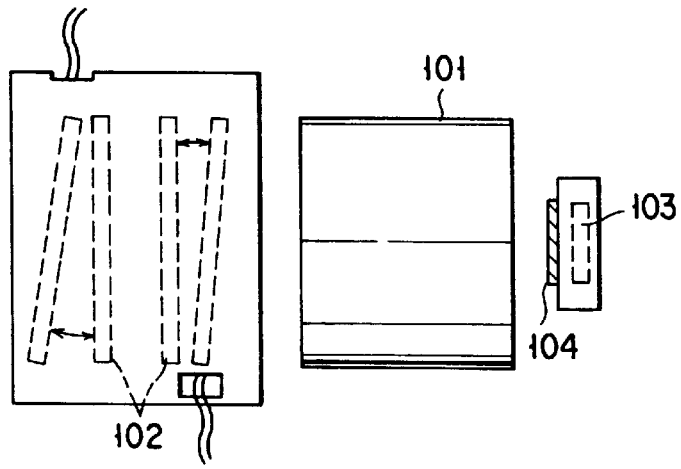
F I G. 77
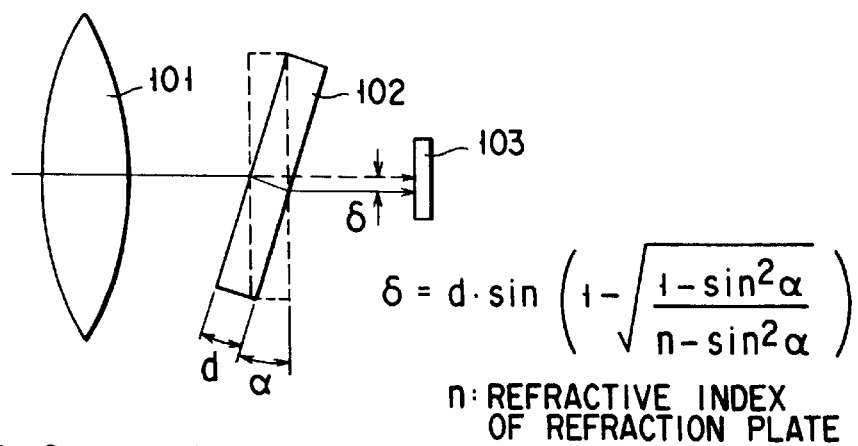
$$\delta = d \cdot \sin\left(1 - \sqrt{\frac{1-\sin^2\alpha}{n-\sin^2\alpha}}\right)$$
n: REFRACTIVE INDEX OF REFRACTION PLATE
F I G. 78

IMAGE INPUT APPARATUS FOR CAPTURING IMAGES OF MULTIPLE RESOLUTIONS

BACKGROUND OF THE INVENTION

1. Field of the Invention

The present invention relates to an image input apparatus which comprises a camera head using a solid state image sensor and a controller connected to the camera head by a cable, to input a digital image signal to a computer machine via the controller.

2. Description of the Related Art

Recently, it is required to input image to a personal computer. There are a method for inputting the image to the personal computer using home video cameras (camcoders) and floppy type electronic still cameras and a digitizer or video capture board for converting the analog signal to a digital signal as an interface, and a method for inputting the image to the personal computer using a digital still camera using a memory card and a dedicated interface unit or a digital still camera containing a semiconductor memory and a dedicated cable.

The solid state image sensors used for the home video cameras or the electronic still cameras have about 250,000 or 400,000 pixels. However, the number of the pixels cannot provide a sufficient resolution in obtaining a still picture. Furthermore, the digitizer, video capture board or dedicated interface are required, resulting in increasing cost of the television system. If a specific interface is used as the digital interface, it cannot be applied for general purpose. In other hands, a standard interface has large-size connectors and a very low transfer rate. When the camera is connected to the computer, the power of the computer must be temporally turned off.

Triple-tube type cameras or triple-plate type CCD cameras which is of a high resolution is not portability and is high in cost since its optical system is bulky. Although flat type scanners have high resolution and high image quality, it has no portability and cannot pick up document images. Handy type scanners can pick up only document images.

SUMMARY OF THE INVENTION

It is an object of the present invention to provide an image input apparatus with low cost, portability, high resolution and functions capable of simply interfacing.

According to the present invention, there is provided an image input apparatus adapted to capture images at different resolutions in cooperation with host equipment comprising: a camera head unit having a solid-state image sensor, a taking lens assembly for imaging a picture of a subject onto the solid-state image sensor, a light refracting member interposed between the taking lens assembly and the solid-state image sensor for changing the direction of light passing therethrough, and means for reading an image signal from the solid-state image sensor; a control unit removably attached to the host equipment and having means for sending instruction signals from the host equipment to the camera head unit and image signals from the camera head unit to the host equipment; and cable means for connecting the camera head unit and the control unit.

According to the present invention, there is provided a light-refracting device used for an image input apparatus comprising: a light-refracting unit comprising a light-refracting disc and a coil wound around a circumferential surface of the disc; a ring-shaped magnet for attracting or repelling the light-refracting unit in accordance with a direction in which an electric current is passed through the coil of the light-refracting unit; and a positioning member for inclining the light-refracting unit at a first angle to an optical axis when the unit is attracted to the ring-shaped magnet and a second angle to the optical axis when the unit is repelled from the ring-shaped magnet.

BRIEF DESCRIPTION OF THE DRAWINGS

FIG. 1 is a perspective view of an imaging system including an image input apparatus embodying the present invention;

FIG. 2 is a block diagram of an electronic still camera according to an embodiment of the present invention;

FIG. 6 is a schematic illustration of the optical system of the camera head of the image input apparatus of FIG. 1;

FIGS. 7A to 7D illustrate the image input apparatus including the PC card in the imaging system of FIG. 1, FIG. 7A showing the block diagram of the image input apparatus including the PC card, FIG. 7B a flowchart for image input in the system of FIG. 7A, FIG. 7C a first example of the image data memory section in the PC card, and FIG. 7D a second example of the image data memory section in the PC card;

FIG. 8 is a perspective view of an imaging system using a camera head having built-in close-focusing lenses, which is an embodiment of the present invention;

FIG. 9 is a perspective view of the camera head having built-in close-focusing lenses;

FIG. 10 is a perspective view of the camera head when one of the close-focusing lenses is in use;

FIG. 11 is a perspective view of the camera head when the other close-focusing lens is in use;

FIG. 12 is a perspective view of the optical system of the camera head of FIG. 9;

FIG. 15 shows a data pattern stored for correcting a document-like subject;

FIG. 16 is a perspective view of a camera head equipped with one close-focusing lens;

FIG. 19 is a block diagram of an imaging system including a PC card having a digital signal processing circuit;

FIG. 21 shows controls of software on the display screen;

FIG. 23 is a block diagram of an imaging system including a camera head having a diaphragm mechanism;

FIG. 24 is a diagram for use in explanation of a process of lengthening the storage time in a solid-state image sensor;

FIG. 26 is a state transition diagram of an embodiment having a low-power mode;

FIG. 27 is a block diagram of an imaging system including a battery-powered camera head;

FIG. 28 is a perspective view of a camera head having a built-in flash unit;

FIG. 29 is a perspective view of an imaging system which uses an external illumination apparatus and a camera head in combination;

FIG. 30 is a block diagram of an imaging system including a camera head having an autofocusing function;

FIG. 31 shows display images on the screen of a personal computer when autofocusing is activated;

FIG. 32 is a perspective view of an imaging system in which a camera head is attached to an SCSI adapter;

FIG. 33 is a block diagram of the imaging system of FIG. 32;

FIGS. 34A and 34B show the placement of internal components of a flat camera head;

FIGS. 40A and 40B are diagrams, also explaining the operating principle of the light-refracting section of the device shown in FIG. 35;

FIG. 41 is a diagram explaining how light is applied to the light-refracting device;

FIG. 42 is a sectional view of another type of a hollow cylindrical housing for use in the invention;

FIGS. 44A and 44B are a partial sectional view and front view of the light-refracting device, the lens section and the CCD section;

FIGS. 45A and 45B are a front view and side view of a light-refracting member for use in the light-refracting device;

FIGS. 46A and 46B are a front view and side view of another type of a light-refracting member for use in the light-refracting device;

FIGS. 47A and 47B are a sectional view and side view of another light-refracting device according to the invention, illustrating a slit which is cut in the front housing half of the device and through which the end portions of a coil are led outwards;

FIG. 76 is a side view of an image input apparatus comprising two lens units, one image sensor and one light-refracting device according to the invention;

FIG. 77 is a side view of an image input apparatus comprising one lens unit, one image sensor and one light-refracting device according to the invention; and FIG. 78 is a diagram explaining a method of inclining a glass plate used as a light-refracting member in a conventional light-refracting device.

DETAILED DESCRIPTION OF THE PREFERRED EMBODIMENTS

Figure 3A:
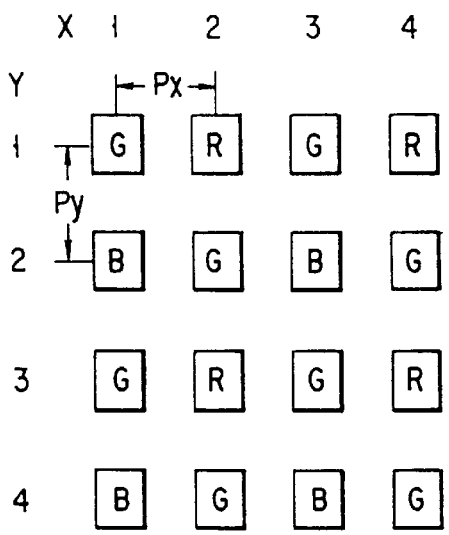
FIGS. 3A and 3B are diagrams for respectively explaining a different color filter array used in this invention and how the color filter array is moved.

The embodiments of an image input apparatus having an electronic still camera will be described with reference to the drawings.

Referring to FIG. 1, the image input apparatus 1 comprises a camera head 10 having a taking lens assembly 11 and a solid-state image sensor, such as a charge-coupled device (CCD), and a control unit 14, serving as an interface, in the shape of a PC card, the camera head and the control unit being connected together by a cable 13. Hereinafter, the control unit 14 will be referred to as the PC card. The PC card 14 is inserted into a PC card slot 15 of a personal computer 16 for connection thereto. Software is installed in the personal computer 16 to run the image input apparatus 1. The user makes a selection from commands displayed on the display screen 17 of the personal computer through the use of a keyboard 18 or a mouse 19 and controls the image input apparatus 1.

An image signal picked up by the camera head 10 is digitized by an analog-to-digital converter in the PC card 14 and then stored temporarily in an on-board memory of the PC card. The image data is fed into the personal computer 16 and displayed on the display screen 17 of the personal computer after signal processing. As shown in FIG. 2, the contents of the software appear on the display screen of the personal computer.

As shown in FIG. 1, in front of the lens 11 is provided a slidable cover 12 which protects the lens when not in use. The camera head is formed, at its side, with a mounting slot 21 for attachment to a stand 20. By using this stand, the camera head can be fixed at the image input time. The image input apparatus of the present invention permits the resolution to be increased by shooting the same subject several times (performing several image input operations) with the camera head fixed. This resolution increasing technique was described in detail in U.S. Pat. No. 5,402,171.

Figure 3B:
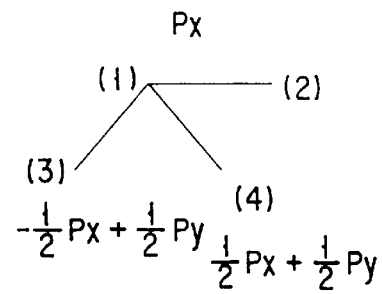
Figure 4A:
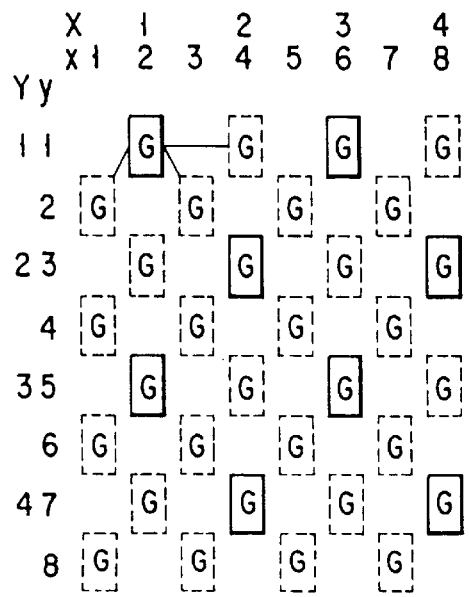
FIGS. 4A and 4B are diagrams illustrating an equivalent color filter array when a solid state image sensor with the color filter array shown in FIG. 3A is used in HD mode.
Figure 4B:
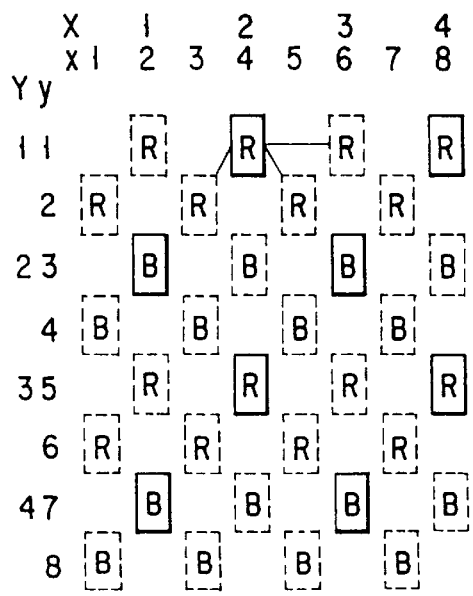

The electronic still camera 1 of FIG. 1 is configured as shown in FIG. 2. The built-in solid-state image sensor, i.e., CCD 1, has a great number of filter elements arrayed in such a matrix pattern as shown in FIG. 3A. An image formed on the CCD 1 is shifted in such a shift pattern as shown in FIG. 3B. By such image shifting, an equivalent array of G filter elements as shown in FIG. 4A and an equivalent array of R/B filter elements as shown in FIG. 4B can be obtained.

In the camera head 10 of FIG. 2, the small light refracting member 12 is disposed in front of the solid-state image sensor 1. If, therefore, the image formed on the image sensor having the color filter element array of FIG. 3A is shifted finely to four positions (1), (2), (3) and (4) as shown in FIG. 3B and an image signal is read in each position, then the resulting pixels will have such equivalent arrays as shown in FIGS. 4A and 4B. Due to signal processing of image signals thus obtained, the resulting color still image will apparently have four times the pixels of the solid-state image sensor. The color filter element array also permits a color still image to be created from a normal image signal that is obtained in a single read operation without refracting light.

In FIG. 2, the output of the color solid-state image sensor 31, which is driven by the driver 32, is connected to the buffer memory 36 through a series combination of the preprocessing circuit 34 and the A/D converter 35, both of which are controlled by sync signals from the sync signal generator 33. Also, the driver 32 is coupled to the light refracting member 30 and drives it. The buffer memory 36 is controlled by the memory controller 37 connected to receive sync signals from the sync signal generator 33. The buffer memory 36 is connected through the signal processor 8 to the recording medium 39 such as a semiconductor memory. The output of the mode selector 40 is connected to the sync signal generator 33. The light refracting member 30 comprises a plurality of parallel glass sheets, the angle of the parallel glass sheets with respect to the optical axis of the taking lens assembly and the solid-state image sensor 31 being varied to thereby change the imaging position where the picture of a subject is imaged on the solid-state image sensor 31.

Figure 5:
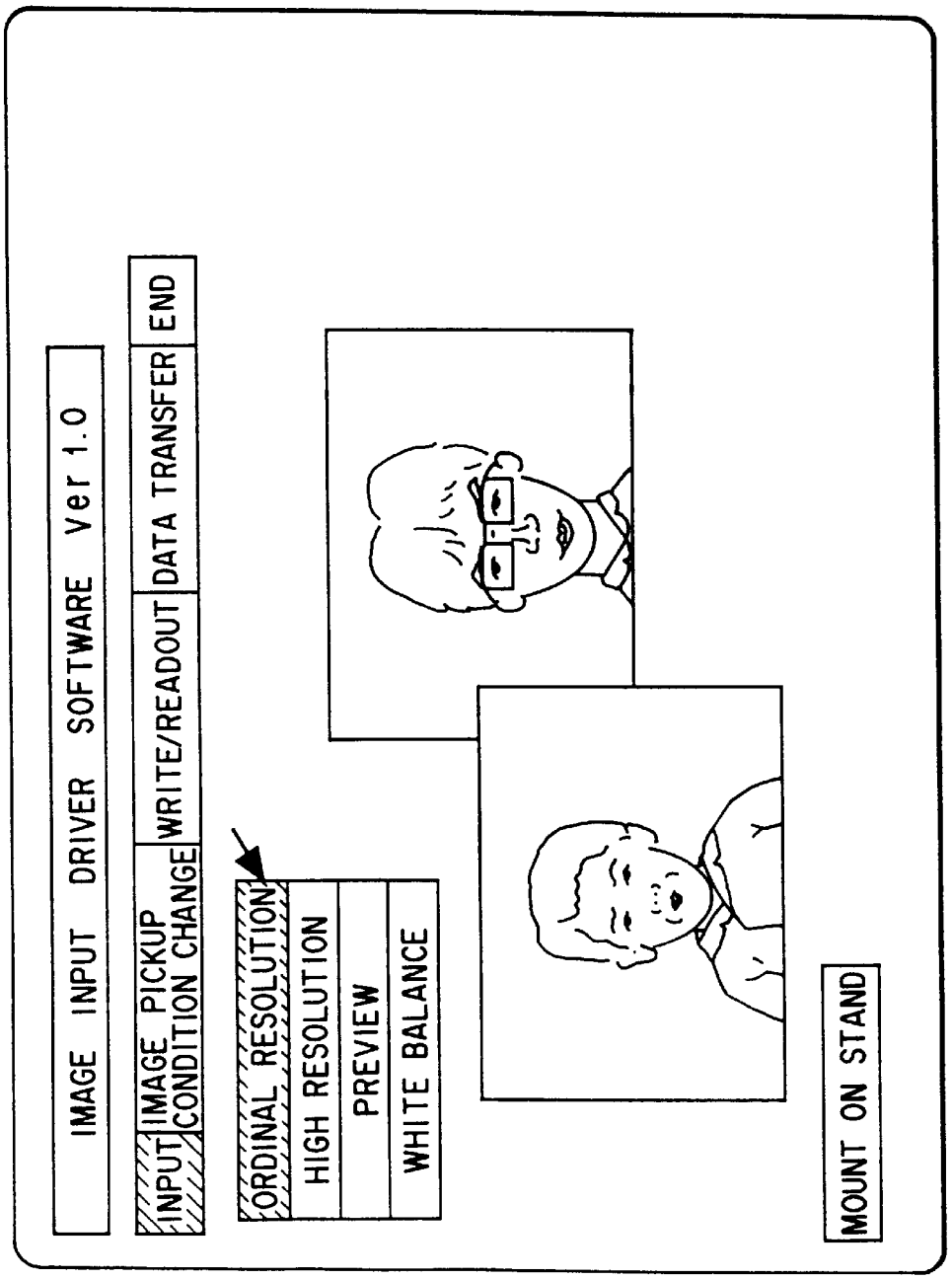
FIG. 5 shows an example of an image displayed on the display screen of the personal computer of FIG. 1.

The present embodiment incorporates the electronic still camera configured as described above into an image input apparatus for personal computers. In this case, a user is allowed to choose an item from an onscreen menu of the personal computer shown in FIG. 5 with a cursor or pointer to determine which of normal resolution image data and high-resolution image data to be captured. When the normal resolution is chosen, a single image is captured without image shifting. This image is one frame of picture or one field of picture, depending on whether the solid-state image sensor is placed in the frame storage or field storage mode. When the high resolution is chosen, four frames of picture are captured in sequence; the first picture is captured when the optical image is in the original position (1) shown in FIG. 3B, the second picture is captured after the optical image has been shifted from the first position (1) to the second position (2), the third picture is captured after the optical image has been shifted from the second position (2) to the third position (3), and the fourth picture is captured after the optical image has been shifted from the third position (3) to the fourth position (4). Note that there is no restriction on the order in which the four pictures are captured. In other words, the order in which the optical image is shifted to each of the above four positions is arbitrary.

The image data captured in that manner is fed into the personal computer 16 where it is subjected to normal resolution signal processing or high-resolution signal processing, depending on the previous choice made by the user. As shown in FIG. 6, the light refracting member 12 uses two parallel glass sheets 41a and 41b each of which is permitted to change its angle with respect to the optical axis of the lens 11 and the solid-state image sensor 1, whereby an optical image on the image sensor is shifted. The glass plate 41a is adapted to shift an optical image on the solid-state image sensor 1 horizontally by one pixel, while the glass plate 41b is adapted to shift the optical image diagonally by one-half pixel in the horizontal direction and by one-half pixel in the vertical direction.

FIG. 7A is a block diagram of an image input apparatus in which a differently configured electronic still camera is used in the image input apparatus of FIG. 1. The camera head includes a light refraction mechanism 30, a solid-state image sensor 31, an oscillator 42, a sync signal generator 43, an image sensor driver 32b, and a power supply circuit 44 for generating necessary potentials to the solid-state image sensor 31. In addition, there are provided a light refractor driver 32a, an analog signal processor 45 which performs noise removal processing and gamma processing on an image signal read from the solid-state image sensor, and an electronic shutter controller 46. The power supply circuit 44 uses a DC source powered from the personal computer 16 via the PC card 14 and the cable 13 to generate necessary potentials to the solid-state image sensor. The power supply circuit is turned on and off by a power control signal from the PC card 14.

The camera head 10 is connected by the cable 13 to the PC card 14, which includes an A/D converter 47 which converts an analog image signal into digital image data, a memory 48 which stores the image data temporarily, a controller 49 which controls the whole image input apparatus 1, and an attribute memory 50 which stores the attribute of the PC card. The controller 49, which is adapted for connection to the personal computer PC card interface, operates the camera head, sets its state, writes into or reads from the memory 48, generates control signals to the light refractor 30, and presents the state of the camera head to the personal computer as instructed by the personal computer. The memory 48 in the PC card serves as temporary storage for passing image data to the personal computer. That is, the memory is written into by sync signals generated in the camera head and read from by read signals from the personal computer for data transfer thereto. The power supply circuit 51, which is itself powered from the power supply in the personal computer, supplies power various circuit components in the PC card.

Figure 7B:
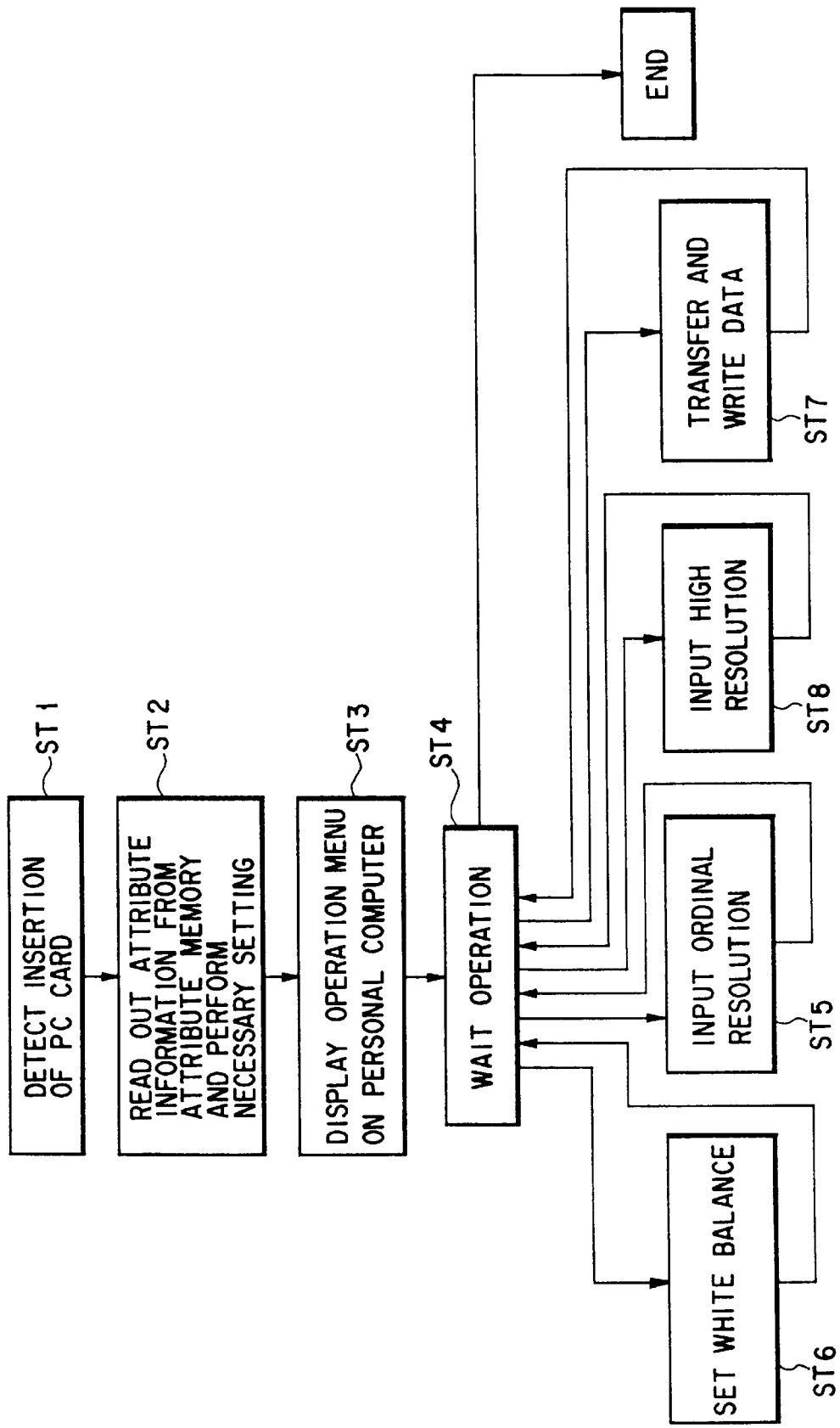

FIG. 7B is a flowchart for image input from the image input apparatus 1 in the above embodiment.

When the PC card 14 is inserted into the personal computer 16 which is equipped with the PC card slot 15 and has the PC-card-handling BIOS installed, the personal computer detects the PC card insertion (ST1), reads from the attribute memory 50 in the PC card 14, and activates the software for the image input apparatus 1 that is installed in the personal computer (ST2). This software reserves necessary memory space in the personal computer and sets IO space and memory space in the PC card. Then, the software displays commands and the state of the image input apparatus on the display screen 17 of the personal computer (ST3). The personal computer is then placed in the wait state until the next operation is performed (ST4).

The user points the camera head 10 toward a subject and specifies to the personal computer 16 which type of image (normal resolution or high resolution) is to be captured. This command is sent to the camera head via the controller 49 in the PC card 14. When the normal resolution is selected (ST5), one frame of picture signal is read from the solid-state image sensor 31, converted into digital image data, then stored in the memory 48 temporarily. After that, the image data is fed into the personal computer, subjected to signal processing by software, then displayed on the display screen 17 of the personal computer. For signal processing, the user is allowed to make a choice from among white balance settings prepared by the software (ST6). When no choice is made, the default setting or the last setting used will be selected. Alternatively, as with normal video cameras (camcorders), the user is allowed to set the white balance coefficients by placing a white subject in front of the camera head and capturing the image of this subject. In this case, the auto setting would also be possible. If the transfer of image data to the personal computer and the subsequent signal processing could be performed very fast, reading successive image signals from the solid-state image sensor and displaying them on the display screen of the personal computer would provide jerky-motion video or full-motion video.

For the transfer of image data from the image input apparatus 1 to the personal computer 16, the user is allowed to specify either a single transfer or successive transfers. For picture quality as well, a variety of pieces of software are prepared which are adapted for monochrome signal processing which handles only a luminance signal, simplified color signal processing which requires less processing time although the picture quality is somewhat degraded, normal color signal processing which requires more processing time although the picture quality is good, and reduction-picture signal processing which increases the speed with which a picture is output though display resolution is reduced. The user is allowed to make a choice from these pieces of software, depending on the purpose of using a picture or circumstances. As to the reduction picture signal processing, there are two approaches: (1) an image of data is transferred from the PC card 14 to the personal computer 16 for subsequent reduction processing, and (2) only part of image data is transferred from the PC card to the personal computer. The personal computer 16 specifies to the PC card 14 how the data is to be transferred. The controller 49 in the PC card reads data from the memory 48 accordingly. Such processing is performed in step ST7.

The input of a high-resolution picture in step ST8 is limited to still pictures because, in this case, an image is captured four times with optical paths shifted. Four frames of image data are transferred to the personal computer, then subjected to signal processing for display on the screen as requested by the user. For the input of four frames of image data and transfer thereof to the personal computer, the PC card 14 may have a memory 48a with a storage capacity large enough to store four frames of image data as shown in FIG. 7C. Alternatively, as shown in FIG. 7D, the PC card may have a memory 48a having a storage capacity to store one frame or one field of image data, in which case image data will be captured, stored in the memory 48b and then transferred to the personal computer on a frame-by-frame or field-by-field basis. With this approach, a required amount of memory is decreased and hence the hardware cost is lowered.

The amount of processing required to capture high-resolution pictures is larger than with normal resolution, thus requiring a long time to output high-resolution pictures. For this reason, it is desired that the range of a subject to be captured be checked beforehand by the use of the signal processing for normal resolution pictures, which will result in increased efficiency of signal processing. Here, this operation is called preview. The preview is performed merely to see the framing range of a subject. Thus, the use of the simplified signal processing or signal processing that permits a picture, such as a reduction picture, to be output at high speed as the signal processing for the preview will reduce the time required for the preview.

FIG. 8 shows an image input apparatus of another embodiment. This embodiment uses a camera head with a built-in close-focusing lens for the purpose of reading document-like subjects such as papers, photographs, magazines, books, and brochures. The camera head 20 is mounted to a stand 20 and is used with its lens directed toward a document 22 below.

FIG. 9 is an exterior view of the camera head 10. In this embodiment, the camera head 11 has two different close-focusing lenses 23 and 24 built in on both sides of the taking lens 11. To capture a subject in the form of an A5-size document, a slide lever 25 is first operated to position the close-focusing lens 23 adapted for A5 in front of the lens 11. The camera head is then fixedly mounted to the stand and the distance between the camera head and the subject is adjusted to a predetermined distance. Thereby, the camera head is permitted to capture the entire A5 document or the A5 range of a document with a normal resolution or a high resolution. The camera head is further provided with the close-focusing lens 24 adapted for A6 size. By adjusting the height of the stand with the close-focusing lens 24 placed in front of the lens 11 as shown in FIG. 11, the camera head is permitted to capture the A6 range. The camera head is arranged such that its optical system is positioned in its central portion and the close-focusing lenses are slidable in common grooves in such a way that one of them is placed in front of the optical system when in use, thus preventing the close-focusing lenses from being superimposed one on top of the other and permitting three types of photography to be performed: photography without a close-focusing lens, photography with the A5-range close-focusing lens and photography with the A6-range close-focusing lens.

As shown in FIG. 12, the camera head may be provided with detect switches 27a, 27b and 27c for detecting the positions and states of close-focusing lens 25 and 26 and a cover 12, and a lens cover detector 28. In this case, detect information is transferred to the personal computer to display the states of the cover 12 and the close-focusing lenses 25 and 26 and alert the user of improper usage therefor. This can decrease wrong use. The slide grooves for the close-focusing lenses are different from those for the cover.

Figure 13:
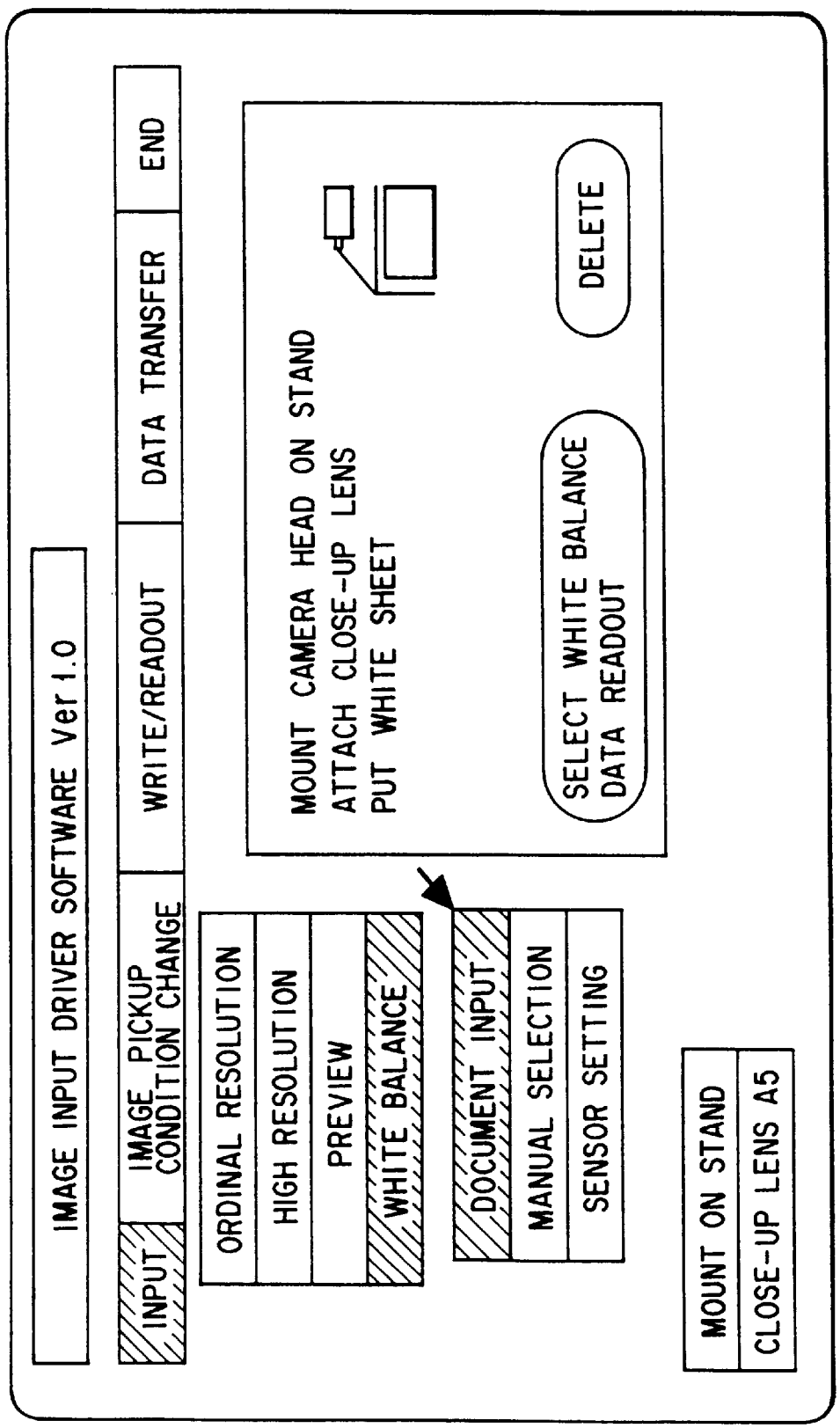
FIG. 13 shows controls of software on the display screen.
Figure 14:
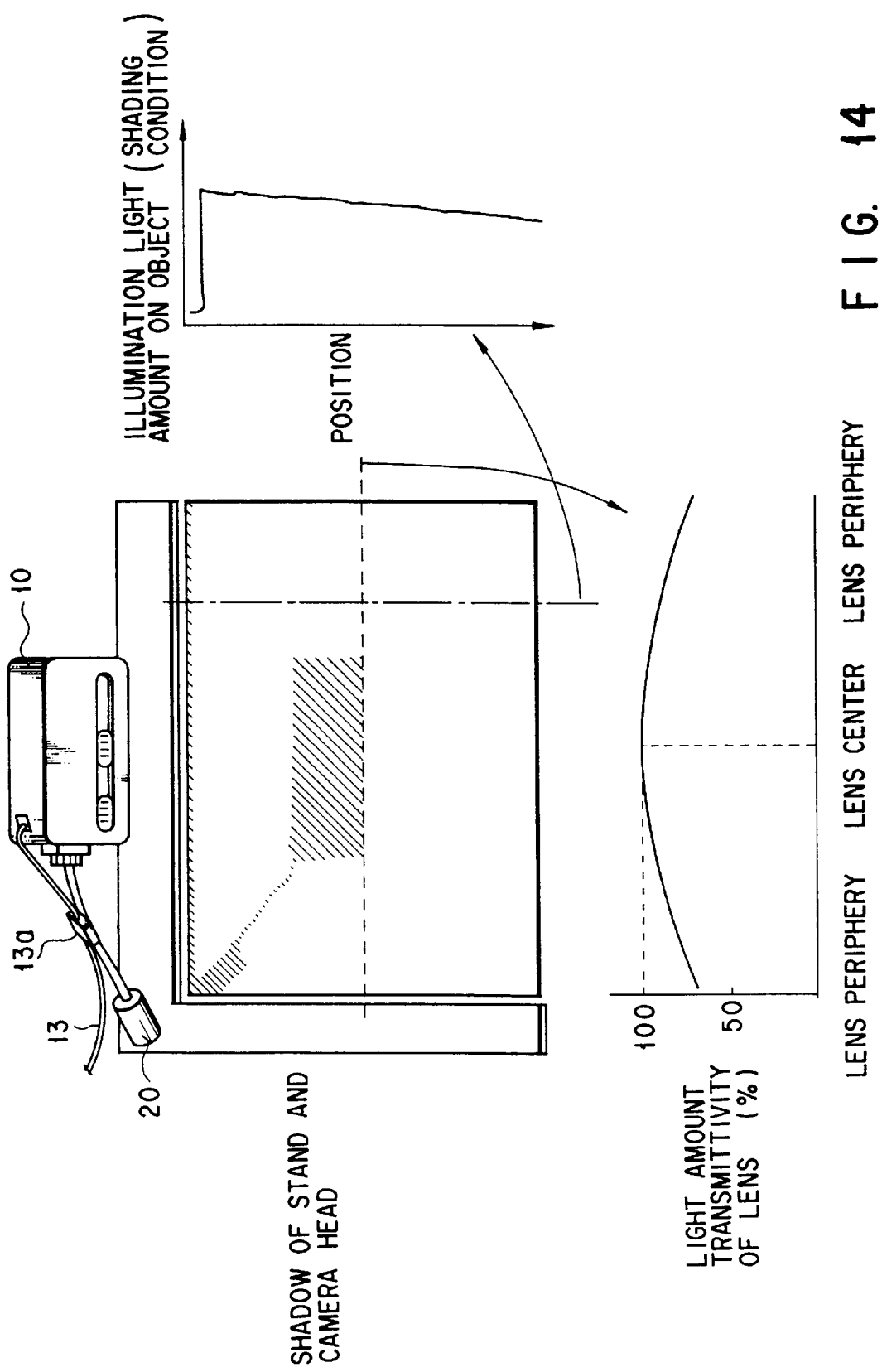
FIG. 14 is a diagram for use in explanation of shadows and the state in which the level of light passing through the lens decreases in its periphery.

As described above, the combined use of the camera head with built-in close-focusing lenses and the stand permits the document-like subject 22 to be easily entered into the personal computer as image data. The way the subject is entered into the personal computer is essentially the same as the flowchart of FIG. 7A. If, when document-like subject 22 is to be entered white balance is set on the basis of the white balance setting displayed on the software display screen 17, then an image with a higher resolution will be entered. As shown in FIG. 13, the display screen 17 prompts the user to use a stand and set a sheet of white paper. Thus, the user mounts the camera head to the stand 20, sets a sheet of white paper and then adjusts the height of the stand to the document-like subject 22 to be captured. Then, the user selects a white balance data capture command on the display screen 17. The captured data for white paper is fed into the personal computer, then analyzed, whereby white balance coefficients are calculated or one of white balance signal processes prepared in advance is selected. The selected signal processing is performed on subsequent image signals for subjects to be entered actually. For the white paper data, all data or a portion of it is stored and used to compensate for decreases in light transmission in the periphery of the lens, shading due to changes in illumination conditions, and shadows of the stand and the camera head on the subject as shown in FIG. 14.

As an example of storage of a portion of white paper data, FIG. 15 shows a case where data at selected sampling points in a grid is stored. By storing selected points in this way, the amount of data to be stored can be reduced significantly. The processing of setting white balance can be omitted. In this case, default white balance coefficients and default correction values for peripheral light transmission level may be applied. Alternatively, the user may make a choice from a plurality of software-prepared white balance conditions.

Next, the user performs a preview operation to check the scope of an image captured by the camera head (frame checking). The captured image is output onto the personal computer. If the normal-resolution signal processing is selected for the preview as described previously, then the captured image will be output on the screen of the personal computer faster for frame checking. At the termination of the preview, the user enters a read command to meet his or her needs. For example, suppose that the user desires to fax a document-like subject containing characters only. Then, image data is entered at a high resolution, subjected to black-and-white signal processing, and then output on the display screen 17 of the personal computer 16. The user checks the displayed image and enters a fax command if it is satisfactory. At this point, the personal computer or its associated peripheral equipment performs predetermined data compression on image data and then sends it to the receiving end over a communications line. Next, suppose that the user desires to store a color photograph. Then, the user selects color image capture at either a high or normal resolution. After subjected to color signal processing at the selected resolution, a color image is output on the display screen of the personal computer. The user simply checks the displayed color image and, if it is satisfactory, records the image data on a digital recording medium, such as a hard disk, a magneto-optical disk, or the like, as it is or in a compressed form.

In order to capture a document-like subject, the stand 20 is used to permit the camera head 10 to be fixedly located over the subject as described previously. If, in this case, the available illumination is not sufficient, the stand and the camera head may cast shadows on the subject. To remedy this problem, shadows can be stored beforehand as data for subsequent compensation as described previously. In addition, the cable 13 connecting the camera head 10 and the PC card 14 may also cast a shadow on the subject. In the present embodiment, the place where on the camera head the cable is to be attached is determined in such a way as to avoid the cable 13 casting its shadow on the subject as much as possible.

With the camera head 10 of FIG. 9, the cable is attached to the camera head on the side where the mounting section 21 for the stand 20 is provided and moreover at the opposite end from the lens 11. In contrast, with the camera head of FIG. 11, the cable is attached at the rear side opposite the lens side. With the cable 13 extending from the camera head 10 fixed to the shaft of the stand 20, a convenience for handling would result and moreover an unwanted shadow could be avoided. FIG. 14 shows an example in which a hook 13a is used to fix the cable to the stand.

In the examples shown in FIGS. 8 to 12, the camera head is equipped with two types of close-focusing lenses. Of course, the camera head is allowed to have a single close-focusing lens. FIG. 16 shows an example of a camera head equipped with a single close-focusing lens. In this example, close-focusing lens 24 and lens cover 12 are arranged to slide in the same groove 29a. In this case as well, if the positions of lens 24 and cover 12 are detected by means of switches 27b and 27c and lens cover detector 28 and their states are then presented to the personal computer for display, then a convenience for use will be provided.

Figure 17:
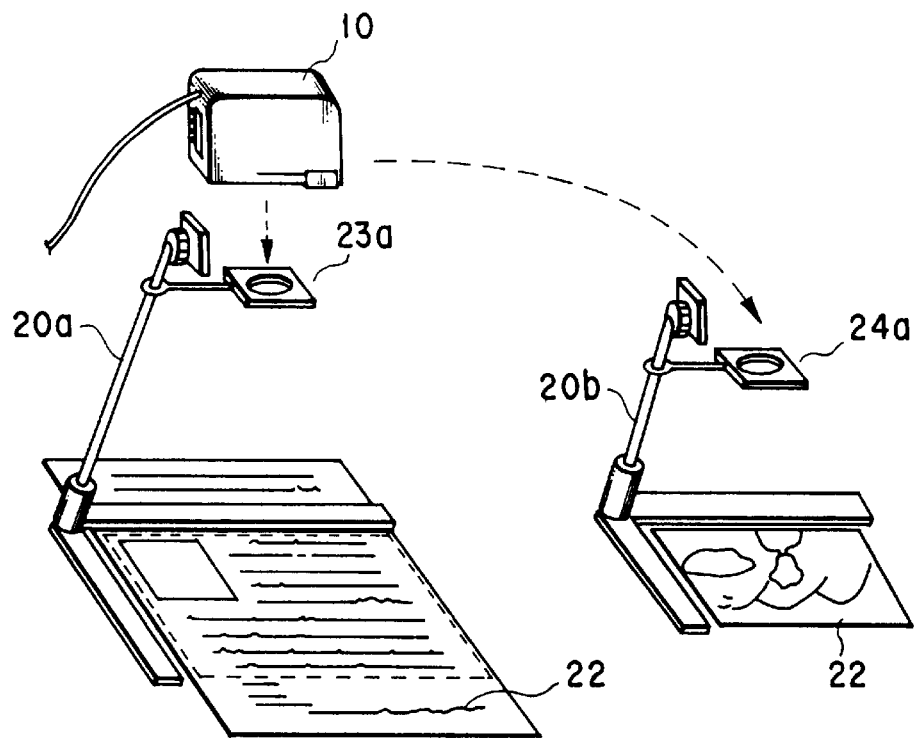
FIG. 17 illustrates an imaging system in which a close-focusing lens for use with camera head is mounted to a stand.

In the example of FIG. 8, a close-focusing lens is built into the camera head 10 to capture a document-like subject. In the example of FIG. 1 in which no close-focusing lens is built into the camera head, on the other hand, a close-focusing lens has only to be mounted to a stand 20a as shown in FIG. 17. In this example, there are illustrated two types of stands 20a and 20b adapted for A5 and A6 documents, respectively. The stand 20 is fitted with a close-focusing lens 23a adapted to capture A5 documents, while the stand 20b is fitted with a close-focusing lens 24a adapted to capture A6 documents. The provision of two dedicated stands eliminates the need of adjusting the distance between the camera head and documents, preventing the user from making framing errors. It is also possible to further provide various types of dedicated stands like A3 and A4 stands. It is also possible to use a dedicated stand fitted with a close-focusing lens and a camera with a built-in close-focusing lens in combination for a document of the size that cannot be captured by the built-in close-focusing lens. This permits a wide range of use of the camera head with a built-in close-focusing lens.

Figure 18:
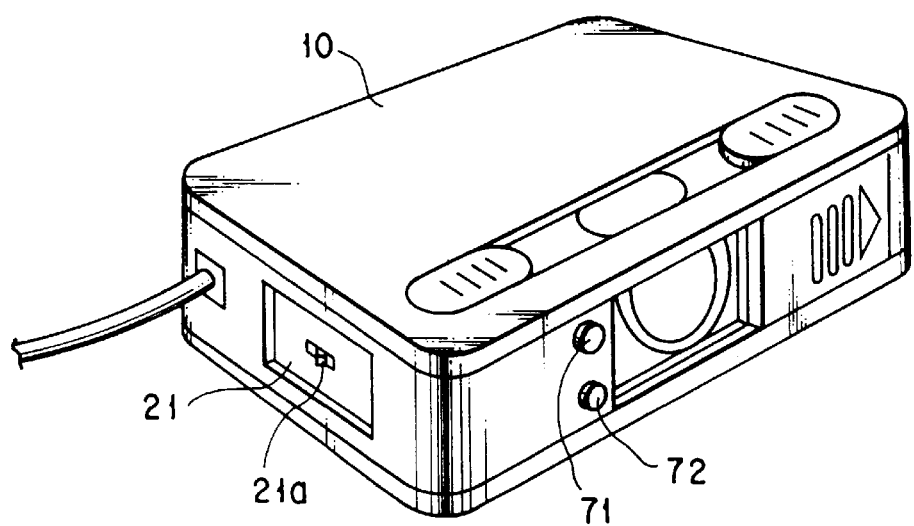
FIG. 18 is a perspective view of a camera head equipped with a stand-mounted state detecting switch, a white balance sensor, and a light sensor.
Figure 20:
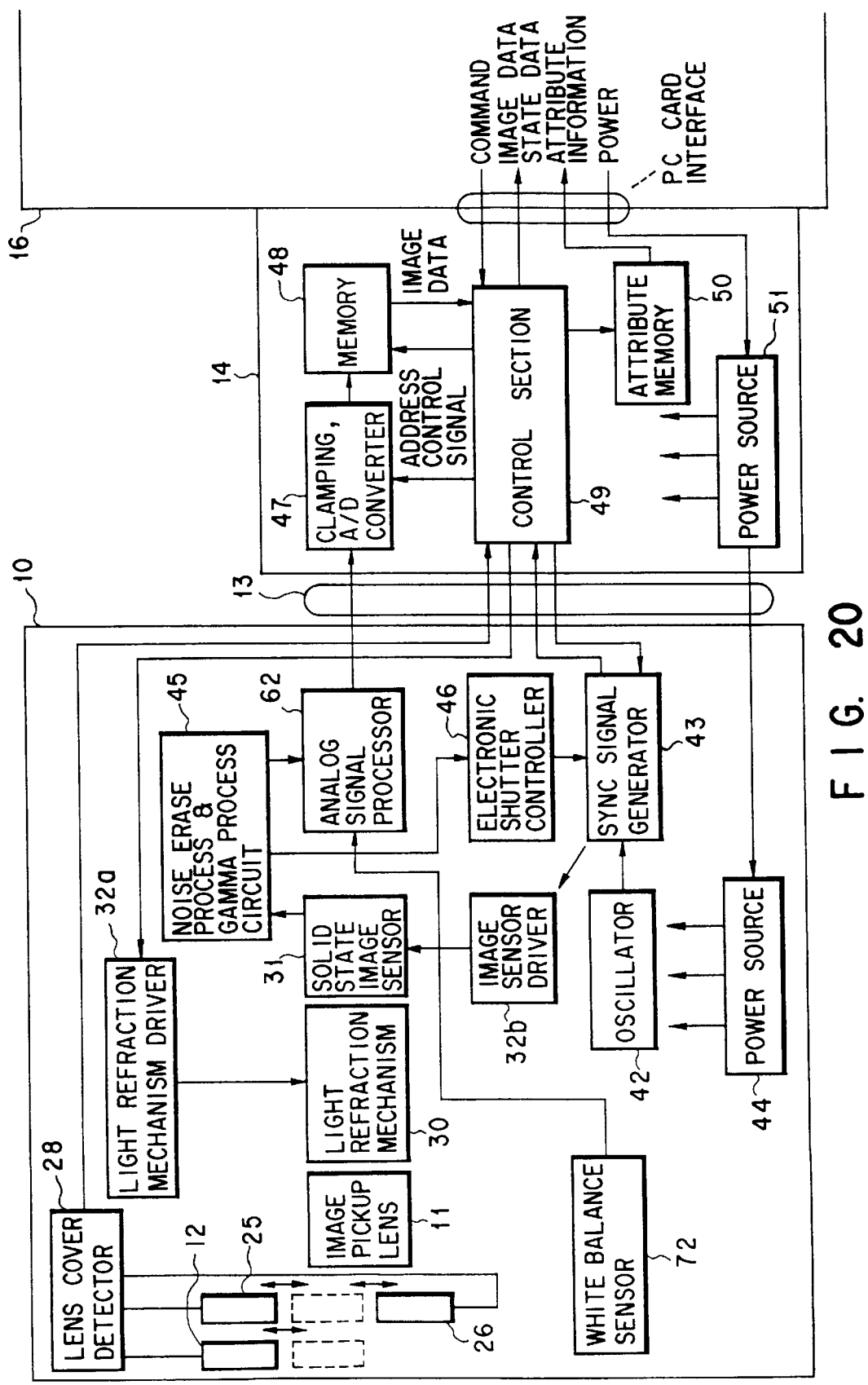
FIG. 20 is a block diagram of an imaging system including a camera head having an analog signal processing circuit.

In order to capture a document-like subject or a stationary subject at a high resolution, it is required to perform image capture several times. Thus, the camera head needs fixing while an image is being captured. When a stand is used to fix the camera head, the camera head may be equipped with a stand-mounted state detecting switch 21a in its stand-mounting section 21 as shown in FIG. 18. When the camera head is mounted to the stand, the detect switch is turned on, which is detected by the personal computer 16. Thus, this switch state can be used as a condition for high-resolution image capture. That is, this permits the user to be alerted to the possibility of the occurrence of camera shake that results in failure in obtaining a satisfactory high-resolution still image when he or she is going to capture a document-like subject or stationary subject in the high-resolution mode without using any stand. Note that the camera head 10 is equipped with a light sensor 71 and a white balance sensor 72, whereby light intensity information and white balance information are sent to the personal computer.

In the above embodiments, the signal processing is performed by software. The software-based signal processing can lower the cost and decrease power dissipation as compared with hardware-based signal processing. On the other hand, the signal processing by hardware within the image input apparatus has an advantage that it requires less processing time.

FIG. 19 is a block diagram of an image input apparatus which performs image signal processing by hardware. In this case, the PC card 14 has a digital signal processor 61 built in, which performs, for example, a process of producing a brightness signal and color signals from output signals of the solid-state image sensor 31, a process of producing R, G and B signals, a digital gamma process, a digital white balance process, etc. The camera head 10 is equipped with a cover/lens detector 28 which detects whether cover 12, A5 close-focusing lens 25 or A6 close-focusing lens 26 is positioned in front of the lens 11. The cover/lens detector 28 communicates the states of cover 12 and close-focusing lenses 25 and 26, detected by switches 27a, 27b and 27c shown in FIG. 12, to the personal computer 16, which then displays them on the display screen 17 and alerts the user of improper lens usage when necessary.

FIG. 11 shows an embodiment in which the camera head 10 has an analog signal processor 62 built in, which performs gamma processing by each color filter and white balance processing by signals from the white balance sensor 72.

With the embodiments shown in FIGS. 1 and 8, the camera head 10 has not an aperture control mechanism, its function being substituted by an electronic shutter. The electronic shutter is automatically varied according to the magnitude of an output of the solid-state image sensor. That is, the electronic shutter is varied in the direction that reduces the storage time when the output is high or in the direction that increases the storage time when the output is low. The electronic shutter settings can be changed at the user's choice. The on-screen control guides for this purpose is illustrated in FIG. 21. When an aperture change command is issued to the software in the personal computer to open or close the aperture by one stop by way of example, the controller 49 communicates it to the camera head 10, whereby the electronic shutter setting is changed and the desired aperture setting is obtained. In this case, the user is allowed to watch an image output on the display screen of the personal computer to make a further change in the setting. In addition, the user is allowed to return the electronic shutter to the auto setting by telling the personal computer.

Figure 22:
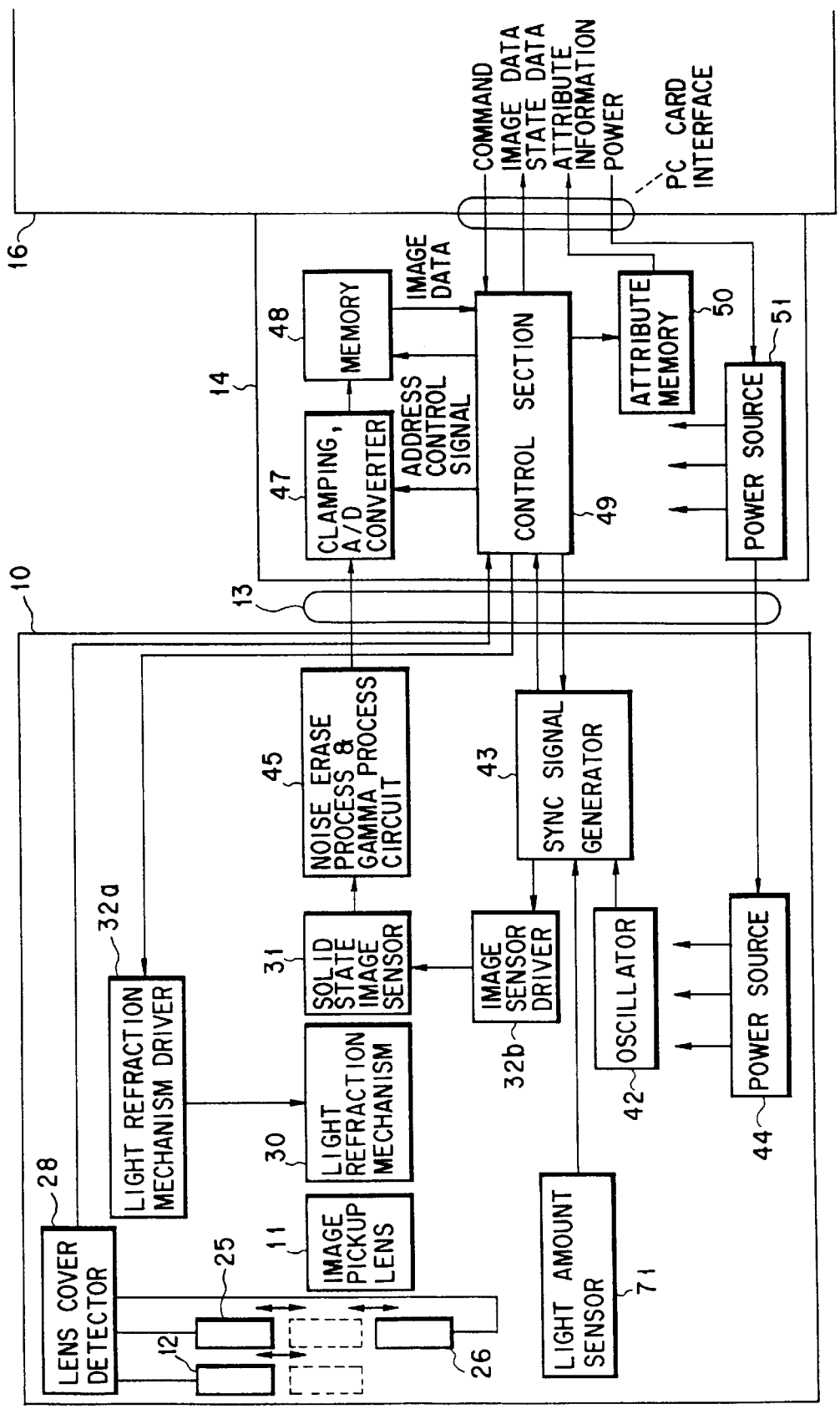
FIG. 22 is a block diagram of an imaging system including a camera head having a light-sensor-controlled electronic shutter.

The automatic electronic shutter operation is controlled not by the output of the solid-state image sensor but by an output signal of the light sensor 71 built into the camera head 10 as shown in FIG. 18. A circuit block diagram in this case is illustrated in FIG. 22. According to this circuit arrangement, the shutter speed setting of the electronic shutter depends on the magnitude of the output of the light sensor 71. That is, upon receipt of a signal having a magnitude depending on the light level detected by the light sensor 71, the synchronization signal generator 43 controls the image sensor driver 32b to thereby adjust the storage time of the solid-state image sensor 31. To be specific, the smaller the light level, the longer the storage time will be set.

Although, in the embodiment of FIG. 22, the shutter speed is controlled, the aperture may be controlled instead as shown in FIG. 23. In this further embodiment, the light sensor 71 is connected to an aperture controller 73, which responds to an output of a noise elimination processing circuit 45 as well as the output of the light sensor 71 to control an aperture assembly 74 disposed in front of the lens 11. That is, the aperture is automatically adjusted by the output of the solid-state image sensor 31 or the light sensor 71. The aperture assembly 74 can be constructed to accommodate manual control as well.

In the above embodiments, even if the electronic shutter or the aperture assembly 74 is opened fully, the storage time of the solid-state image sensor 31 is set long when its output level is low. If the one-frame period is made longer as shown in FIG. 24, the storage time will become longer correspondingly. Specifically, the drive signal to be input to the solid-state image sensor has only to be made longer in period. For example, if the synchronization signal generated in the synchronization signal generator 43 is made longer in period, then the drive signal will also become longer in period. To this end, the synchronization signal generator 43 may generate a plurality of synchronization signals of different periods to permit switching from a synchronization signal to a longer-period synchronization signal. Alternatively, the frequency of the output clock signal from the oscillator 42 may be dropped. Methods of dropping the clock frequency include: dividing a clock frequency; providing a plurality of clock oscillators so as to permit switching from a clock oscillator to a lower-frequency one; and using a variable-frequency oscillator.

Figure 25:
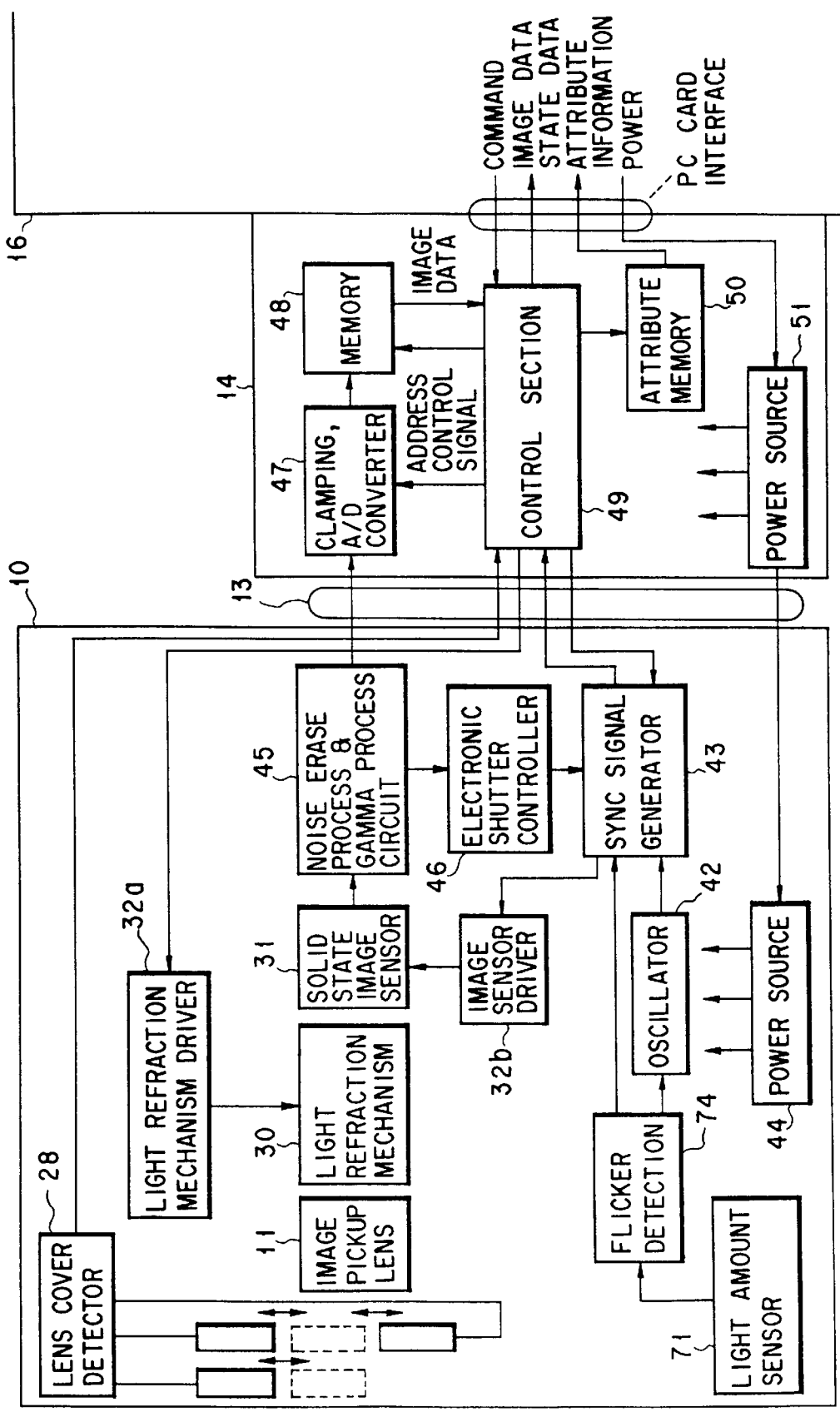
FIG. 25 is a block diagram of an imaging system including a camera head having a function of suppressing flicker.

At the time of high-resolution image capture, an image is captured four times as described previously. At the time of image capture under fluorescent lamps, therefore, the resulting image may be affected by flicker. In FIG. 25 there is illustrated in block diagram form an image capture according to a further embodiment which has a built-in function of compensating for a difference in storage charge due to flickering light of a fluorescent lamp. In this embodiment, a flicker detector 74 is provided which has its input coupled to the output of the light sensor 71 and its output coupled to the oscillator 42 and the synchronization signal generator 43. With this arrangement, when the flicker detector detects that flicker components in the output signal of the light sensor 71 reaches a given magnitude, that built-in function is brought into operation. That is, the fluorescent-lamp flicker components are entered into the synchronization signal generator 43 in the camera head 10 with the result that the frame frequency generated by the synchronization signal generator is tuned to the flicker frequency, an integral multiple of it, or an integral submultiple of it. Thus, the image capture at a high resolution becomes synchronized with the fluorescent lamp, eliminating a difference in magnitude between successive image signals from the solid-state image sensor. The flicker of fluorescent lamps depends on the frequency of household power supplies. For this reason, the synchronization signal generator 43 should preferably be constructed to accommodate either 50 Hz, 60 Hz, or both.

In the above embodiments, the image input apparatus is powered from the personal computer 16. On some models, the power supply capability may be poor. To keep down wasteful power dissipation, therefore, the image input apparatus has a low-power mode. When no operation is performed on the personal computer for a predetermined period of time, the controller 49 enters the low-power mode automatically and informs the personal computer of it. Alternatively, software installed in the personal computer directs the image input apparatus to enter the low-power mode when no operation is performed for a predetermined period of time. Or, the software switches the image input apparatus from the normal mode to the low-power mode as requested by the operator. Such a state transition diagram is illustrated in FIG. 26. According to this diagram, the low-power mode is implemented by the stoppage of power supply from the PC card 14 to the camera head 10, the stoppage of power supply to the power supply circuit 44 in the camera head 10, or the stoppage of power supply to the A/D converter 47 in the PC card 14. Since the controller 49 in the PC card 14 is continuously supplied with power, the operation can be restarted immediately when needed, e.g., when an image capture command is entered by the operator.

FIG. 27 shows a further embodiment in which the camera head 10 is provided with a battery 75. In this embodiment, the power supply circuit 44 in the camera head 10 generates necessary voltages for the camera head from that battery. The software in the personal computer 16 can turn on or off the power in the camera head 10 via the controller 49 of the PC card 14. The software of the personal computer can monitor the potential of the battery 75 to inform the operator of the necessity of replacing a dry battery or charging a secondary battery through the display screen of the personal computer when needed.

FIG. 28 shows an embodiment in which the camera head 10 has a built-in flash unit 76. When a dark subject is captured, i.e., when an image of high quality is difficult to capture, the flash is turned on or fired. The software installed in the personal computer selects among auto firing, forced firing, and non-firing. At the time of image capture at a high resolution in which case an image is captured four times, the flash is fired under the same conditions for light intensity and timing at every image capture. In the case of the auto firing, the output of the solid-state image sensor 31 or the output of the light sensor 72 will serve as the criterion for selection between firing and non-firing.

FIG. 29 shows an embodiment in which an illuminator 77 is mounted on the stand 20. The illuminator is mounted on a base 20c of the stand 20 as shown, with its control line 78 being connected to the camera head 10 and its power cable 79 being connected to a power supply not shown. Near the mounting section of the camera head for the stand is provided an interface which is connected to the illuminator by the control line 78 to control it. The interface is also connected to the personal computer 16 by the cable 13, so that the personal computer is permitted to turn on or off the illuminator and control the intensity of illumination.

FIG. 30 shows an embodiment in which an autofocus function is built into the optical system of the camera head. With this embodiment, the camera head is equipped with a subject distance sensor 81 and a focus control circuit 82. The focus control circuit 82 determines the subject distance on the basis of an output of the solid-state image sensor or the distance sensor 81 and then autofocuses the taking lens 11 on the subject. Into the lens assembly 11 is incorporated an autofocus mechanism which is responsive to a focus control signal from the focus control circuit 82 to move the lens.

FIG. 31 shows an embodiment in which a captured image is output on the personal computer and any point on the output image can be focused. The operator moves a pointer to a desired point on the image displayed on the personal computer and then enters an image capture command. As a result, the position information for that point is sent to the camera head 10 via the PC card 14 and the optical system is controlled so that it will focus on the specified point. With the focus locked, an image is captured. Whether the specified point is in focus or out of focus can be confirmed by examining frequency components in an image signal for the area or point specified by the operator.

When information on a document-like subject is captured using the stand, the distance sensor 81 can also be used to check the correct subject distance. As shown in FIG. 8, the proper distance between the camera head and the document varies between the A5 close-focusing lens and the A6 close-focusing lens. When the proper distance cannot be set up, the operator is warned for it, reducing the possibility of input errors. The output of the distance sensor 81 aboard the camera head 16 and the output data from the close-focusing lens detector are sent to the personal computer to make a decision as to whether the distance between the camera head and the subject is proper or not. When it is not proper, the personal computer displays a warning message on its display screen.

FIG. 32 shows an embodiment in which the camera head is attached to a special-purpose adapter 83, not the PC card. The adapter 83 is used for connection to a personal computer or work station without a PC card slot by means of SCSI, GPIB, Centronics, Ethernet, optical network, or the like. In this embodiment, an SCSI cable 84 is used. The special adapter 83 is removably connected to a common cable 85 and a power cable 87. Also, the camera head 10 is removably connected to the common cable 85. Consequently, the use of cable terminals 86 adapted for the special adapter 83 permits the same camera head to be used, permitting the camera head to have a wide range of use.

The connection of the camera head to the special adapter 83 which is capable of producing usual video signals also permits a motion picture to be output. A circuit block diagram for motion picture output is illustrated in FIG. 33. The solid-state image sensor 31 outputs image signals based on field storage to the special adapter 83 via the cable 85. In the adapter, an analog processor 88 processes the incoming image signals to produce analog video signals. A controller 89 in the adapter sets the camera head 10 to output video output. In the camera head for the present embodiment, an optical filter aboard usual single-CCD color video cameras is not interposed between the taking lens and the solid-state image sensor.

The use of an optical filter for removing spurious signals will drop the spatial frequency associated with the pixel pitch. It is therefore not desirable to use it at the time of high-resolution image capture. For this reason, for motion video, the horizontally parallel glass sheets in the light refracting member are vibrated as substitution for the optical filter. With the parallel glass sheets tilted, an image is shifted right and left by one pixel at least once within the field period. By this, incoming light to two adjacent pixels will be incident on each pixel and then integrated, which is equivalent to the function of the optical filter. The adapter delivers control signals to the light refracting member.

When light refracting members 41a and 41b are interposed between the taking lens 11 and the solid-state image sensor 1 as shown in FIG. 6, the optical system will become longer than normal resolution lenses. Thus, the depth of the camera head is determined accordingly. With the slidable close-focusing lenses provided on the both sides of the taking lens 11 as shown in FIG. 9 or with the slidable close-focusing lens and cover provided as shown in FIG. 16, the width and height of the camera head will depend on the diameter of the front lens of the taking lens assembly 11. Taking these size determination factors into consideration to make a camera head of small dimensions, the camera head should preferably be made flat as shown in FIG. 9.

FIG. 34 shows an inside arrangement of the camera head 10. Close-focusing lenses 27a and 27b are disposed slidably in front of and on the both sides of the taking lens 11. Immediately behind the taking lens 11 are disposed the light refracting member 30, a cyan filter 91 and the solid-state image sensor 31 in this order. Such a flat camera head has an advantage that, when it is mounted to a stand to shoot a document-like subject, its shadow on the subject becomes small.

Although, in the above embodiments, the synchronization signal generator is incorporated into the camera head, it may be incorporated into the PC card instead.

There will now be described embodiments of light-refracting devices applied to the above image input apparatus. Each embodiment is used, located between a lens and an image sensor.

Figure 35:
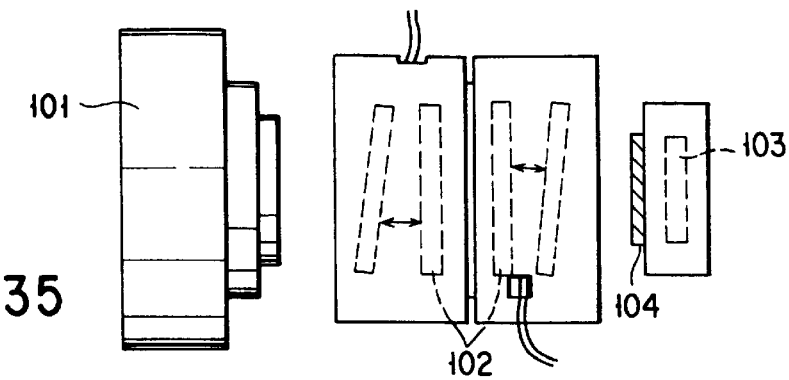
FIG. 35 is a side view of a light-refracting device according to a first embodiment of the present invention.

FIG. 35 shows a light-refracting device which is provided between a lens unit 101 and a solid-state image sensor 103. The light collected by the lens of the lens unit 101 is incident to the light-refracting device 102. The light-refracting device refracts the light, moving an image on the light-receiving surface of the image sensor 103.

Figure 36A:
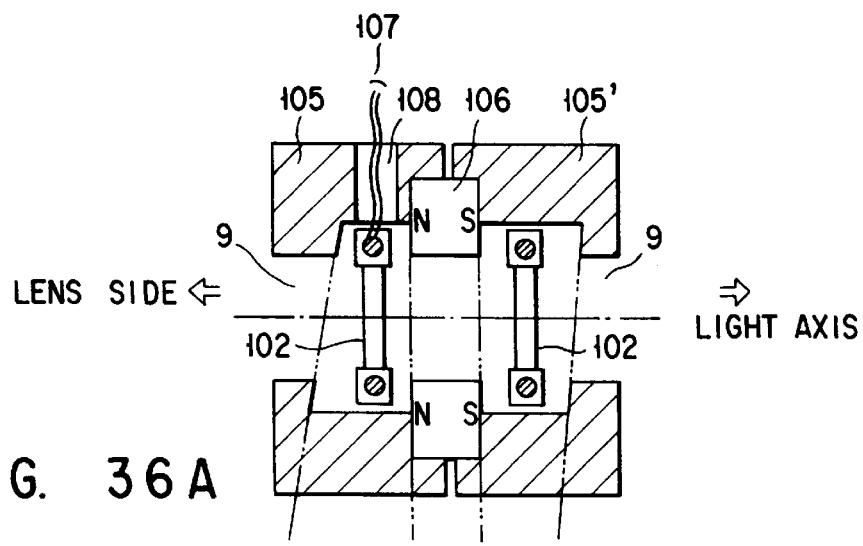
FIGS. 36A, 36B and 36C are a sectional view, front view and side view of the device shown in FIG. 35.
Figure 36B:
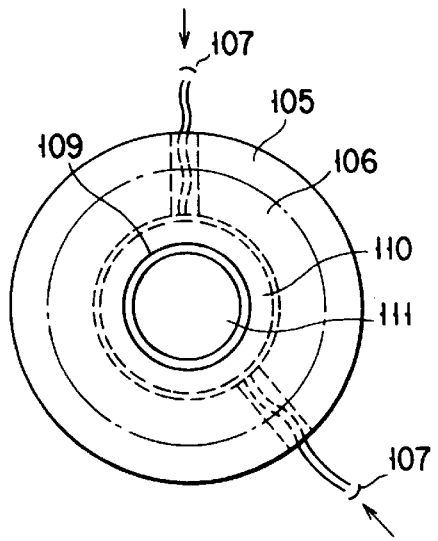
Figure 36C:
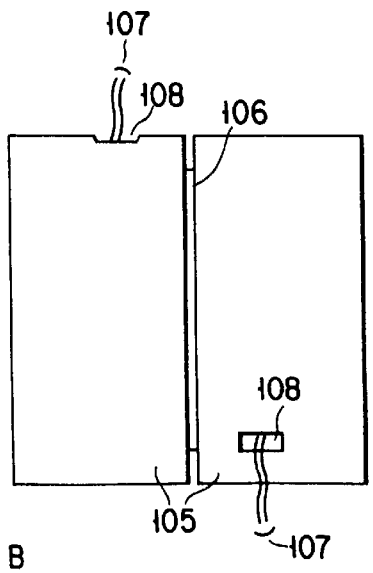
Figure 37:
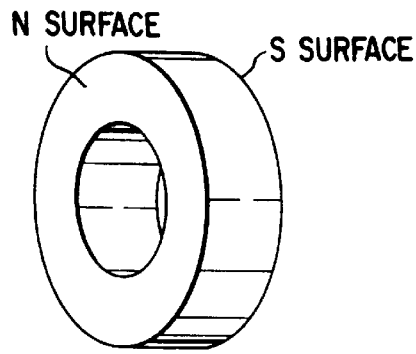
FIG. 37 is a perspective view of the ring-shaped magnet incorporated in the device shown in FIG. 35.

FIGS. 36A, 36B and 36C are a sectional view, front view and side view of the light-refracting device shown in FIG. 35. As shown in FIGS. 36A to 36C, the device is comprised of a pair of light-refracting members 102, a hollow cylindrical housing 105, and a magnet 106. The housing 105 consists of two halves 105'. The magnet 106 is provided in the housing 105 and clamped between the front and rear housing halves 105'. As shown in FIG. 37, the magnet 106 is shaped like a ring and has two parallel sides.

Figure 38A:
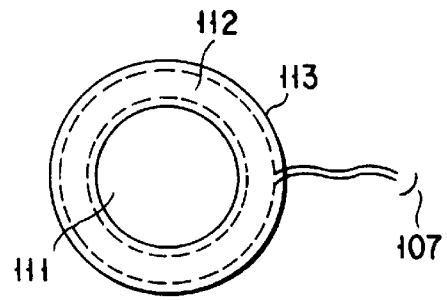
FIGS. 38A, 38B, 38C and 38D are a front view, side view, sectional view and enlarged sectional view of one of the light-refracting members used in the device of FIG. 35.
Figure 38B:
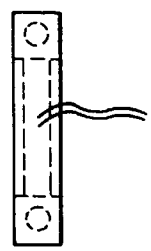

Both light-refracting members 102 are provided in the housing 105. More precisely, the front light-refracting member 102 is located on the front side of the magnet 106, and the rear light-refracting member 102 on the rear side of the magnet 6. As shown in FIGS. 38A and 38B, each light-refracting member 102 comprises a light-refracting disc 111, a coil 112 wound around the circumferential surface of the disc 111, and an annular molding 113 sealing the coil 112. The light-refracting disc 111 is composed of two parallel glass discs. The coil is wound around the circumferential surface of the disc 111. The molding 113 is made of, for example, synthetic resin and seals the coil 112. Two end portions 107 of the coil 112 extend outwards from the circumferential surface of the annular molding 113 as shown in FIGS. 38A and 38B.

As shown in FIG. 36A, the front light-refracting member 102 can move in a space defined by the front side of the magnet 106, the inner circumferential surface of the front housing half 105' and the inner end face thereof. Similarly, the rear light-refracting member 102 can move in a space defined by the rear side of the magnet 106, the inner circumferential surface of the rear housing half 105' and the inner end face thereof. Both sides of the ring-shaped magnet 106 are perpendicular to the axis of the hollow cylindrical housing 105. Both inner end faces of the housing 105 are inclined to the axis of the housing 105. The front housing half 105' has a hole 8 in its circumferential wall. The end portions 107 of the coil 112 of the front light-refracting member 102 pass through the hole 108 and project from the outer circumferential surface of the front housing half 105'. Similarly, the end portions 107 of the coil 112 of the rear light-refracting member 102 pass through the hole 108 and project from the outer circumferential surface of the rear housing half 105'.

Figure 38C:
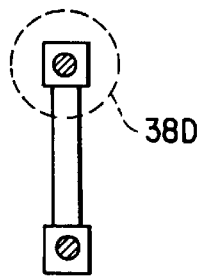
Figure 38D:
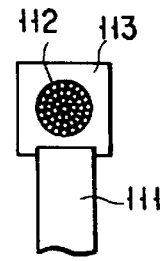

Each light-refracting members 102 needs to move in order to perform its function. Therefore, the light-refracting disc 111 and the coil 112 must be fastened firmly to each other. The annular molding 113 sealing the coil 112 may be formed integral with the light-refracting disc 111 as is illustrated in FIGS. 38C and 38D, for the purpose of reducing the manufacturing cost of the light-refracting member 102.

The light-refracting members 102 are driven in the same way when the coils 112 are energized. Namely, each member 102 is moved away from or toward the ring-shaped magnet 106, in accordance with the direction in which an electric current is passed through the coil 112. How the front light-refracting member 102 is driven will be explained, with reference to FIGS. 39A and 39B and FIGS. 40A and 40B.

Figure 39A:
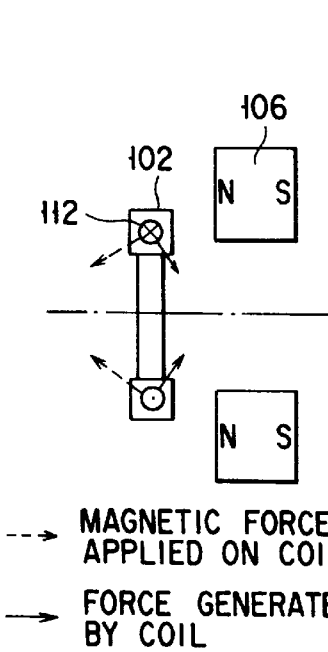
FIGS. 39A and 39B are diagrams explaining the operating principle of the light-refracting section of the device shown in FIG. 35.
Figure 39B:
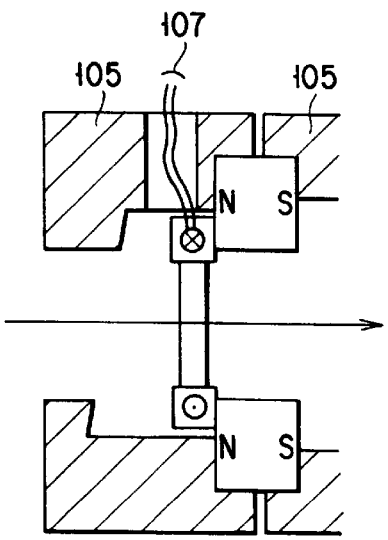

As obviously seen from FIGS. 39A, 39B, 39A and 39B, the coil 112 has a diameter smaller than that of the ring-shaped magnet 106. When an electric current is passed through the coil 112 in the direction shown in FIG. 39A, the coil 112 generates a magnetic field. This magnetic field cooperates with the magnetic field of the magnet 106 to move the front light-refracting member 102 to the ring-shaped magnet 106. Attracted onto the magnet 106 as shown in FIG. 39B, the front light-refracting member 102 has its axis aligned with the axis of the hollow cylindrical housing 105 because both sides of the magnet 106 are perpendicular to the axis of the housing 105. Needless to say, the axis of the light-refracting disc 111 is aligned with that of the housing 105. In this condition, the input light travels through the disc 111 along the axis of the housing 105, not refracted at all.

When an electric current is passed through the coil 112 of the member 102 in the opposite direction shown in FIG. 40A, the coil 112 generates a magnetic field, which repels the front light-refracting member 102 from the ring-shaped magnet 106. As a result, the member 102 abuts on the front inner end face of the housing 105 as shown in FIG. 40B. Since the front inner end face of the housing 105 is inclined to the axis of the cylindrical housing 105, the path along which the input light passes through the disc 111 is inclined at an angle α to the axis of the housing 105 as shown in FIG. 40B. Hence, the input light is refracted while passing through the light-refracting disc 111.

The distance the image-forming position moves as the front light-refracting member 102 refracts the input light is determined by the angle α and the refraction index of glass and the thickness of the light-refracting disc 111. The direction in which the image-forming position moves is the direction in which the disc 111 of the front light-refracting member 102 is inclined to the axis of the housing 105.

The both inner end faces of the housing 105 are inclined to the axis of the housing 105, while both sides of the magnet 106 are perpendicular to the axis of the housing 105. Instead, the inner end faces of the housing 105 may be perpendicular to the axis of the housing 105, while the sides of the magnet 106 are inclined to the axis of the housing 105. Thus, both the cylinder 105 and the magnet 106 need not be machined or assembled with high precision.

When both light-refracting members 102 are attracted onto the front and rear sides of the ring-shaped magnet 106, respectively, the input light is applied perpendicularly to the light-refracting disc 111 of either members 102. The magnet 106 is neither inclined to the axis of the cylinder 105 nor is movable. It need not be positioned with precision in the housing 105.

The inner end faces of the housing 105 are inclined to the axis of the housing 105 in different directions with respect to the axis of the housing 105. Hence, as shown in FIG. 36B, there are two axes along which the image can move on the light-receiving surface of the image sensor 103. Clamped between the housing halves 105', the magnet 106 acts on both light-refracting members 102. Two magnets need not be provided for the light-refracting members 102, respectively. Furthermore, the space between the lens 1 and the image sensor 103 is utilized effectively.

When both light-refracting members 102 abut on the inner end faces of the housing 105, the input light is refracted twice by the angle a with respect to the axis of the housing 105, each time and in different direction. The distance the image moves in this case on the light-receiving surface of the image sensor 103 is determined by the angle α, the refraction index and thickness of the front light-refracting disc 111, and the refraction index and thickness of the rear light-refracting disc 111. If one light-refracting member, either the front one or the rear one, is used, the distance the image-forming position moves will depends upon the angle α only. The use of only one light-refracting member helps to reduce the manufacturing cost of the light-refracting device.

The diameter of the light-refracting discs 111, the inner diameter of the ring-shaped magnet 106, and the diameter of the light passage in the housing 105 must be large enough to allow the input light beam to pass through the hollow cylindrical housing 105, no matter whether the light-refracting members 102 are attracted to the magnet 106 or the inner end faces of the housing 105. Thus, as shown in FIG. 41, the input light beam passes through the housing 105, reaching the light-receiving surface of the image sensor 103.

The housing 105 is made of non-magnetic material or scarcely magnetic material so that the magnetic force of the ring-shaped magnet 106 may efficiently acts on the light-refracting members 102.

FIG. 42 shows another type of a hollow cylindrical housing 105 for use in the present invention. As shown in FIG. 42, this housing comprises a front hosing half 105 and a rear housing half 105'. A ring-shaped magnet 106 is secured to the front side of the rear housing half 105'. The front housing half 105 is connected to the rear housing half 105'.

Figure 43:
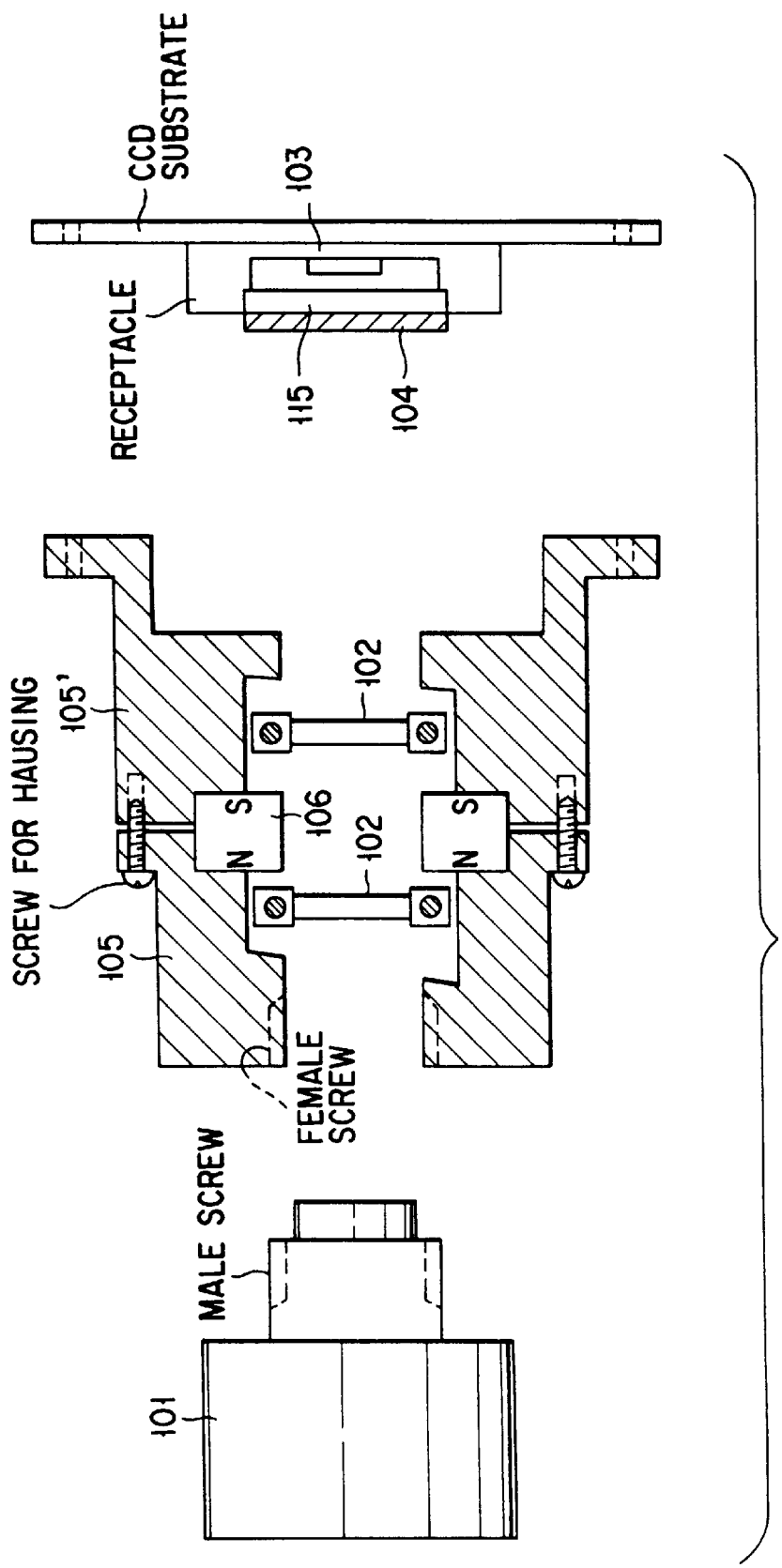
FIG. 43 is a diagram showing still another type of a hollow cylindrical housing for use in the invention and explaining a method of connecting this housing to the lens section and CCD section of a camera.

FIG. 43 illustrates still another type of a hollow cylindrical housing for use in the invention and explains a method of connecting this housing to the lens section and CCD section of a camera. As seen from FIG. 43, the housing comprises a front housing half 105 and a rear housing half 105'. The rear housing half 105' has a flange having at the rear. The flange has holes and can be fastened by screws to the substrate of a charge-coupled device (CCD). The front housing half 105 has a female screw in the front end portion. The female screw can mesh with the male screw cut in the circumferential surface of a lens unit 101, thereby connecting the light-refracting device to the lens unit 101 in an accurate axial alignment therewith. The housing halves 105 and 105' are connected by screws, clamping a ring-shaped magnet 106 between them.

FIG. 44A is a partial sectional view showing an image input apparatus comprised of the lens unit 101, the light-refracting device and the image sensor. FIG. 44B is a front view of the apparatus, as seen from the lens unit 101. The end portions of the coil of the front light-refracting member provided in the front housing half 105 is connected to the CCD as shown in FIG. 44B. So is the end portions of the coil of the rear light-refracting member provided in the rear housing half 105'.

It is desirable that the light-refracting members 102 be as light as possible. This is because they need to move in the housing in order to refract an input light beam. FIGS. 45A and 45B show a light-refracting member 102 which is made lighter. As seen from FIGS. 45A and 45B, the member 102 has holes 116 in both sides of the annular molding which seals the coil 112.

Not secured to the hollow cylindrical housing 105, either light-refracting member 102 may rotate around the axis of the housing 105, due to vibration or impact applied to the housing 105. When the member 102 rotates, the end portions 107 of the coil 112 are drawn into the housing 105, adversely influencing the operation of the member 102. When the member 102 rotates, an excessive tension may be applied on the end portions 107 of the coil 112 to cut the end portions 107. The member 102 must therefore be designed not to rotate. FIGS. 46A and 46B shows another type of a light-refracting member 102 is prevented from rotating in the housing 105. As shown in FIGS. 46A and 46B, a projection 117 protrudes from the circumferential surface of the member 102. The projection 117 is loosely fitted in part in a hole 108 made in the inner circumferential surface of the housing 105, and guides the portions 107 of the coil 112 outwards through the hole 108.

In the embodiment described above, the end portions 107 of either coil 112 are led outwards through a hole 108 made in the housing half. The hole 108 may be replaced by a slit cut in the housing half as is shown in FIGS. 47A and 47B.

Figure 48A:
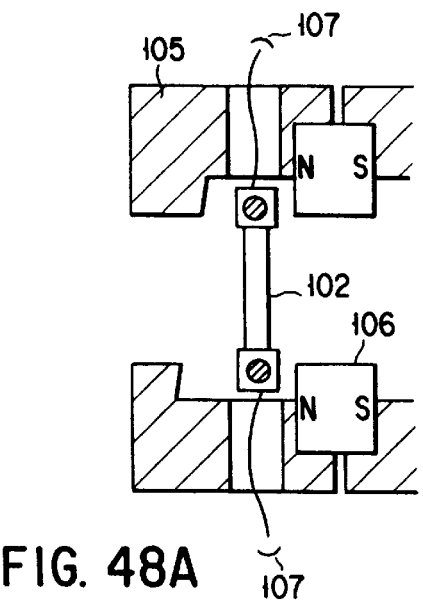
FIGS. 48A and 48B are a sectional view and side view of another light-refracting device according to the invention, illustrating two holes which are made in the housing of the device and through which the end portions of a coil are led outwards, respectively.
Figure 48B:
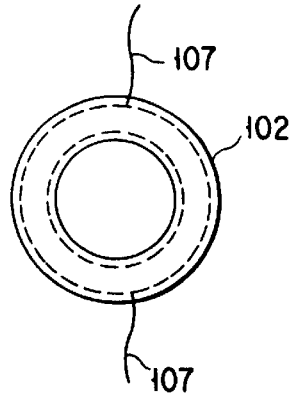

As shown in FIGS. 48A and 48B, two holes may be made in either housing half. In this case, the end portions 107 of the coil of the light-refracting member 102 provided in the housing half are led outwards through these holes, respectively.

Figure 49:
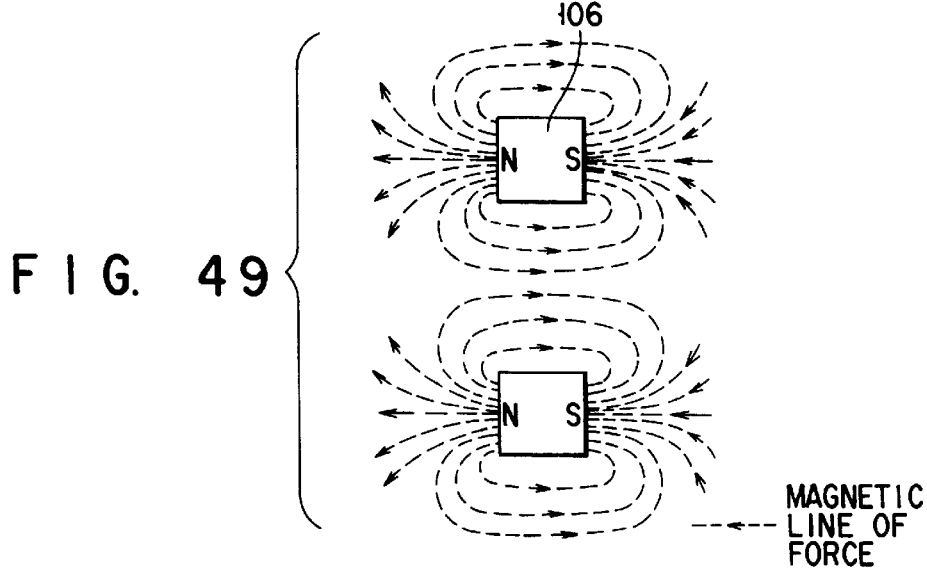
FIG. 49 is a diagram representing how the ring-shaped magnet is magnetized.
Figures 50A, 50B, 51:
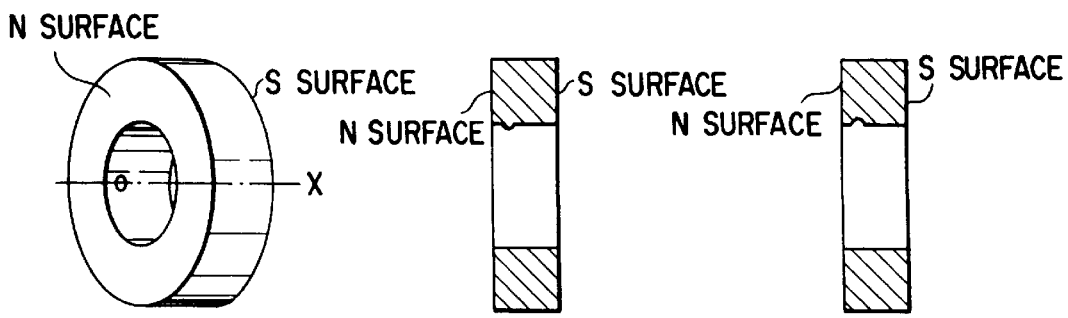
FIGS. 50A and 50B are a perspective view and sectional view of the ring-shaped magnet incorporated in the light-refracting device.
FIG. 51 is a sectional view of another type of a ring-shaped magnet for use in the light-refracting device.
Figure 52:
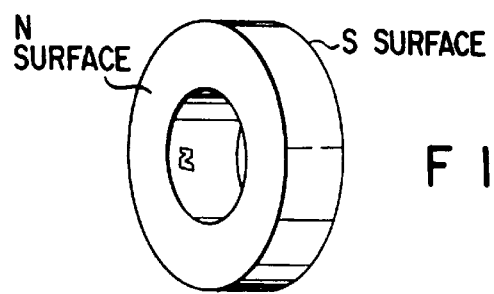
FIG. 52 is a perspective view of another type of a ring-shaped magnet for use in the light-refracting device.

FIG. 49 is a diagram representing how the ring-shaped magnet 106 is magnetized in the embodiment described above. Since the parallel sides of the magnet 106 are N and S poles, it is difficult to distinguish the magnetic poles, one from the other. To distinguish one pole from the other, a small projection may be formed on the inner circumferential surface of the magnet 106 and located close to one side thereof which is the N pole, as shown in FIGS. 49A and 49B. For the same purpose, a small depression may be formed in the inner circumferential surface of the magnet 106 and located close to one side thereof which is the N pole, as is illustrated in FIG. 51. Alternatively, a mark "N" may be printed on the inner circumferential surface of the magnet 106 and located close to one side thereof which is the N pole, as is illustrated in FIG. 52.

Figure 53:
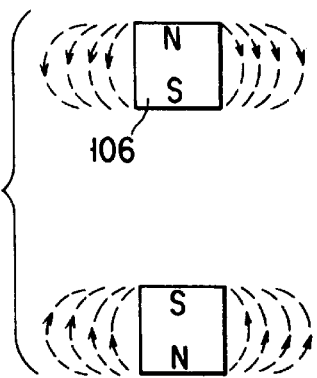
FIG. 53 is a diagram representing how another type of a ring-shaped magnet is magnetized.
Figure 54A:
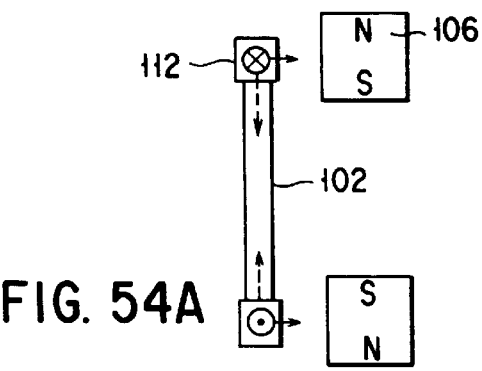
FIGS. 54A and 54B are diagrams explaining how a light-refracting member is moved toward and away from the ring-shaped magnet shown in FIG. 53.
Figure 54B:
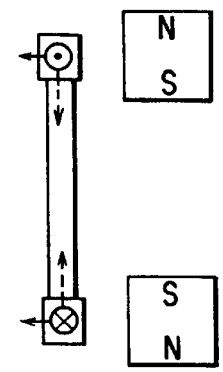

The ring-shaped magnet 106 may be magnetized such that its outer and inner circumferential surfaces are N and S poles, respectively, as is shown in FIG. 53. In this case, either light-refracting member 102 has a diameter substantially equal to the diameter of the magnet 106 as is illustrated in FIG. 54. The magnetic force of the magnet 106 can therefore effectively acts on the coil 112 of either light-refracting member 102.

Figure 55A:
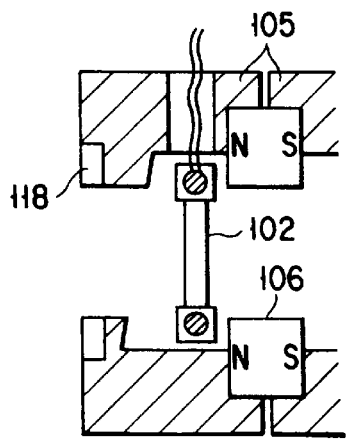
FIGS. 55A and 55B are a sectional view and front view of another light-refracting device which has magnetic members.
Figure 55B:
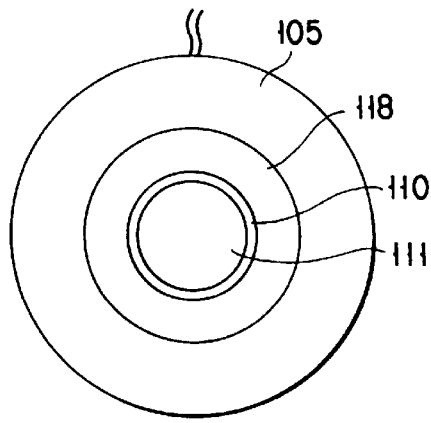

FIGS. 55A and 55B show another light-refracting device according to the invention, which is designed to cause the magnetic force of the magnet 106 to act effectively on the coils of either light-refracting member 102. As shown in FIGS. 55A and 55B, the member 102 is located in a space between the magnet 106 and a ring-shaped magnetic member 55.

Figure 56A:
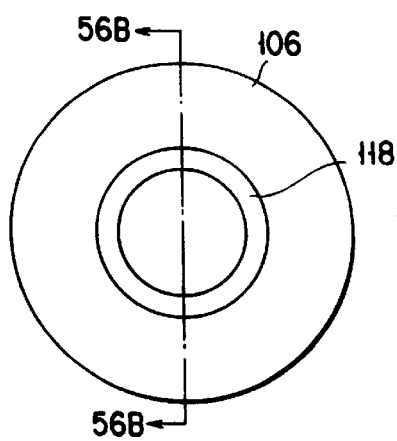
FIGS. 56A and 56B are a front view an sectional view of still another light-refracting device which has magnetic members.
Figure 56B:
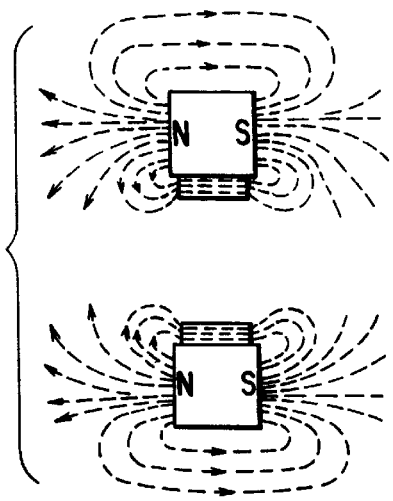
Figure 57A:
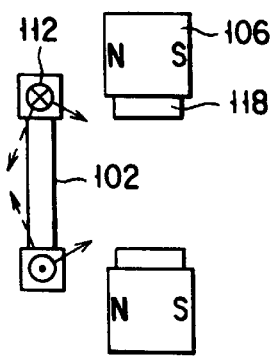
FIGS. 57A and 57B are diagrams explaining how a light-refracting member is moved toward and away from the ring-shaped magnet in the device shown in FIGS. 59A and 56B.
Figure 57B:
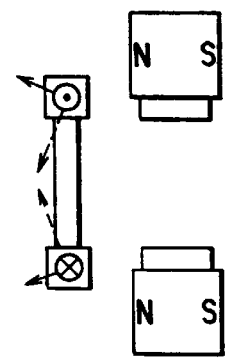

FIGS. 56A and 56B show still another light-refracting device according to the invention, which is designed to cause the magnetic force of the magnet 106 to act effectively on the coils of either light-refracting member 102. As shown in FIGS. 56A and 56B, a ring-shaped magnetic member 118 is fitted in the ring-shaped magnet 106. The inner diameter of the magnetic member 118 is large enough to allow the passage of the input light beam. The lines of magnetic force emanating from the magnet 106 are bent toward the magnetic member 118 as shown in FIG. 56B. Hence, as shown in FIGS. 57A and 57B, the magnetic force of the magnet 106 acts on the coil 112 in a direction more perpendicular to the axis of the hollow cylindrical housing 105. As a result, the force pulling the member 102 toward the magnet 106 acts in a direction more parallel to the axis of the housing 105 than in the case shown in FIG. 39A, and the force pulling the member 102 away from the magnet 106 acts in a direction more parallel to the axis of the housing 105 than in the case shown in FIG. 39B. Thus, the magnetic force of the magnet 106 acts effectively on the coils of either light-refracting member 102.

Figure 58:
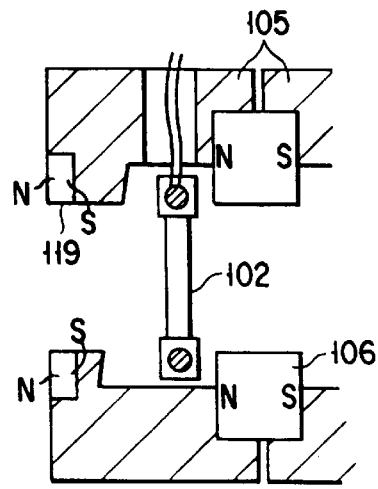
FIG. 58 is a sectional view of another light-refracting device which has magnetic members.

As illustrated in FIG. 58, the magnetic member 118 may be replaced by a ring-shaped magnet 119.

Figure 59A:
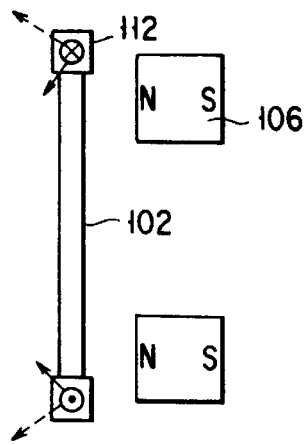
FIGS. 59A and 59B are diagram explaining how a light-refracting member is moved toward and away from the ring-shaped magnet in another light-refracting device according to the present invention.
Figure 59B:
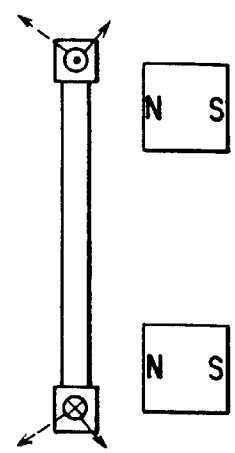

FIGS. 59A and 59B show another light-refracting device according to the invention, in which each light-refracting member 102 has a diameter slightly larger than the outer diameter of the ring-shaped magnet 106. In this embodiment, a magnetic force acts on the coil 112 of the member 102 outwards in the radial direction of the member 102.

Figure 60A:
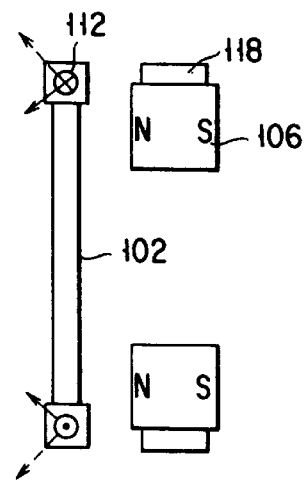
FIGS. 60A and 60B are diagram explaining how a light-refracting member is moved toward and away from the ring-shaped magnet in another light-refracting device according to the invention.
Figure 60B:
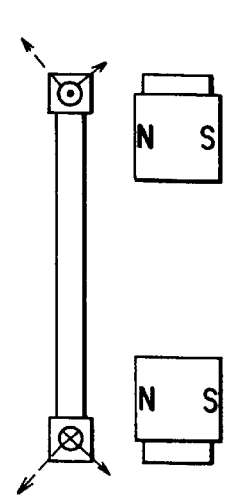

FIGS. 60A and 60B show still another light-refracting device according to the invention, in which each light-refracting member 102 has a diameter slightly larger than the outer diameter of the ring-shaped magnet 106 and a ring-shaped magnetic member 118 is mounted on the outer circumferential surface of the ring-shaped magnet 106. In this embodiment, the lines of magnetic force emanating from the magnet 106 are bent away from the magnetic member 118. Hence, a magnetic force acts on the coil 112 of the member 102 in a direction more parallel to the input light beam than in the device shown in FIGS. 59A and 59B.

Figure 61:
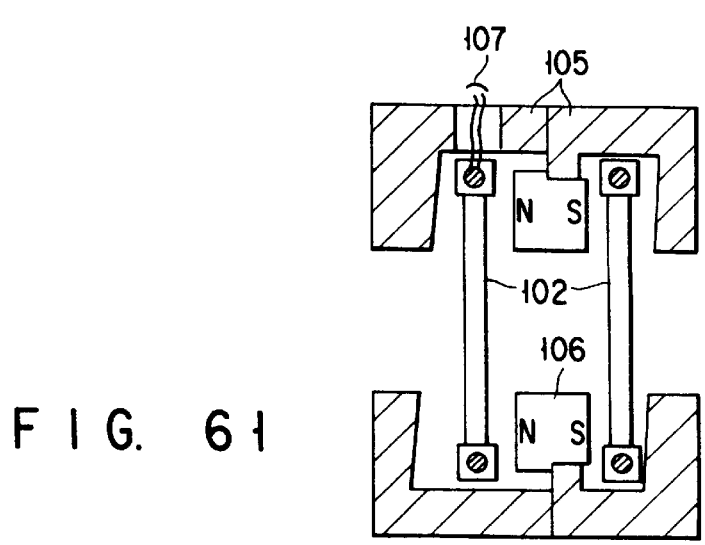
FIG. 61 is a sectional view of a hollow cylindrical housing 5 containing a ring-shaped magnet and two light-refracting members, all being of the types shown in FIGS. 59A and 59B.

FIG. 61 is a sectional view of a hollow cylindrical housing 105 containing a ring-shaped magnet and two light-refracting members, all being of the types shown in FIGS. 59A and 59B.

Figure 62:
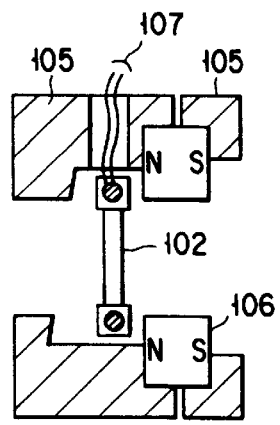
FIG. 62 is a sectional view of a light-refracting device according to the invention, which has only one light-refracting member.

FIG. 62 illustrates a light-refracting device according to the invention, which has only one light-refracting member 102 and one ring-shaped magnet 106. This device is designed to move an image in one direction on the light-receiving surface of an image sensor (not shown).

Figure 63A:
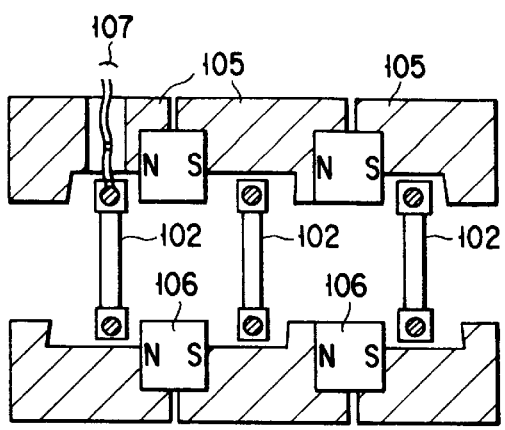
FIGS. 63A and 63B are a sectional view and front view of a light-refracting device according to the invention, having three light-refracting members which refract the input light beam in three directions, respectively.
Figure 63B:
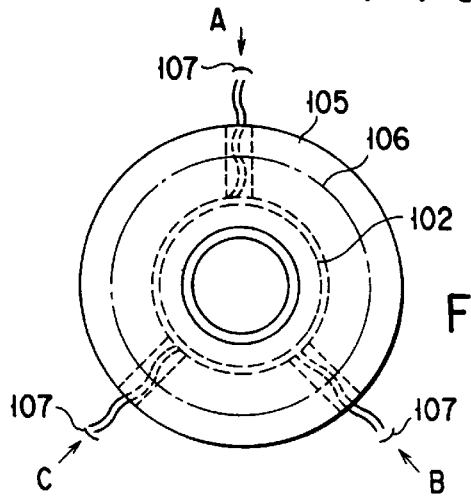
Figure 64:
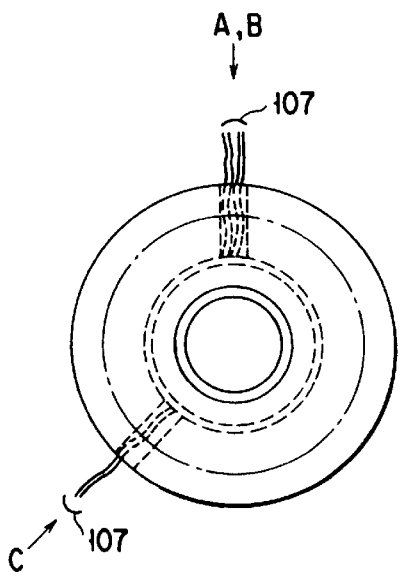
FIG. 64 is a front view of the light-refracting device shown in FIGS. 63A and 63B, explaining that the light-refracting members refracts the input light beam in two of the three directions.
Figure 65:
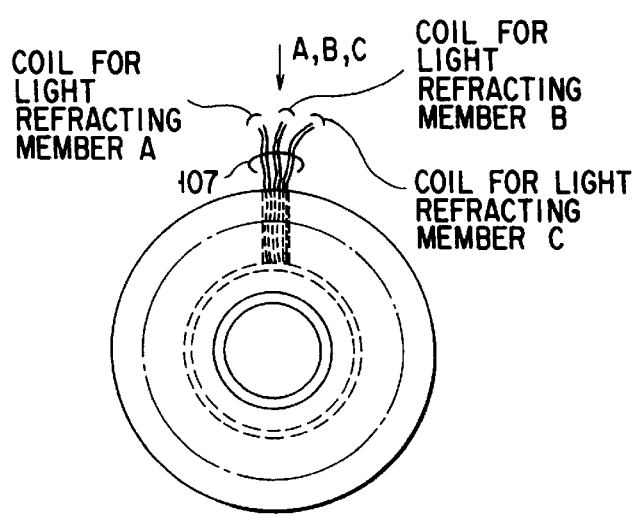
FIG. 65 is a front view of the light-refracting device shown in FIGS. 63A and 63B, explaining that the light-refracting members refracts the input light beam in only one the three directions.

FIGS. 63A and 63B shows a light-refracting device according to the invention, which is characterized in that three light-refracting members 102 and two ring-shaped magnets 106 are provided in the hollow cylindrical housing 105. The device can refract an input light beam in at most three directions, whereby an image can be moved along three axes A, B and C on the light-receiving surface of an image sensor as illustrated in FIG. 63B. As shown in FIG. 64, the device may refract the input light beam in two of the three directions, whereby an image can be moved along two axes on the light-receiving surface of the image sensor. Still further, as shown in FIG. 65, the device may refract the input light beam in only one of the three directions, whereby an image can be moved along one axis on the light-receiving surface of the image sensor.

The device of FIGS. 63A and 63B may have two additional ring-shaped magnets, which are fitted in the front and rear end of the hollow cylindrical housing 105 as in the embodiment illustrated in FIG. 58. If this case, the three light-refracting members 102 are located among four ring-shaped magnets. The four magnets are magnetized, generating four magnetic fields which extend in the same direction. The ring-shaped magnets 106 are positioned perpendicular to the axis of the housing 105, and the inner end faces of the three housing parts are inclined to the axis of the housing 105. Each light-refracting member 102 is attracted onto the magnet 106 or abuts on the inner end face of the housing part containing the member 102, in accordance with the direction in which an electric current passes through the coil 112 of the member 102. Thus, each light-refracting member 102 tilts when it abuts on the inner end face of the housing part, whereby the path along which the input light passes through the disc 111 is inclined at an angle a to the axis of the housing 105.

The light-refracting device shown in FIGS. 63A and 66B has three light-refracting members 102. Instead, more light-refracting members 102 may be used in the present invention.

An electric current may be passed through the coil 112 of each light-refracting member 102 in various methods to attract the member 102 onto the magnet 106 and push it onto the inner end face of the housing 105. The methods will be explained, with reference to the timing charts of FIGS. 66, 67, 68 and 69.

Figure 66:
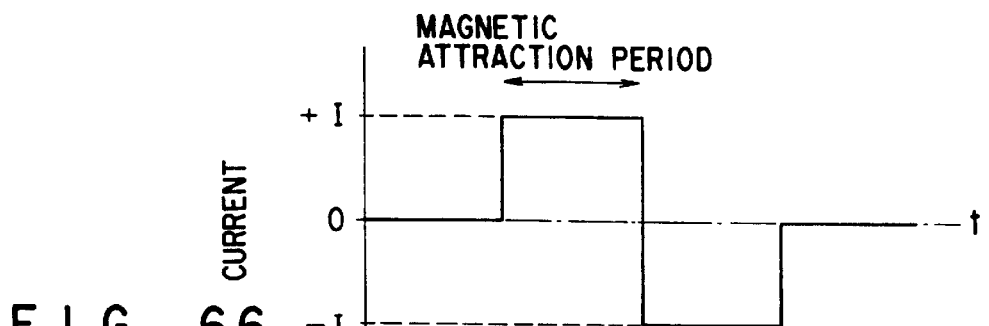
FIG. 66 is a timing chart explaining a first method of passing an electric current through the coil of a light-refracting member in the present invention.

In the method illustrated in FIG. 66, an electric current I is passed through the coil 112 in one direction for a predetermined time, attracting the member 102 onto the magnet 106. The current I is then passed through the coil 112 in the opposite direction for the same time, thus pushing the member 102 onto the inner end face of the housing 105. The magnetic force pushing the member 102 toward the inner end face of the housing 105 is smaller than the magnetic force attracting the member 102 toward the magnet 106. This is because, the more remote the member 102 from the magnet 106, the less the magnetic force it receives.

Figure 67:
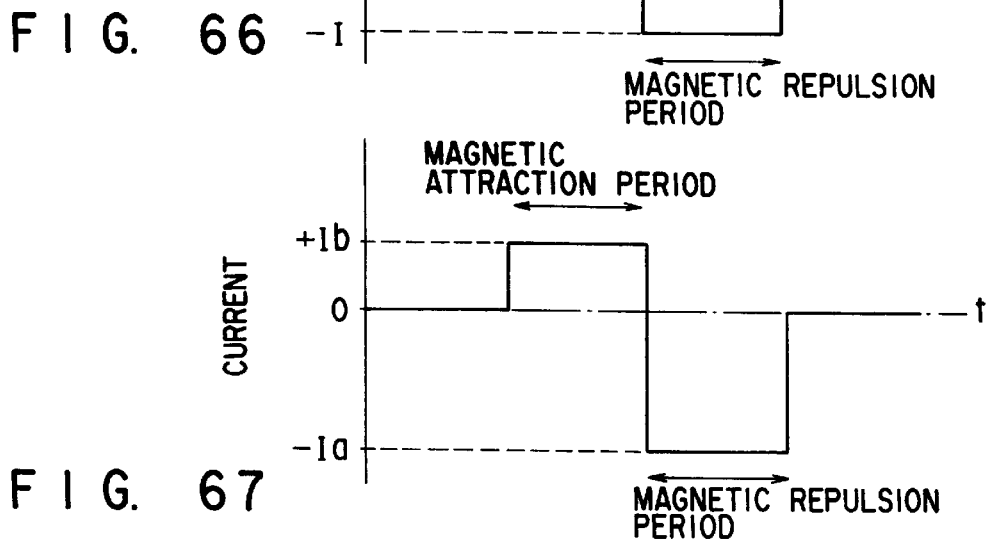
FIG. 67 is a timing chart explaining a second method of passing an electric current through the coil of a light-refracting member in the present invention.

In the method illustrated in FIG. 67, an electric current Ib is passed through the coil 112 in one direction for a predetermined time, attracting the member 102 onto the magnet 106. Then, a larger electric Ia current is passed through the coil 112 in the opposite direction for the same time, thus pushing the member 102 onto the inner end face of the housing 105. The member 102 can therefore be moved toward the inner end face of the housing 105 and the magnet 106 with substantially the same magnetic force.

Figure 68:
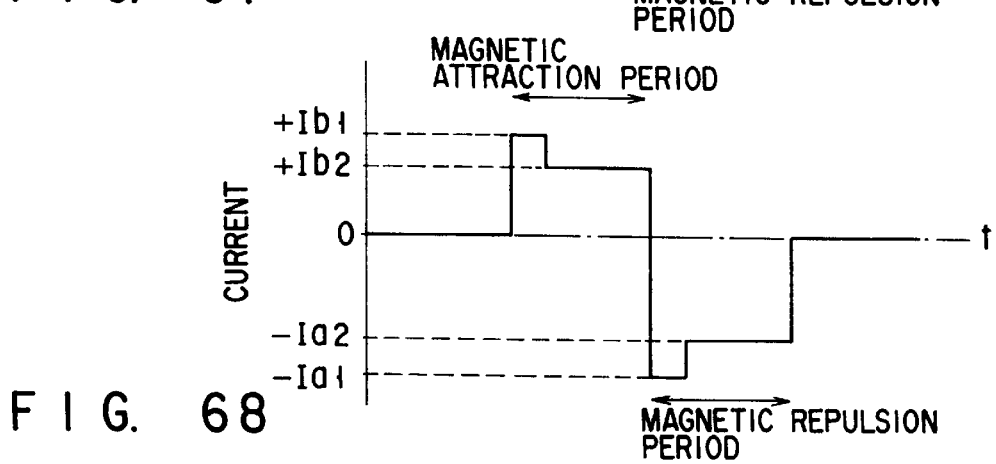
FIG. 68 is a timing chart explaining a third method of passing an electric current through the coil of a light-refracting member in the present invention.

In the method illustrated in FIG. 68, an electric current is passed through the coil 112 in one direction for a predetermined time, attracting the member 102 onto the magnet 106. The current has a value Ib1 at first and then a less value Ib2. Then, a larger electric current is passed through the coil 112 in the opposite direction for the same time, pushing the member 102 onto the inner end face of the housing 105. The current passed in the opposite direction has a value Ia1 at first and then a less value Ia2. Not only can the member 102 be moved toward the inner end face of the housing 105 and the magnet 106 with substantially the same magnetic force, but also can the direction of moving the member 102 be changed reliably and quickly.

Figure 69:
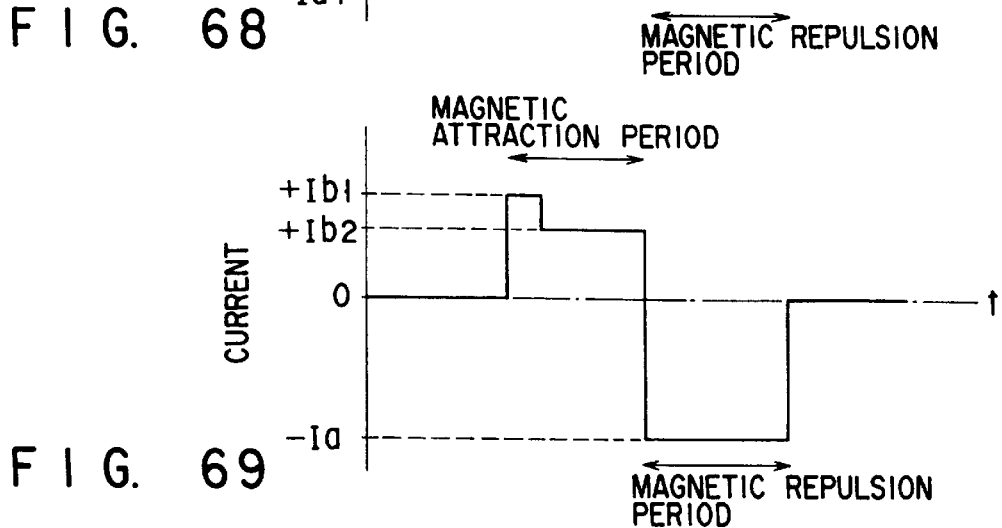
FIG. 69 is a timing chart explaining a fourth method of passing an electric current through the coil of a light-refracting member in the present invention.

In the method illustrated in FIG. 69, an electric current is passed through the coil 112 in one direction for a predetermined time, attracting the member 102 onto the magnet 106. The current has a value Ib1 at first and then a less value Ib2. Then, a larger electric current is passed through the coil 112 in the opposite direction for the same time, pushing the member 102 onto the inner end face of the housing 105. Therefore, the member 102 can be pushed toward the inner end face of the housing 105 and the magnet 106 with almost the same magnetic force, and the member 112 can be reliably and quickly attracted onto the magnet 106.

Any light-refracting device according to the present invention can be driven in various methods. These methods will be explained, with reference to the timing charts of FIGS. 70, 71, 72 and 73.

Figure 70:
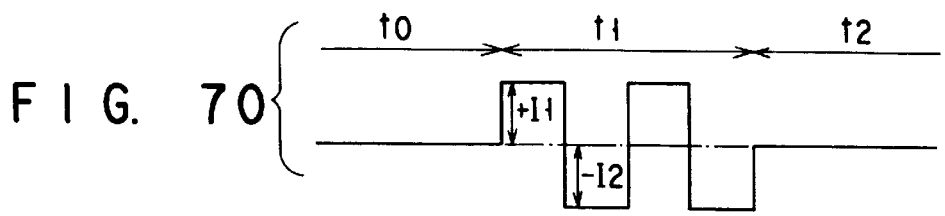
FIG. 70 is a timing chart explaining a first method of driving a light-refracting device of the invention.
Figure 71:
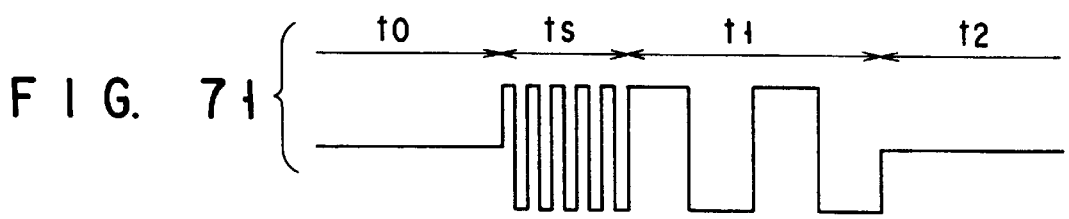
FIG. 71 is a timing chart explaining a second method of driving a light-refracting device of the invention.

In the method of FIG. 70, no electric current is passed through the coil 112 of each light-refracting member 102 during non-operating period to. During the operating period $t_1$, an electric current I is passed through the coil 112, alternately in the opposite directions, thereby moving the light-refracting member 102 back and forth between the ring-shaped magnet 106 and the inner end face of the housing 105. During the following non-operating period $t_2$, no electric current is passed through the coil 112.

The member 102 may not be moved from the magnet 106 or the inner end face if the device has been left unused for a long time or in a high-humidity atmosphere. To move the member 102 reliably, the light-refracting device may well be driven by the method illustrated in FIG. 71. In this method, an electric current I is passed through the coil 112 several times alternately in the opposite directions, each time for a short time, during the preliminary operating period $t_s$. In the operating period $t_1$, the electric current I is passed through the coil 112 in the same way as in the method of FIG. 70.

Figure 72:
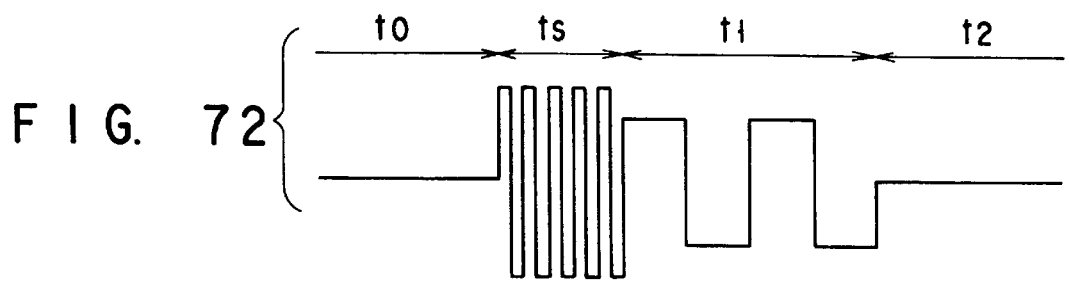
FIG. 72 is a timing chart explaining a third method of driving a light-refracting device of the invention.

The method of FIG. 72 is identical to the method shown in FIG. 34, except that a larger electric current is passed through the coil 112 during the preliminary operating period $t_s$.

Figure 73:
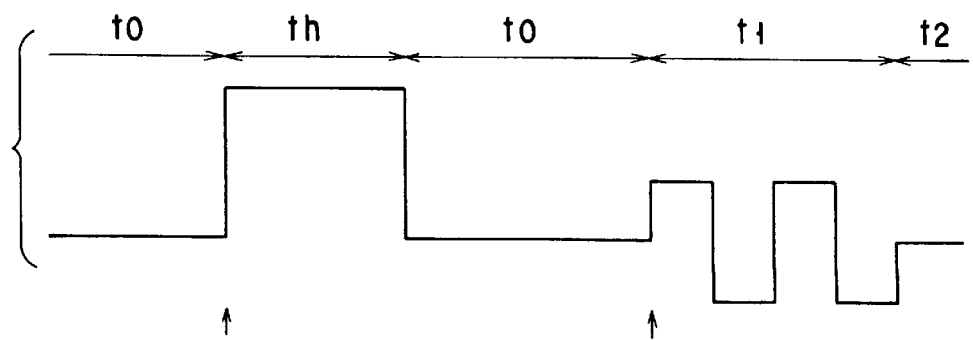
FIG. 73 is a timing chart explaining a fourth method of driving a light-refracting device of the invention.

The method of FIG. 73 is characterized in that a current larger than the operating current I is passed through the coil 112 in one direction throughout the preliminary operating period $t_h$. Hence, the coil 112 generates heat during the preliminary operating period $t_h$, thereby evaporating dews formed in the light-refracting device.

In the image input apparatus shown in FIG. 35, the light-refracting device is located between the lens unit 101 and the solid-state image sensor 103. The lens used in the unit 101 must therefore have a long back-focal distance. Since any lens that has high resolution and a long back-focal distance is expensive, the manufacturing cost of the image input apparatus is inevitably high. In view of this, the lens should be replaced by a lens having a short back-focal distance.

Figure 74:
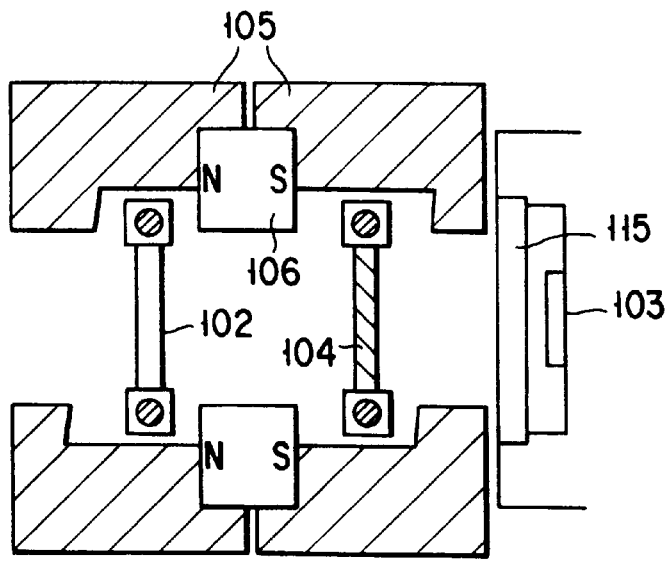
FIG. 74 is a sectional view showing a light-refracting device according to the present invention and an image sensor used in combination with the light-refracting device.

FIG. 74 shows a light-refracting device which is suitable for use in an image input apparatus incorporating a lens which has a short back-focal distance. The rear light-refracting member 102 has a cyan filter 104. The cyan filter 104 is arranged in front of the solid-state image sensor 103, thereby correctly focusing the input light beam on the light-receiving surface of the device 103, in spite of the short back-focal distance of the lens.

Figure 75:
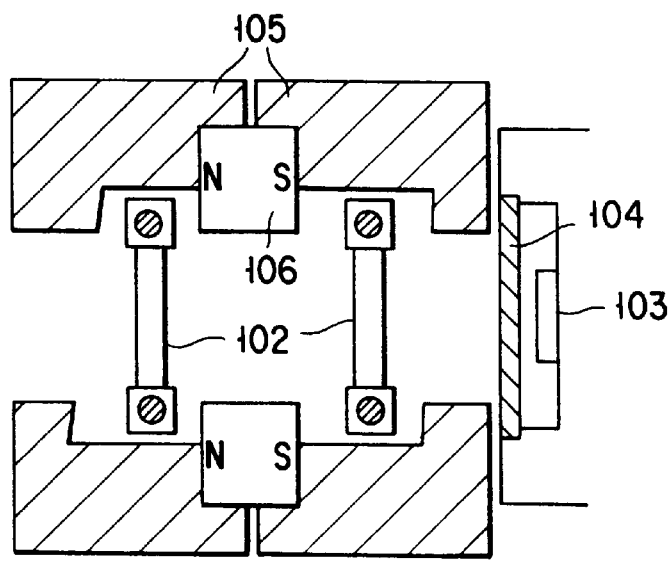
FIG. 75 is a sectional view showing a light-refracting device according to the present invention and an image sensor whose protective glass cover is a cyan filter, which allows for the use of a lens having a short back-focal distance.

FIG. 75 shows another light-refracting device and a solid-state image sensor 103. The sensor 103 has a protective glass cover which is a cyan filter. The cyan filter allows for the use of a lens having a short back-focal distance in the lens unit 101 (not shown).

In the image input apparatus of FIG. 35, the light-refracting device is interposed between the lens unit 101 and the solid-state image sensor 103. Another lens unit may be provided between the light-refracting device and the solid-state image sensor 103, as is illustrated in FIG. 76. Furthermore, the light-refracting device may be arranged in front of the lens unit 1 as is illustrated in FIG. 77.

As described above, according to the present invention, a light-refracting device used for an image input apparatus comprises: a light-refracting unit comprising a light-refracting disc and a coil wound around a circumferential surface of the disc, a ring-shaped magnet for attracting or repelling the light-refracting unit in accordance with a direction in which an electric current is passed through the coil of the light-refracting unit; and a positioning member for inclining the light-refracting unit at a first angle to an optical axis when the unit is attracted to the ring-shaped magnet and a second angle to the optical axis when the unit is repelled from the ring-shaped magnet.

Another light-refracting device comprises: two light-refracting units each comprising a light-refracting disc and a coil wound around a circumferential surface of the disc; a ring-shaped magnet for attracting or repelling the light-refracting units in accordance with a direction in which an electric current is passed through the coils of the light-refracting units; and a positioning member for inclining each of the light-refracting units at a first angle to an optical axis when the unit is attracted to one ring-shaped magnet and a second angle to the optical axis when the unit is repelled from one ring-shaped magnet.

Another light-refracting device comprises: at least three light-refracting units each comprising a light-refracting disc and a coil wound around a circumferential surface of the disc; at least two ring-shaped magnets for attracting or repelling the light-refracting units in accordance with a direction in which an electric current is passed through the coils of the light-refracting units; and a positioning member for inclining each of the light-refracting units at a first angle to an optical axis when the unit is attracted to one ring-shaped magnet and a second angle to the optical axis when the unit is repelled from one ring-shaped magnet.

The light-refracting device is arranged between a lens unit and a solid-state image sensor and in which a light beam focused by the lens unit passes through the light-refracting unit and the ring-shaped magnet before being focused on the solid-state image sensor to form an image thereon.

The light-refracting unit is shaped like a disc, two end portions of the coil of the light-refracting unit extend outwards at substantially the same position on the circumferential surface of the light-refracting unit, and the positioning member has a hole through which the two end portions of the coil are led outwards.

The light-refracting unit has a projection protruding from the outer circumferential surface and inserted in the hole of the positioning member, thereby preventing the light-refracting unit from rotating, and the end portions of the coil extend outwards from the projection.

the coil of the light-refracting unit is sealed in an annular molding which has circular recesses in either side.

The positioning member has a magnetic member for enhancing use efficiency of magnetic force generated by the ring-shaped magnet, or a magnet for increasing a magnetic force acting on the light-refracting unit.

The ring-shaped magnet is magnetized along a light beam which passes through the ring-shaped magnet.

The ring-shaped magnet is magnetized in a radial direction of the ring-shaped magnet.

The light-refracting disc, the ring-shaped magnet and that portion of the positioning member which passes a light beam have a diameter, an inner diameter and a size, respectively, which are large enough to allow an input light beam to form a sufficiently large image on a light-receiving surface of a solid-state image sensor.

The light-refracting unit is inclined at a first angle to an input light beam at a first position remotest from the ring-shaped magnet and at a second angle to the input light beam at a second position closest to the ring-shaped magnet, and an image formed on a solid-state image sensor moves by a distance determined by the difference between the first and second angles and the thickness and refraction index of the light-refracting disc and moves in a direction determined by the direction in which the light-refracting unit are inclined at the first and second positions.

The two light-refracting units are inclined in different directions.

The light-refracting unit contacts the ring-shaped magnet when located at the second position and contacts the positioning member when located at the first position.

The light-refracting disc has two parallel opposing sides, is axially aligned with an input light beam while the light-refracting unit contacts the ring-shaped magnet, and is inclined at a predetermined angle to the input light while the light-refracting unit contacts the positioning member, thereby to refract the input light beam and move an image on a light-receiving surface of a solid-state image sensor in a predetermined direction for a predetermined distance.

The positioning member is composed of first and second halves, the ring-shaped magnet is clamped between the first and second halves, the first half has a female screw to be meshed with a male screw of a lens unit 1, and the second half has a holder for holding a solid-state image sensor.

the light-refracting discs have the same thickness and are made of the same material.

As has been described above, the present invention can provide a light-refracting device suitable for use in an image input apparatus which comprises a lens unit and an inexpensive solid-state image sensor having but a small number of pixels. Provided between the lens unit and the image sensor, the light-refracting device refracts the input light beam, moving the image on the light-receiving surface of the image sensor. Each pixel therefore generates two or more pixel signals from one input light beam, so that the image sensor outputs image data representing an image having a sufficiently high resolution. The light-refracting device comprises a light-refracting member, a ring-shaped magnet, and a housing containing the member and magnet. The light-refracting member comprises a light-refracting disc and a coil wound around the circumferential surface of the disc. When an electric current is passed through the coil in one direction, the light-refracting member is attracted onto the magnet. When the electric current is passed through the coil in the opposite direction, the light-refracting member is moved away from the magnet and inclined to refract an input light beam a specific angle to the axis of the housing. Made of a relatively small number of components which are made of inexpensive materials, the light-refracting device can be small and manufactured at a low cost. The light-refracting member can easily moved to one of two alternative positions, in accordance with the direction in which an electric current is passed through the coil. Further, the light-refracting device can be driven with a small amount of power. Still further, the device can move an image for a desired distance and in a desired direction. This is because the distance is determined by the thickness and refraction index of the light-refracting disc and the angle at which the disc is inclined to the axis of the housing, and also because the direction is determined by the direction in which the disc is inclined to the axis of the housing.

The light-refracting device according to the present invention is small and reliable, operates accurately, consumes only a little power, and can be manufactured at low cost. If incorporated in an image input apparatus which has an inexpensive, low-resolution solid-state image sensor, it will help the apparatus to generate data representing a high-resolution image, which the image sensor cannot generate by itself.

What is claimed is:

1. An image input apparatus comprising:
    a camera head unit including a solid state image sensor;
    a taking lens assembly for projecting an image on said image sensor;
    a light refracting mechanism arranged between said image sensor and said taking lens assembly for changing a light path; and
    a readout circuit for reading image data from said image sensor;

said light refracting mechanism, including,
  a movable light refractor having a circular light refracting plate and a coil around said light refracting plate,
  a ring magnet for applying forces of attraction and repulsion to said light refractor in accordance with a direction of a current flowing through said coil, said ring magnet coming in contact with said light refractor by the forces of attraction so that an optical axis passing through the taking lens assembly and a center of said ring magnet becomes vertical to the surface of the light refracting plate; and
  a member having a hole through which a light beam passes and which has a center corresponding to the optical axis, said member coming in contact with said light refractor by the forces of repulsion so that the plate of said light refractor is arranged in a direction defining a predetermined angle with respect to the optical axis, wherein the light beam passing through the hole of said member, said light refracting plate and a hole of said ring magnet is refracted in said direction by a distance determined by a thickness of said refracting plate, a refractive index and the predetermined angle.

2. The image input apparatus according to claim 1, further comprising a control unit connected to said solid-state image sensor and having a semiconductor memory for storing the image data read from said solid-state image sensor and subjected to digital conversion, said control unit being removably attached to host equipment and responsive to an instruction from said host equipment to transfer said image data read from said semiconductor memory to said host equipment.

3. The image input apparatus according to claim 1, further comprising a control unit connected to said solid-state image sensor and removably attached to host equipment for transferring the image data from said image sensor to said host equipment, and in which said light refracting mechanism is associated with driving means, and at least one of said camera head unit and said control unit includes at least one of a control signal generator for generating control signals and a synchronization signal generator for generating synchronization signals, said driving means selecting at least one of control signals generated from said control signal generator and said synchronization signals and feeding a selected control signal to said light refracting mechanism as instructed by said host equipment.

4. The image input apparatus according to claim 1, further comprising a control unit connected to said solid-state image sensor and removably attached to host equipment for transferring the image data from said image sensor to said host equipment, and in which said camera head unit includes electronic shutter means for changing the charge storage time of said solid-state image sensor, a light sensor for detecting the intensity of light incident on said camera head unit, and means for driving said electronic shutter means in response to one of the level of the image data of said solid-state image sensor, the level of an output signal of said light sensor and an instruction of said host equipment.

5. The image input apparatus according to claim 1, further comprising a control unit connected to said solid-state image sensor and removably attached to host equipment, and in which said camera head unit includes a driver for driving said solid-state image sensor, a synchronization signal generator for generating synchronization signals to said solid-state image sensor, a light sensor for detecting the intensity of light incident on said camera head unit, and means responsive to at least one of the level of the image data of said solid-state image sensor, the level of an output signal of said light sensor and an instruction from said host equipment for changing the period of said synchronization signals to said solid-state image sensor.

6. The image input apparatus according to claim 1, further comprising a control unit connected to said solid-state image sensor and removably attached to host equipment for transferring the image data from said image sensor to said host equipment, and in which said camera head unit includes a diaphragm assembly, a light sensor for detecting the intensity of light incident on said camera head unit, and means responsive to at least one of the level of the image data of said solid-state image sensor, the level of an output signal of said light sensor and an instruction from said host equipment for controlling said diaphragm assembly.

7. The image input apparatus according to claim 1, further comprising a control unit connected to said solid-state image sensor and removably attached to host equipment for transferring the image data from said image sensor to said host equipment, and in which said camera head unit includes illumination means, a light sensor for detecting the intensity of light incident on said camera head unit, and means responsive to at least one of the level of the image data of said solid-state image sensor, the level of the image data of said light sensor and an instruction from said host equipment for firing said illumination means.

8. The image input apparatus according to claim 1, further comprising a control unit connected to said solid-state image sensor and removably attached to host equipment for transferring the image data from said image sensor to said host equipment, and in which said camera head unit includes a driver for driving said solid-state image sensor and a synchronization signal generator for generating synchronization signals to said solid-state image sensor, said driver and said synchronization signal generator being responsive to an instruction from said host equipment to set the signal read mode of said solid-state image sensor to either a field storage mode or a frame storage mode.

9. The image input apparatus according to claim 1, further comprising a control unit connected to said solid-state image sensor and removably attached to host equipment for transferring the image data from said image sensor to said host equipment, and in which said camera head unit includes a focusing means controllable by said host equipment, said focusing means being responsive to position information sent from said host equipment over a cable by specifying a point on an image displayed on a display screen of said host equipment to focus on said point.

10. The image input apparatus according to claim 1, further comprising a control unit connected to said solid-state image sensor and removably attached to host equipment for transferring the image data from said image sensor to said host equipment, and in which said camera head unit and said control unit are powered from said host equipment and enter a low power mode in response to an instruction from said host equipment or the absence of any instruction of said host equipment for a predetermined period of time, and include means for informing said host equipment of the input into the low power mode.

11. The image input apparatus according to claim 1, further comprising a control unit connected to said solid-state image sensor and removably attached to host equipment for transferring the image data from said image sensor to said host equipment, and in which said control unit is powered from said host equipment, and said camera head unit has a built-in battery, the power on and off of said camera head unit being performed by an instruction from said host equipment.

12. An image input apparatus comprising:
a camera head, including,
   a solid state image sensor,
   a taking lens assembly for focusing an image on said solid state image sensor,
   readout means for reading out an image signal from said solid state image sensor,
   at least one close-up lens movably provided so that it can be positioned in front of said taking lens assembly to capture a close-up image, and
   a detector for determining whether said close-up lens is positioned in front of said taking assembly;
a host unit;
a controller detachable from said host unit, said controller having means for transferring the image signal from said camera head to said host unit; and
a cable for connecting between said camera head and said controller;
said host unit having means for signal-processing the image signal and outputting and storing a processed image signal; and
said camera head and said controller each having means for informing said host unit whether or not said close-up lens is positioned in front of said taking lens assembly and the type of said close-up lens.

13. A light refracting mechanism comprising:
a movable light refractor having a circular light refracting plate and a coil around said light refracting plate;
a ring magnet for applying forces of attraction and repulsion to said light refractor in accordance with a direction of a current flowing through said coil, said ring magnet coming in contact with said light refractor by the forces of attraction so that an optical axis passing through the lens assembly and a center of said ring magnet becomes vertical to the surface of the light refracting plate; and
a member having a hole through which a light beam passes and which has a center corresponding to the optical axis, said member coming in contact with said light refractor by the forces of repulsion so that the plate of said light refractor has a predetermined angle with respect to the optical axis;
wherein the light beam passing through the hole of said member, said light refracting plate and a hole of said ring magnet is refracted in said direction by a distance determined by a thickness of said refracting plate, a refractive index and the predetermined angle.

14. A light refracting mechanism according to claim 13, further comprising:
another movable light refractor, including,
   a circular light refracting plate, and a coil around said light refracting plate; and
   another member which comes in contact with said another light refractor by the forces of repulsion;
said ring magnet being located between said light refractor and said another light refractor to refract the passing light beam in two directions.

15. A light refracting mechanism according to claim 13, wherein said refractor has a peripheral portion having a projection from which a wire of said coil extends, and said member has a hole through which the wire of said coil passes, the hole having such a size so as to block the rotation of said light refractor in a movable space when said projection strikes an end portion of said hole.

16. A light refracting mechanism according to claim 13, wherein said ring magnet is magnetized in a direction of the optical axis.

17. A light refracting mechanism according to claim 13, wherein a diameter of said refracting plate, an inner diameter of said ring magnet, and an inner diameter of said member are each larger than that of the light beam passing through said light refracting mechanism.

18. A light refracting mechanism according to claim 13, wherein said member has a portion for mounting an image pick-up sensor.

19. A light refracting mechanism according to claim 13, wherein said member has a portion for mounting a taking lens assembly.

20. An image input apparatus comprising:
a camera head unit, including,
   a solid state image sensor,
   a taking lens assembly for projecting an image on said image sensor,
   a light refracting mechanism arranged between said image sensor and said taking lens assembly for changing a light path, and
   a readout circuit for reading image data from said image sensor;
said light refracting mechanism, including,
   a movable light refractor having a circular light refracting plate and a coil around said light refracting plate,
   a ring magnet for applying forces of attraction and repulsion to said light refractor in accordance with a direction of a current flowing through said coil, said ring magnet coming in contact with said light refractor by the forces of attraction so that an optical axis passing through the taking lens assembly and a center of said ring magnet becomes vertical to the surface of the light refracting plate, and
   a member having a hole through which a light beam passes and which has a center corresponding to the optical axis, said member coming in contact with said light refractor by the forces of repulsion so that the plate of said light refractor is arranged in a direction defining a predetermined angle with respect to the optical axis,
wherein the light beam passing through the hole of said member, said light refracting plate and a hole of said ring magnet is refracted in said direction by a distance determined by a thickness of said refracting plate, a refractive index and the predetermined angle,
said light refracting mechanism further, including,
   another movable light refractor having another circular light refracting plate and another coil around said another light refracting plate, and
   another member which comes in contact with said another light refractor by the forces of repulsion, said ring magnet being located between said light refractor and said another light refractor to refract the passing light beam in two directions.

21. The image input apparatus according to claim 20, further comprising a control unit connected to said solid-state image sensor and removably attached to host equipment for transferring the image data from said image sensor to said host equipment, and wherein said control unit comprises:
a semiconductor memory for storing the image data read from said solid-state image sensor and subjected to digital conversion, said control unit being responsive to an instruction from said host equipment to transfer said image signal read from said semiconductor memory to said host equipment.

22. The image input apparatus according to claim 21, wherein said light refracting member is associated with a driving means, and at least one of said camera head unit and said control unit includes at least one of a control signal generator for generating control signals and a synchronization signal generator for generating synchronization signals, said driving means selecting at least one of control signals generated from said control signals and said synchronization signals and feeding a selected control signal to said light refracting member as instructed by said host equipment.

23. The image input apparatus according to claim 21, wherein said camera head unit further comprises:

a driver for driving said solid-state image sensor;

a synchronization signal generator for generating synchronization signals to said solid-state image sensor;

a light sensor for detecting the intensity of light incident on said camera head unit; and means responsive to at least one of the level of the image data of said solid-state image sensor, the level of an output signal of said light sensor, and an instruction from said host equipment for changing the period of said synchronization signals to said solid-state image sensor.

24. The image input apparatus according to claim 21, wherein said camera head unit further comprises:

a diaphragm assembly;

a light sensor for detecting the intensity of light incident on said camera head unit; and means responsive to at least one of the level of the image data of said solid-state image sensor, the level of an output signal of said light sensor, and an instruction from said host equipment for controlling said diaphragm assembly.

25. The image input apparatus according to claim 21, wherein said camera head unit further comprises:

illumination means;

a light sensor for detecting the intensity of light incident on said camera head unit; and means responsive to at least one of the level of the image data of said solid-state image sensor, the level of an output signal of said light sensor, and an instruction from said host equipment for firing said illumination means.

26. The image input apparatus according to claim 21, wherein said camera head unit further comprises:

a driver for driving said solid-state image sensor; and a synchronization signal generator for generating synchronization signals to said solid-state image sensor;

said driver and said synchronization signal generator being responsive to an instruction from said host equipment to set the signal read mode of said solid-state image sensor to either a field storage mode or a frame storage mode.

27. The image input apparatus according to claim 21, wherein said camera head unit further comprises:

a focusing means controllable by said host equipment;

said focusing means being responsive to position information sent from said host equipment over said cable by specifying a point on an image displayed on a display screen of said host equipment to focus on said point.

28. The image input apparatus according to claim 21, wherein said camera head unit and said control unit are powered from said host equipment and enter a low power mode, in response to an instruction from said host equipment or in the absence of any instruction from said host equipment, for a predetermined period of time, and include means for informing said host computer of entering into the low power mode.

29. The image input apparatus according to claim 21, wherein said control unit is powered from said host equipment, and said camera head unit has a built-in battery, the power on and off of said camera head unit being performed by an instruction from said host equipment.

30. The image input apparatus according to claim 20, wherein said camera head unit further comprises:

an electronic shutter means for changing the charge storage time of said solid-state image sensor;

illumination means;

a light sensor for detecting the intensity of light incident on said camera head unit; and a means for driving said electronic shutter means in response to one of the level of the image data of said solid-state image sensor, the level of an output signal of said light sensor, and an instruction from said host equipment for firing said illumination means.

* * * * *